US009213724B2

(12) United States Patent
Nagasaka et al.

(10) Patent No.: US 9,213,724 B2
(45) Date of Patent: Dec. 15, 2015

(54) INFORMATION PROCESSING TERMINAL DEVICE, INFORMATION PROCESSING DEVICE, INFORMATION PROCESSING METHOD, AND PROGRAM

(71) Applicant: Sony Corporation, Tokyo (JP)

(72) Inventors: Hideo Nagasaka, Tokyo (JP); Tadaaki Kimijima, Tokyo (JP); Mamoru Tokashiki, Tokyo (JP); Toshimasa Miyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 13/743,843

(22) Filed: Jan. 17, 2013

(65) Prior Publication Data

US 2013/0132387 A1    May 23, 2013

Related U.S. Application Data

(63) Continuation of application No. 12/247,606, filed on Oct. 8, 2008, now Pat. No. 8,386,925.

(30) Foreign Application Priority Data

Oct. 22, 2007   (JP) ................................. 2007-273918

(51) Int. Cl.
*G06F 3/00* (2006.01)
*G06F 17/30* (2006.01)
(Continued)

(52) U.S. Cl.
CPC .... *G06F 17/30283* (2013.01); *G06F 17/30017* (2013.01); *G06F 17/30743* (2013.01);
(Continued)

(58) Field of Classification Search
CPC ................... G06F 17/30017; G06F 17/30743; G06F 17/30749; G06F 17/30283
See application file for complete search history.

(56) References Cited

U.S. PATENT DOCUMENTS

| 5,442,749 A | 8/1995 | Northcutt et al. |
| 5,692,157 A | 11/1997 | Williams |

(Continued)

FOREIGN PATENT DOCUMENTS

| EP | 1473728 A1 | 11/2004 |
| EP | 1675017 A | 6/2006 |

(Continued)

OTHER PUBLICATIONS

Gonzalez, Nick "JamGlue Launches 'Remixing for the Masses'", TechCrunch, Dec. 15, 2006, http://www.techcrunch.com/?p=4176 &preview=false, retrieved on Mar. 18, 2009.

(Continued)

*Primary Examiner* — Kyle Stork
(74) *Attorney, Agent, or Firm* — Wolf, Greenfield & Sacks, P.C.

(57) ABSTRACT

An information processing terminal device includes: a communication unit; a primary content information acquiring unit for acquiring primary content information; a primary content information holding managing unit for holding and managing primary content information, in correlation with a unique primary content identifier; a subsidiary content information holding managing unit for obtaining subsidiary content information configured having at least playback control information and having a subsidiary content identifier corresponding to itself and an editing history identifier; an editing processing unit for executing editing processing with secondary usage of at least one of primary content information and subsidiary content information; a subsidiary content information creating unit for creating subsidiary content information; an editing history identifier managing unit for generating the editing history identifier; and a subsidiary content identifier managing unit for generating a subsidiary content identifier to be correlated with subsidiary content information and providing this to subsidiary content information.

15 Claims, 30 Drawing Sheets

(51) Int. Cl.
    *G11B 27/034* (2006.01)
    *G11B 27/32* (2006.01)
    *H04L 29/08* (2006.01)

(52) U.S. Cl.
    CPC ........ *G06F17/30749* (2013.01); *G11B 27/034* (2013.01); *G11B 27/322* (2013.01); *H04L 67/1095* (2013.01)

(56) References Cited

U.S. PATENT DOCUMENTS

| | | |
|---|---|---|
| 5,948,059 A | 9/1999 | Woo et al. |
| 6,085,199 A | 7/2000 | Rose |
| 6,571,235 B1 | 5/2003 | Marpe et al. |
| 6,888,999 B2 | 5/2005 | Herberger et al. |
| 6,975,995 B2 | 12/2005 | Kim |
| 7,051,053 B2 | 5/2006 | Sinha |
| 7,117,453 B2 | 10/2006 | Drucker et al. |
| 7,130,892 B2 | 10/2006 | Mukai |
| 7,268,287 B2 | 9/2007 | Kawashima |
| 7,558,789 B2 | 7/2009 | Frieder et al. |
| 7,716,572 B2 | 5/2010 | Beauregard et al. |
| 7,756,920 B2 | 7/2010 | Muller et al. |
| 7,844,548 B2 | 11/2010 | Robbin et al. |
| 8,008,567 B2 | 8/2011 | Uehara |
| 8,112,474 B2 | 2/2012 | Miyoshi et al. |
| 8,176,118 B2 | 5/2012 | Nagasaka et al. |
| 8,249,427 B2 | 8/2012 | Nagasaka et al. |
| 8,359,348 B2 | 1/2013 | Robbin et al. |
| 8,386,925 B2 | 2/2013 | Nagasaka et al. |
| 8,438,197 B2 | 5/2013 | Miyoshi et al. |
| 8,861,933 B2 | 10/2014 | Hattori et al. |
| 8,862,781 B2 | 10/2014 | Nagasaka et al. |
| 8,914,389 B2 | 12/2014 | Nagasaka |
| 8,924,404 B2 | 12/2014 | Nagasaka et al. |
| 8,959,174 B2 | 2/2015 | Miyoshi et al. |
| 2002/0013812 A1 | 1/2002 | Krueger et al. |
| 2002/0099552 A1 | 7/2002 | Rubin et al. |
| 2002/0128928 A1 | 9/2002 | Sukegawa |
| 2002/0194195 A1 | 12/2002 | Fenton et al. |
| 2003/0126599 A1 | 7/2003 | Novak et al. |
| 2004/0139233 A1 | 7/2004 | Kellerman et al. |
| 2004/0143598 A1 | 7/2004 | Drucker et al. |
| 2004/0249788 A1 | 12/2004 | Dant |
| 2005/0138543 A1 | 6/2005 | Liu |
| 2005/0184972 A1 | 8/2005 | Tashiro et al. |
| 2005/0197964 A1 | 9/2005 | Duggan |
| 2005/0240588 A1 | 10/2005 | Siegel et al. |
| 2005/0246377 A1 | 11/2005 | Faso |
| 2006/0143236 A1 | 6/2006 | Wu |
| 2006/0149781 A1 | 7/2006 | Blankinship |
| 2006/0168142 A1 | 7/2006 | Juszkiewicz |
| 2006/0168291 A1 | 7/2006 | van Zoest et al. |
| 2006/0221869 A1 | 10/2006 | Chua |
| 2006/0265349 A1 | 11/2006 | Hicken |
| 2006/0271494 A1 | 11/2006 | Ito |
| 2007/0044639 A1 | 3/2007 | Farbood et al. |
| 2007/0083537 A1 | 4/2007 | Martinez |
| 2007/0127671 A1 | 6/2007 | Chua et al. |
| 2007/0129006 A1 | 6/2007 | Goldberg et al. |
| 2007/0155312 A1 | 7/2007 | Goldberg et al. |
| 2007/0166687 A1 | 7/2007 | Bell et al. |
| 2007/0214260 A1 | 9/2007 | Juszkiewicz |
| 2007/0220024 A1 | 9/2007 | Putterman et al. |
| 2007/0239724 A1 | 10/2007 | Ramer et al. |
| 2007/0239855 A1 | 10/2007 | Kellerman et al. |
| 2007/0261537 A1 | 11/2007 | Eronen et al. |
| 2007/0297755 A1 | 12/2007 | Holt et al. |
| 2007/0299884 A1 | 12/2007 | Komori et al. |
| 2008/0052415 A1 | 2/2008 | Kellerman et al. |
| 2008/0208740 A1 | 8/2008 | Uehara |
| 2008/0235268 A1 | 9/2008 | Miyoshi et al. |
| 2008/0235356 A1 | 9/2008 | Miyoshi et al. |
| 2008/0259745 A1 | 10/2008 | Miyajima et al. |
| 2008/0310267 A1 | 12/2008 | Hattori et al. |
| 2009/0041017 A1 | 2/2009 | Luk |
| 2009/0106261 A1 | 4/2009 | Nagasaka et al. |
| 2009/0119273 A1 | 5/2009 | Nagasaka et al. |
| 2009/0138539 A1 | 5/2009 | Muller et al. |
| 2009/0164378 A1 | 6/2009 | West et al. |
| 2009/0178003 A1 | 7/2009 | Fiedler |
| 2009/0222580 A1 | 9/2009 | Stasi et al. |
| 2009/0281908 A1 | 11/2009 | Wong |
| 2009/0297128 A1 | 12/2009 | Nagasaka et al. |
| 2009/0299823 A1 | 12/2009 | Nagasaka et al. |
| 2009/0299981 A1 | 12/2009 | Nagasaka et al. |
| 2009/0300036 A1 | 12/2009 | Nagasaka |
| 2010/0281369 A1 | 11/2010 | Bell et al. |
| 2011/0072161 A1 | 3/2011 | Robbin et al. |
| 2012/0117191 A1 | 5/2012 | Miyoshi et al. |
| 2012/0151727 A1 | 6/2012 | Dewell |
| 2012/0185566 A1 | 7/2012 | Nagasaka et al. |
| 2014/0372562 A1 | 12/2014 | Nagasaka et al. |
| 2015/0006575 A1 | 1/2015 | Miyoshi et al. |
| 2015/0006576 A1 | 1/2015 | Miyoshi et al. |

FOREIGN PATENT DOCUMENTS

| | | |
|---|---|---|
| EP | 1770616 A | 4/2007 |
| EP | 1973303 A1 | 9/2008 |
| EP | 1973304 A1 | 9/2008 |
| EP | 1980971 A2 | 10/2008 |
| EP | 1930901 A3 | 2/2009 |
| JP | 09-081443 A | 3/1997 |
| JP | 10-135855 A | 5/1998 |
| JP | 11-312175 A | 11/1999 |
| JP | 2003-085893 A | 3/2003 |
| JP | 2004/310464 A | 11/2004 |
| JP | 2004-536348 A | 12/2004 |
| JP | 2006/018753 A | 1/2006 |
| JP | 2006-031233 A | 2/2006 |
| JP | 2007-129636 A | 5/2007 |
| KR | 2004-0104696 A | 12/2004 |
| KR | 2006-0044628 A | 5/2006 |
| WO | WO 01/15164 A1 | 3/2001 |
| WO | WO 02/075718 A3 | 9/2002 |
| WO | WO 2005/091133 A1 | 9/2005 |
| WO | WO 2007/112445 A2 | 10/2007 |
| WO | WO 2008/101126 A1 | 8/2008 |

OTHER PUBLICATIONS

Wenzel, Elsa, "Splice lets you mix and mash up music online." Oct. 17, 2006. CNET. <http://reviews.cnet.com/8301-10921_7-6653003-4.html>.

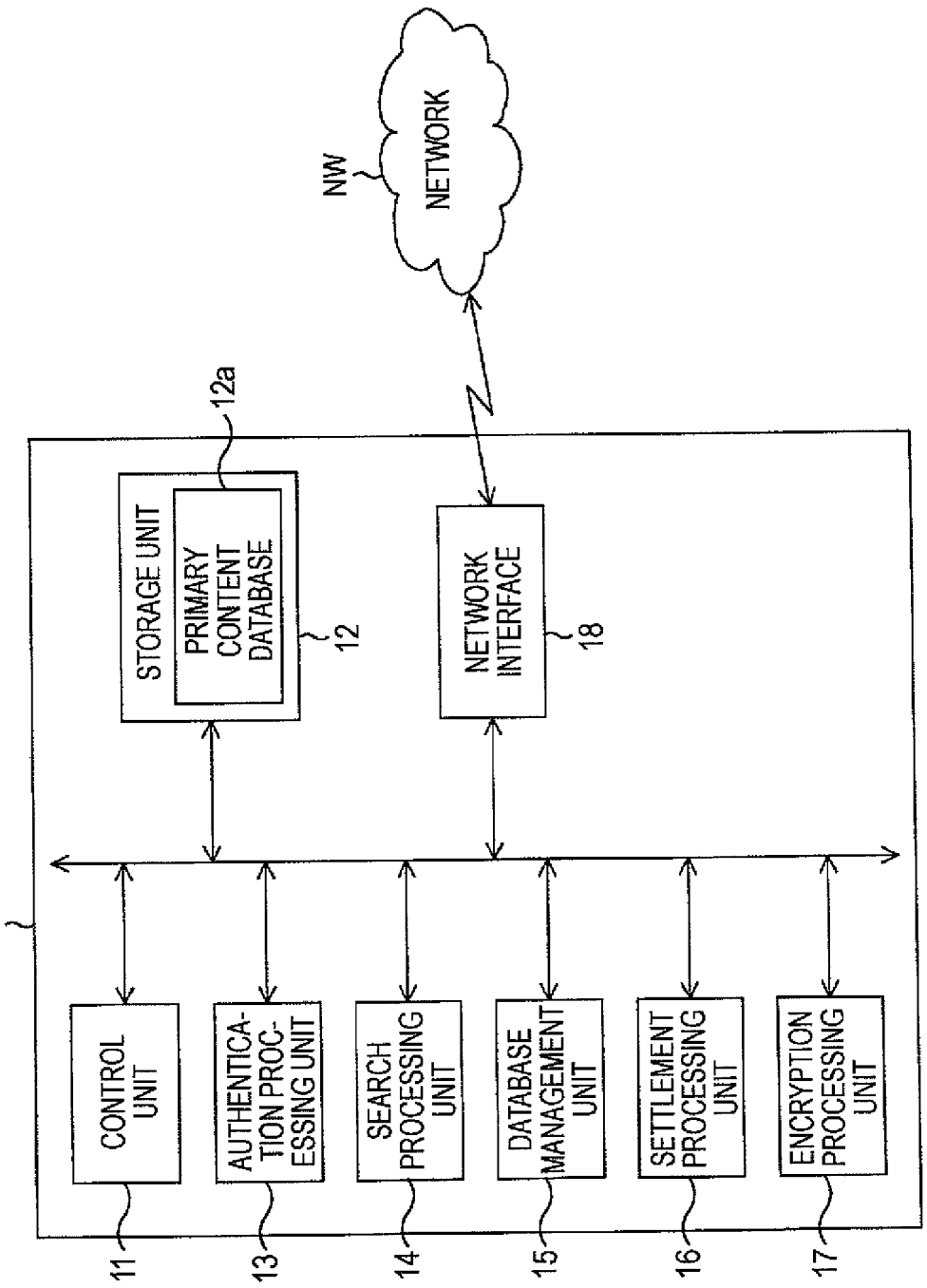

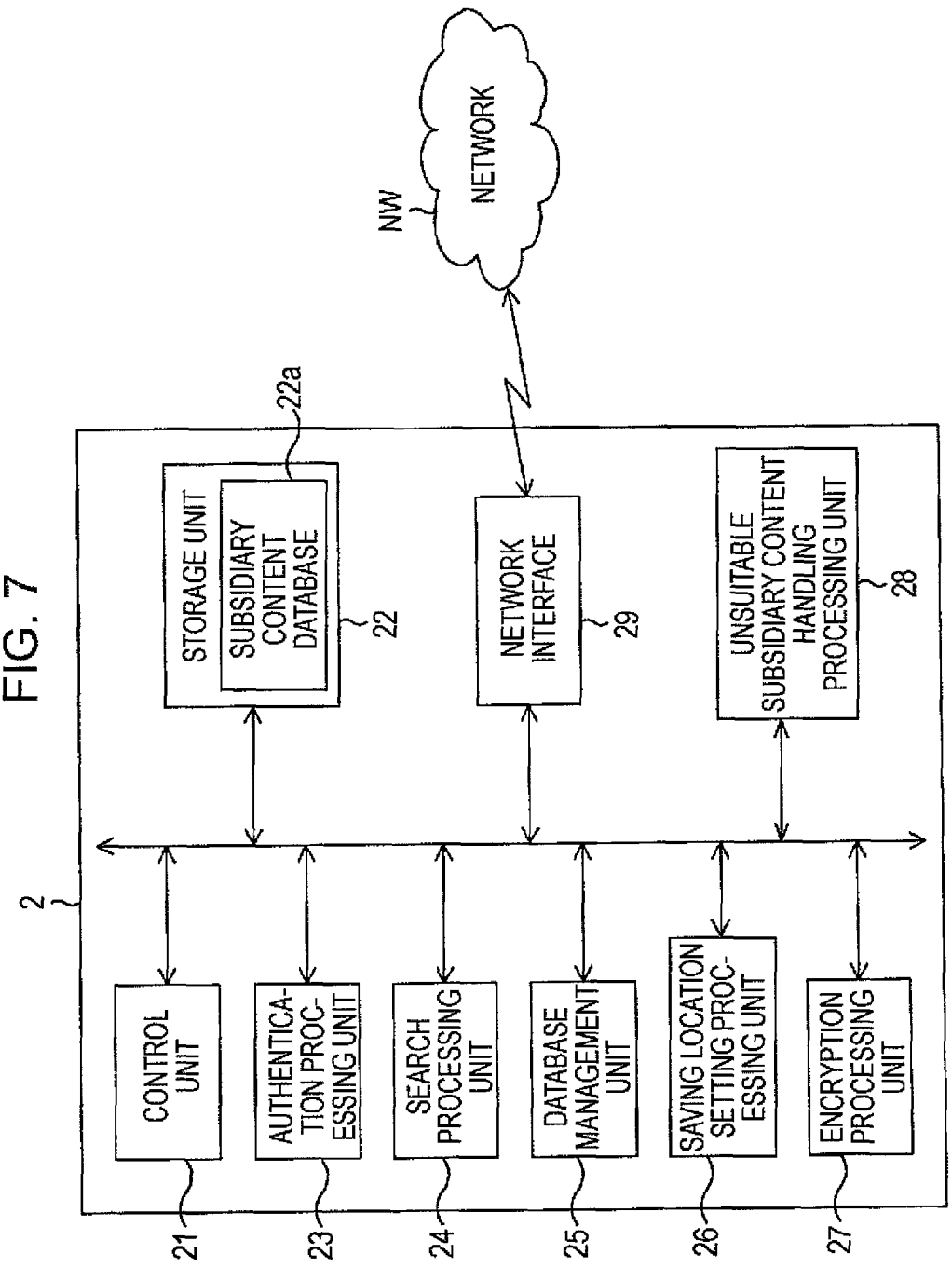

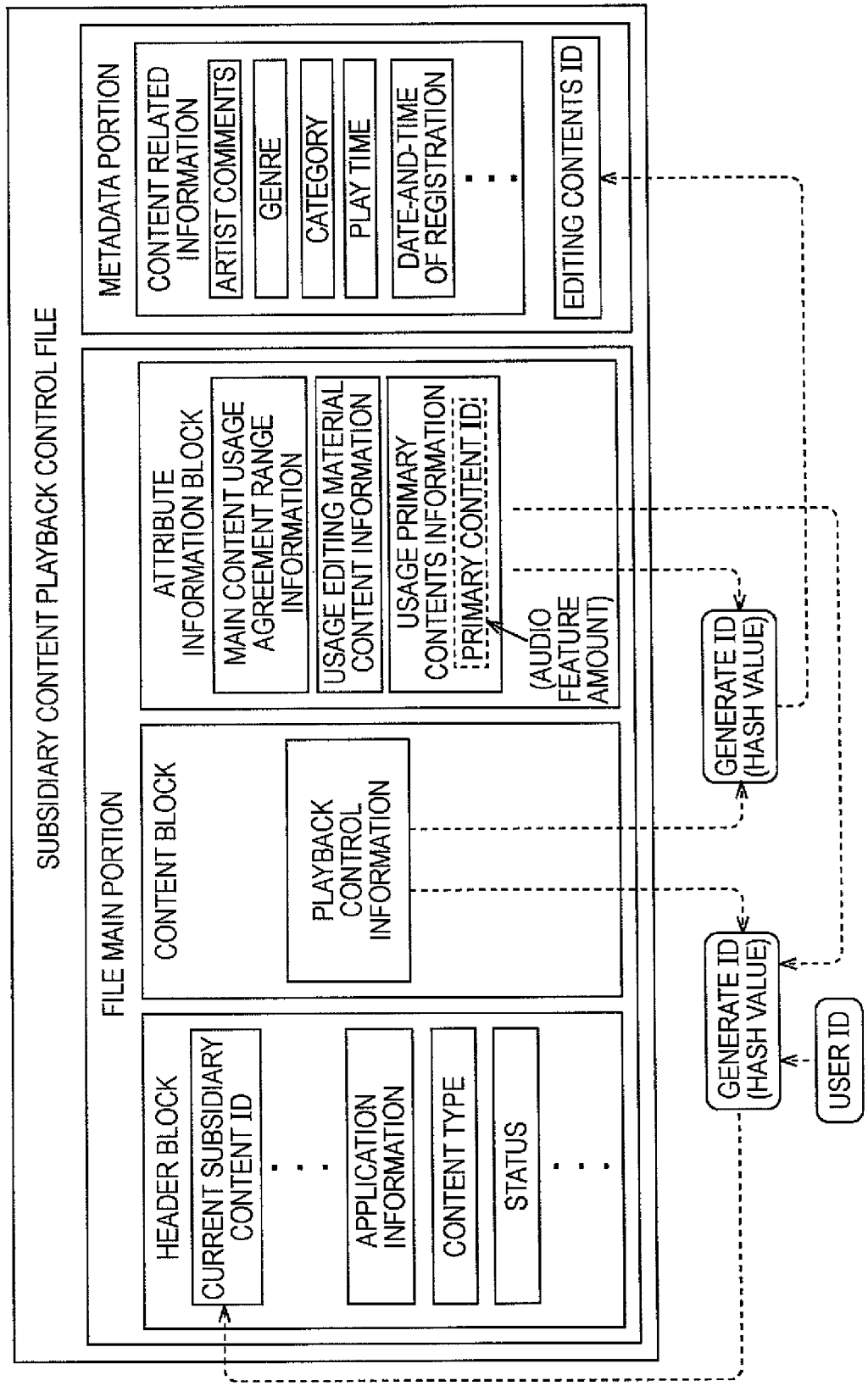

FIG. 13

| | | PRIMARY CONTENT ID | AAAAAA |
|---|---|---|---|
| UNIT FILE INFORMATION | | ARTIST NAME | - - - - |
| | | SONG NAME | - - - - |
| | USAGE AGREE-MENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |
| UNIT FILE INFORMATION | | PRIMARY CONTENT ID | BBBBBB |
| | | ARTIST NAME | - - - - |
| | | SONG NAME | - - - - |
| | USAGE AGREE-MENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM 3 | NOT PERMITTED |
| UNIT FILE INFORMATION | | PRIMARY CONTENT ID | CCCCCC |
| | | ARTIST NAME | - - - - |
| | | SONG NAME | - - - - |
| | USAGE AGREE-MENT RANGE INFORMATION | USAGE ITEM 1 | NOT PERMITTED |
| | | USAGE ITEM 2 | PERMITTED |
| | | ⋮ | ⋮ |
| | | USAGE ITEM 3 | PERMITTED |

FIG. 14

| | | | |
|---|---|---|---|
| UNIT FILE INFORMATION | PRIMARY/SUBSIDIARY CONTENT ID | | aaaaaa |
| | ARTIST NAME | | - - - - |
| | SONG NAME | | - - - - |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |
| UNIT FILE INFORMATION | PRIMARY/SUBSIDIARY CONTENT ID | | bbbbbb |
| | ARTIST NAME | | - - - - |
| | SONG NAME | | - - - - |
| | USAGE AGREEMENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM 3 | NOT PERMITTED |
| UNIT FILE INFORMATION | PRIMARY/SUBSIDIARY CONTENT ID | | cccccc |
| | ARTIST NAME | | - - - - |
| | SONG NAME | | - - - - |
| | USAGE AGREEMENT RANGE INFORMATION | USAGE ITEM 1 | NOT PERMITTED |
| | | USAGE ITEM 2 | PERMITTED |
| | | ⋮ | ⋮ |
| | | USAGE ITEM 3 | PERMITTED |

FIG. 15

[
file_id = AAAAAA
time = 00:00 - 00:10
position = vv - zz
]
[
file_id = AAAAAA
time = 00:10 - 00:15
position = ss - tt
]
[
file_id = BBBBBB
time = 00:15 - 00:20
position = pp - uu
]
⋮

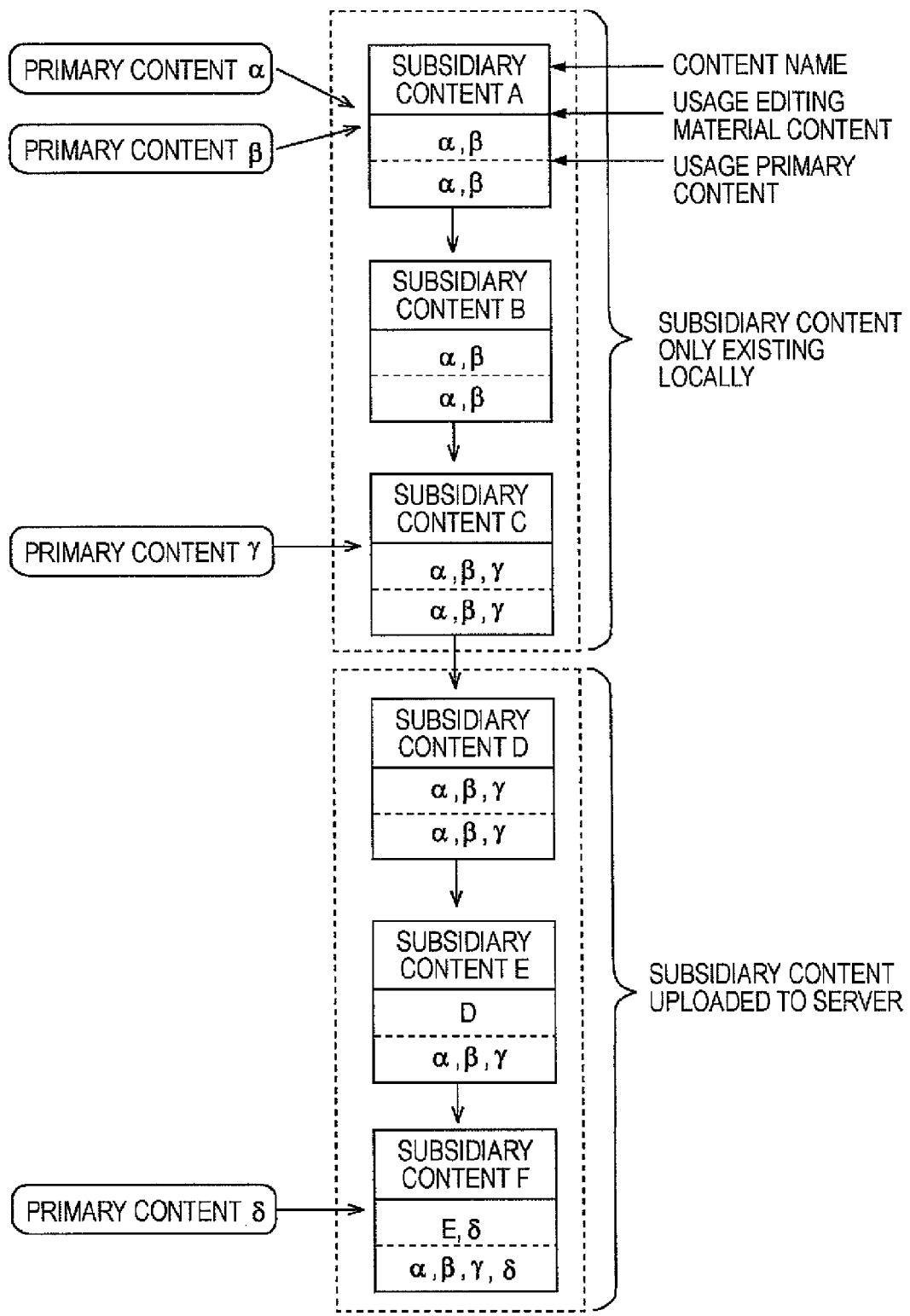

INFORMATION PROCESSING TERMINAL DEVICE, INFORMATION PROCESSING DEVICE, INFORMATION PROCESSING METHOD, AND PROGRAM

CROSS REFERENCES TO RELATED APPLICATIONS

This application is a continuation of and claims the benefit under 35 U.S.C. §120 of U.S. patent application Ser. No. 12/247,606, titled "INFORMATION PROCESSING TERMINAL DEVICE, INFORMATION PROCESSING DEVICE, INFORMATION PROCESSING METHOD, AND PROGRAM," filed on Oct. 8, 2008, which claims the benefit under 35 U.S.C. §119 of Japanese Patent Application JP 2007-273918, filed on Oct. 22, 2007. The entire contents of these applications are hereby incorporated by reference in their entireties.

BACKGROUND OF THE INVENTION

1. Field of the Invention

The present invention relates to an information processing terminal device making up an information processing system arranged such that music distribution or file sharing or the like, for example, can be performed over a network, and to an information processing device functioning as a server for example. The present invention also relates to an information processing method for these information processing terminal device and information processing device, and a program which these information processing terminal device and information processing device execute.

2. Description of the Related Art

As for one form of network usage, so-called content distribution has widely come to be performed. For example, with an audio content distribution system, distributed audio contents are tunes or the like of artists or the like for example, and digital audio data serving as the audio contents is saved and managed at a server. For example, a user having an information processing terminal device such as a personal computer installs application software (client software) having a client function corresponding to content distribution. Upon having gone through proper purchasing procedures and so forth for example, operating the client software downloads the audio data serving as the desired audio content from the server. The data serving as audio content that has been downloaded in this way is normally managed by being stored and saved in a storage device within the information processing terminal device by the client software. Subsequently, the user can listen to and enjoy this as sound, by performing an operation at the client software for playing the audio data serving as the audio content stored in the information processing terminal device.

On the other hand, there is application software (editing software) capable of taking in audio data and video data and the like as material, so as to be modified, edited, and a new tune can be created, and in recent years in particular, there is widespread use thereof, from that which is easy to operate to complicated, with not only professionals in music production or the like, but also common users who do not have a serious music career.

As described above, such editing software can execute processing for changing actual data (audio/video data and so forth) serving as contents, for editing thereof. Accordingly, in the case of audio for example, modifying and editing or the like by taking in a part of an already-existing tune as material, such with as so-called sampling, mash-ups, and so forth, can be easily performed. In fact, many tunes created by such techniques have been released by professional musicians or the like, for example. Description of such related art can be found in Japanese Unexamined Patent Application Publication No. 2004-310464 and Japanese Unexamined Patent Application Publication No. 2006-18753.

SUMMARY OF THE INVENTION

With a background such as described above, it can be thought that there would be a considerable number of common users who desire not only to simply view and listen to and enjoy the data of contents obtained by downloading using content distribution, but also creating new works by performing secondary editing using editing software, and publicly presenting the work. However, in the case of a general user not having a serious musical career for example, it would be quite troublesome to find a venue to present the contents, and to further release one's own works there, and also it can be conceived that many feel that the threshold is too high and actually hold back. Such a situation can be conceived as being a hindrance to many more people enjoying music production.

Accordingly, the present invention proposes configuring a system whereby general users for example can perform secondary use of distributed content data and perform editing to create subsidiary contents, and can publicly present contents created in this way, in a more convenient and casual manner, and thereupon, a technique configuration whereby content management therein is more efficient.

According to an embodiment of the present invention, an information processing device includes: a communication unit for executing communication via a network; a primary content information acquiring unit for acquiring primary content information having data for reproducing the contents of a substantive content serving as a primary content; a primary content information holding managing unit for holding and managing primary content information acquired by the primary content information acquiring unit, in correlation with a primary content identifier arranged to be unique in accordance with the contents of the substantive content; a subsidiary content information holding managing unit for obtaining subsidiary content information configured having at least playback control information formed including contents for instructing playback regarding data of a primary content information serving as original editing material, and having a subsidiary content identifier corresponding to itself and an editing history identifier, with each subsidiary content being managed correlated with a unique subsidiary content identifier; an editing processing unit for executing editing processing with secondary usage of at least one of primary content information held and managed by the primary content information holding managing unit, and subsidiary content information held and managed by the subsidiary content information holding managing unit; a subsidiary content information creating unit for creating subsidiary content information which is content information having new contents of content, based on the results of editing processing by the editing processing unit; an editing history identifier managing unit for generating the editing history identifier at the terminal device so as to be unique in accordance with editing history obtained as the result of editing processing by the editing processing unit, and providing the generated editing history identifier to subsidiary content information created by the subsidiary content information creating unit; and a subsidiary content identifier managing unit for generating a subsidiary content identifier to be correlated with subsidiary content information created by the subsidiary content information creating unit, based on the results of editing processing by the editing processing unit, and providing the generated subsidiary content identifier to subsidiary content information created by the subsidiary content information creating unit.

With the above configuration, primary content information and subsidiary content information can be acquired and locally held and managed by the information processing terminal device. Editing processing can be then performed using the primary content information and subsidiary content information held in this way, to further create new subsidiary content information. The subsidiary content information created in this way is arranged to be playback control information including the contents of instructions of playback regarding the data which is the substantial content contents which the primary content information which is the original editing material has. That is to say, the actual entity of the subsidiary content information in the present invention is none other than the playback control information, and is not that where the data itself of the primary content information which is the primary editing material has been changed. Based upon this, the information processing terminal device generates, at the time of creating new subsidiary content information, a subsidiary content identifier thereof, and an editing history identifier, and provides these identifiers to the new subsidiary content information.

Now, an editing history identifier is made to be unique in accordance with the editing history obtained as the result of editing processing by the editing processing unit. This means that while the subsidiary content identifier is unique for each subsidiary content information, the editing history identifier should be the same as long as the editing history is the same, even if each are different as subsidiary content information. That is to say, with the present invention, the sameness (approximation percentage) of editing history between subsidiary content information can be determined by the editing history identifiers.

Also, according to an embodiment of the present invention, an information processing device includes a communication unit for executing communication via a network; a storage unit for storing at least subsidiary content information configured having at least playback control information formed including contents for instructing playback regarding data for reproducing contents of substantive content in a primary content information serving as original editing material, and also having a subsidiary content identifier corresponding to itself and an editing history identifier unique in accordance with the editing history of a corresponding subsidiary content; and a deletion control unit for, in the event that deletion regarding subsidiary content information stored in the storage unit has been instructed, generating sub-subsidiary content information configured of at least the subsidiary content identifier corresponding to the subsidiary content information regarding which deletion has been instructed, and the editing history identifier of the subsidiary content regarding which deletion has been instructed, and storing the sub-subsidiary content information in the storage unit instead of the subsidiary content information regarding which deletion has been instructed.

The information processing device according to the above-described configuration employs a server-like configuration for storing subsidiary content information. Based on this, at the time of deleting subsidiary content information, while the subsidiary content information itself is deleted, a sub-subsidiary content information file having the subsidiary content information identifier and editing history identifier of that subsidiary content information is stored instead. That is to say, even though the subsidiary content information is deleted, the deleted subsidiary content can be uniquely identified by the subsidiary content information, and further, information regarding what sort of editing history there has been is left remaining by the editing history identifier. This means that already-deleted subsidiary content can be included in predetermined management relating to editing history.

Thus, the present invention is capable of performing management of contents relating to editing history, such as determination of sameness (approximation percentage) regarding the editing history of subsidiary content information, in a more sure manner, and accordingly, the convenience, management efficiency, and so forth, of the system handling subsidiary contents will improve.

BRIEF DESCRIPTION OF THE DRAWINGS

FIG. 6 is a diagram illustrating an internal configuration example of a primary content server;

FIG. 7 is a diagram illustrating an internal configuration example of a subsidiary content server;

FIG. 12 is a diagram schematically illustrating a configuration example of a subsidiary content playback control file;

FIG. 13 is a diagram illustrating a configuration example of usage primary content information in the subsidiary content playback control file;

FIG. 14 is a diagram illustrating a configuration example of usage editing material content information in the subsidiary content playback control file;

FIG. 15 is a diagram illustrating an example of the content of playback control information, in the subsidiary content playback control file;

FIG. 30 is a diagram for describing control of usage editing material content information at the time of creating subsidiary content, which is executed by the music editing/sharing application (content managing/editing tool).

DESCRIPTION OF THE PREFERRED EMBODIMENTS

Figure 1:
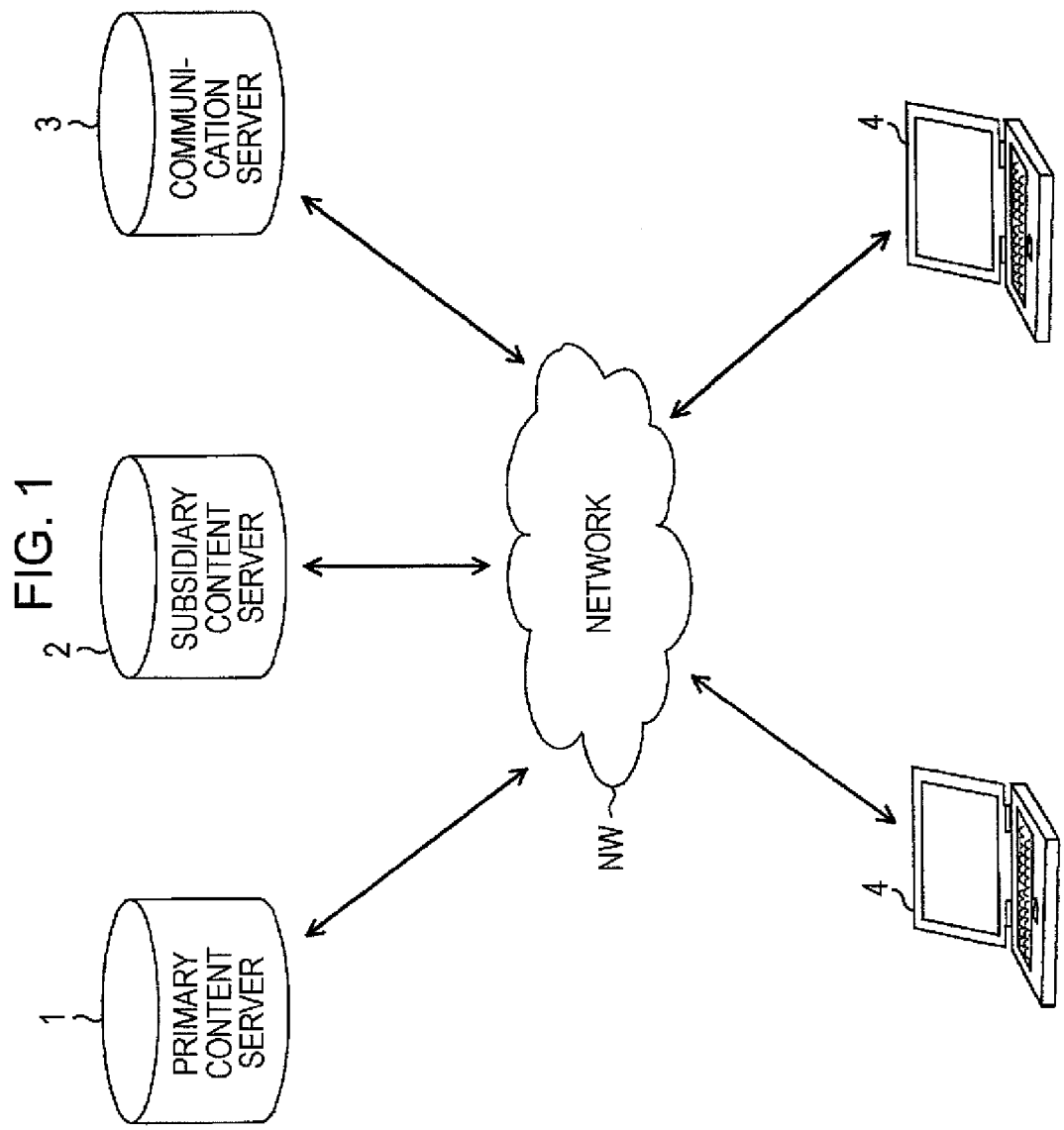
FIG. 1 is a diagram illustrating a configuration example of a music editing/sharing system corresponding to an embodiment of the present invention.

FIG. 1 illustrates a basic configuration example of an information processing system according to an embodiment of the present invention. Note that this basic system configuration illustrated in the drawing is configured of terminal devices and servers which can be viewed as directly relating to usage of service by users. A system according to an actual embodiment takes a configuration further having servers relating to ID management and the like, as compared with the basic system configuration shown in this drawing, but this point will be described later.

As shown in this drawing, the information processing system according to the present embodiment can first be viewed as being formed by connecting a primary content server 1, a subsidiary content server 2, a communication server 3, and a great number of user terminal devices 4, connected by a network NW. The information processing system according to the present embodiment realizes a music distribution/sharing system by such a basic device configuration. That is to say, so-called music distribution (distribution of primary contents) and sharing of contents created by users (subsidiary contents) among users, on a network, are realized.

The primary content server 1 stores and manages in a database a great number of audio content data, in a predetermined format, as primary contents. The primary content server 1 is configured so as to externally transmit audio data which is specified primary contents to the requesting user terminal devices 4, in response to download requests from the user terminal devices 4 via the network.

Note that the audio data in the form of primary contents in the example here is, tunes or the like which artists and the like have played, provided from an affiliated record label. Additionally, original tunes created by general users and so forth, are also included as the contents.

The subsidiary content server 2 is capable of storing and managing a great number of subsidiary content playback control files which is data serving as subsidiary contents, in a database. As described later, a subsidiary content playback control file is uploaded from a user terminal device 4 to the subsidiary content server 2 via the network. The subsidiary content server 2 stores the subsidiary content playback control file uploaded in this way, handling as subsidiary contents. Also, a specified subsidiary content playback control file is transmitted and output to a requesting user terminal device 4, in response to a download request from the user terminal device 4 via the network.

The communication server 3 is a server having functions for providing inter-user communication services, such as for example, SNS (Social Networking Service), services for individuals to put information out which is also widely recognized as CGM (Consumer Generated Media) such as blogs, and so forth.

A user terminal device 4 is a network device which a general user uses, and actually is a personal computer provided with network communication functions such as LAN or the like, for example. These user terminal devices 4 have installed an application program serving as a music editing/sharing application 100, as described later. The user operates this music editing/sharing application 100, and thus is enabled to perform such as downloading primary contents from the primary content server 1, creating new subsidiary content due to editing work based on the downloaded primary content (and subsidiary content), uploading the created subsidiary content (i.e., a subsidiary content playback control file) to the subsidiary content server 2, downloading subsidiary content (subsidiary content playback control file) from the subsidiary content server 2, using SNS services, writing/browsing blogs using the communication server 3, and so on.

Next, an example of basic operations of the information processing system according to the present embodiment assuming the configuration shown in FIG. 1 described above, will be described with reference to FIG. 2, following a basic usage form example by a user of a user terminal device 4. Note that in the description in FIG. 2, description will be made following the numbers of procedures and operations indicated by alphanumeric characters in the brackets [ ]. Also, here, user terminal devices 4A and 4B are shown as being used by two users A and B, respectively, as user terminal devices 4. In this drawing, the network NW which exists between the primary content server 1, subsidiary content server 2, communication server 3, and user terminal devices 4 is omitted from the drawings.

Procedure 1

First, the user A searches the user terminal device 4A (music editing/sharing application 100) for primary contents which the user wants to download, and performs operations for downloading the searched primary contents. In response to this operation, the user terminal device 4A transmits a download request to the primary content server 1.

Now, we will say that with the music distribution/sharing system according to the present embodiment, there are cases wherein the downloading of primary contents is charged for, and cases of being free. In the case of being charged for, the user A performs proper purchasing procedures at the time of transmitting a download request to the primary content server 1. As far as purchasing procedures go, for example, this may be payment procedures for charges set individually in increments of tunes or in increments of albums, or may be subscriptions. Also, in the event that primary contents are provided free of charge, there are no purchasing procedures for the user A.

Upon receiving a download request as described above, the primary content server 1 first performs authentication regarding the requesting user, confirmation of payment of charges (in the case that the tune download is charged for) and so forth, and determines whether or not this is a legitimate download request. In the event that determination is made that this is a legitimate download, the primary contents specified at the time of the download request are searched for from the primary contents stored within itself, and data serving as the searched primary contents (primary content data) is set out to the requesting user terminal device 4. Note that the actual entity of the primary content which the primary content server 1 stores while managing in a database here is of a file structure wherein a main portion (main portion information) of audio data of a predetermined format having contents of a tune serving as the primary content (data for reproducing the substantial contents which are in the form of primary contents), includes various types of metadata related thereto (tune title, artist, title of album to which tune belongs, genre, data format, data size, etc.). That is to say, in the description of the present embodiment, we will say that the primary content data is of a structure wherein the digital audio data whereby the content of the tune can be obtained by performing audio playback output is the main constituent.

The primary content data sent out from the primary content server 1 as described above is received at the user terminal device 4A. The user terminal device 4A (music editing/sharing application 100) stores and saves this received primary content data in a storage medium such as an internal HDD or the like. The music editing/sharing application 100 has functions for managing the primary content stored and saved in this way according to a predetermined form based on the metadata for example, and executing playback control in accordance with user operations.

Thus, with this arrangement, primary content data stored in the primary content server 1 can be downloaded to user terminal devices 4. That is to say, for procedure (operation) 1, so-called music distribution is performed.

Note that the primary content data stored and saved at the user terminal device 4A can be played by the music editing/sharing application 100, and listened to with an audio device connected to the user terminal device 4A, for example.
Procedure 2

Now, generally, with music distribution via network, usage following downloading is restricted to use such as playback, with a certain level of copy restrictions of digital audio data being provided. In other words, a user who has obtained audio contents by downloading is normally only permitted usage within a certain range, and is not provided with rights to create tunes as secondary creations by performing editing based on the obtained audio contents that have been acquired, for example.

In comparison to this, with the present embodiment, the primary content is audio content regarding which using as material for secondary creation within a range set beforehand (secondary usage, secondary editing) has been permitted, as a matter of principle. Note that secondary usage of the primary content in the present embodiment is set within the range of rights which the writer of the tune as the primary content has authorized.

The music editing/sharing application 100 is capable of creating audio contents as a new tune, by executing editing processing in accordance with user operations to perform secondary usage of the primary contents managed in itself (stored and saved) as editing material. Also, at the time of editing such audio contents for example, plug-in data corresponding to predetermined special effects provided at an effect database 7 can be obtained, and editing performed using this. Also, in the same way, audio material provided at a material database 8 can be obtained, and editing performed by adding this. Note that the effect database 7 and material database 8 may be situated on a network, or may exist locally on the user terminal device 4A.

Also, here, audio contents created in this way is distinguished from primary contents by being called subsidiary content. As for the procedure (operation) 2, a certain subsidiary content is created by operating operations as to the user terminal device 4A on which the music editing/sharing application 100 is running.

Note that the actual entity of the data serving as the subsidiary content created by this procedure (operation) 2 is not the digital audio data having the tune content as with the primary content, but rather is generated with playback control information as the main constituent thereof. That is to say, this is playback control information describing specifications of effects (special effects), such as instructions of what portion of the digital audio data serving as the secondarily used audio contents (editing material contents) is to be played and output at which timing.

Figure 3:
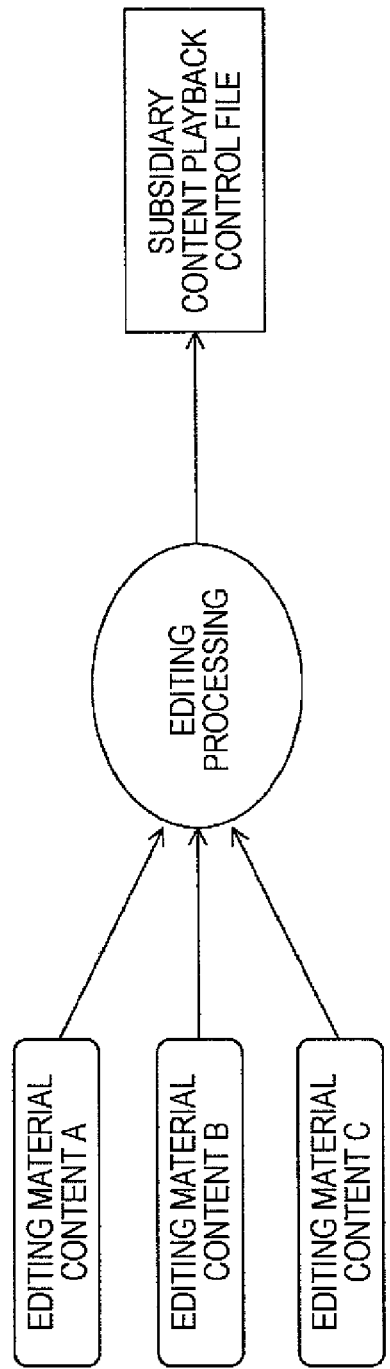
FIG. 3 is a diagram schematically illustrating the flow of subsidiary content creation which a user terminal device according to the embodiment executes.

That is to say, as for the flow of secondary editing with the music editing/sharing application 100, as schematically illustrated in FIG. 3, the editing material contents A, B, and C which are objects of secondary use are used, and subsidiary content playback control information made up of playback control information, rather than being made up of audio data, is created and output, as the results of editing processing having been performed in accordance with user operations.

The subsidiary content data serving as this playback control information (i.e., the subsidiary content playback control information) can be made markedly smaller in data size as compared to audio data, for example. Accordingly, the storage capacity of the storage medium such as the HDD or the like to store the subsidiary content data at the subsidiary content server 2 can be conserved and effectively used. Also, the amount of transmitted data is smaller at the time of transmission/reception of the subsidiary content data on the network, and accordingly does not make traffic heavier, for example.

Performing editing with already-existing tunes as material, as with the secondary editing with the present embodiment, to create a secondary work as a new tune is called sampling, mash-up, and so forth, with professional musicians and the like also often performing this. In light of such, it is naturally conceivable that there is desire and demand of general people to create tunes as secondary works in the same way. However, in reality, it is extremely difficult for general people to create tunes as secondary works upon having properly cleared copyright issues.

Accordingly, as for the music distribution/sharing system according to the present embodiment, an attempt has been made to increase the entertainment nature for the user, by first enabling general users to legally perform secondary editing using distributed tunes.

To this end, the primary content has been positioned as audio contents regarding which a user which has downloaded (purchased) is permitted to use secondarily in the range of rights which the copyright holder has authorized. That is to say, the music distribution service with the primary content server 1 according to the present embodiment is for distributing audio contents regarding which secondary usage has been proactively permitted.

Procedure 3

The subsidiary content playback control file serving as the subsidiary content created by the user A as described in Procedure 2 above is saved only at the user terminal device 4A, with processing being performed by the playback functions of the music editing/sharing application 100 as described later with FIG. 4, and audio of the tune contents can be played as the subsidiary content.

With this in mind, the present embodiment further enables users who have the services of the music editing/sharing application 100 according to the present embodiment to share the subsidiary contents created by users, by making public on a network.

Let us say that the user A desires to share subsidiary contents created by the above Procedure 2. Accordingly, the user A performs predetermined operations as to the music editing/sharing application 100, so as to upload the subsidiary contents created by the Procedure 2 to the subsidiary content server 2. This is Procedure 3.

As described above, the entity of the data serving as the subsidiary contents is a subsidiary content playback control file. Accordingly, by uploading a subsidiary content as this Procedure 3, the user terminal device 4A (music editing/sharing application 100) transmits and outputs a subsidiary content playback control file along with an upload request.

Procedure 4

Upon receiving the upload request as described above, the subsidiary content server 2 saves the subsidiary content playback control file which is data serving as subsidiary content transmitted along with this request, as a principle, so as to be newly registered in a database. At this time, the subsidiary content server 2 sets the saving location thereof (e.g., represented by an address such as a URL (Uniform Resource Locator)), and then performs saving processing of the subsidiary content playback control file and registration thereof in the database.

Note that the subsidiary content server 2 has publishing functions with regard to the subsidiary content registered in the database. That is to say, the subsidiary content server 2 can publish so as to present a list of subsidiary contents registered in the database for example, in response to access from the user terminal device 4 (music editing/sharing application 100). Also, the subsidiary contents published in this way can be transmitted and output in response to download requests from the user terminal device 4 (music editing/sharing application 100), as described later.

Procedure 5

Upon saving and managing the subsidiary content playback control file as described above, the subsidiary content server 2 transmits, to the upload requesting user terminal device 4A, an address indicating the saving location of the subsidiary content (subsidiary content playback control file) that has been uploaded (saving location address), to notify the saving location thereof.

The music editing/sharing application 100 of the user terminal device 4A receives the above saving location address, and stores and saves, and manages this in a predetermined storage medium. The user A can, at any time, output the saving location address of the subsidiary content which he has uploaded by Procedure 2, by performing a predetermined operation as to the music editing/sharing application 100.

Procedure 6

The user A which has obtained the saving location address as described above can announce to other users in several ways that his own subsidiary contents have been published at the subsidiary content server 2. Procedure 6 corresponds to one of the publishing announcement methods, and is carried out by accessing the communication server 3 as shown in the drawing, and writing to his own page in an SNS, or his own blog or the like, for example, that the subsidiary contents created by himself have been published. At this time, the URL serving as the saving location address obtained in Procedure 5 is also copied in so as to be written in.

Procedure 7

Upon a user B for example operating the music editing/sharing application 100 installed in the user terminal device 4B after the user A has written in as described above with Procedure 6 and accessing and browsing the page of the user A in the SNS or the blog of the user A, he knows that subsidiary content of the user A has been newly published. That is to say, in this case, the user B has indirectly received the announcement regarding the new publishing of the subsidiary content created by the user A, via the SNS or blog. Procedure 7 indicates such indirect announcement of subsidiary content publishing being performed.

Procedure 8

Procedure 8 will be given as another way for publishing announcement. As for this Procedure 8, the user B side is notified that the subsidiary content created by the user A has been disclosed by creating and transmitting mail using a mail function provided to the SNS, for example. This is a more direct form of announcement, as compared to the announcement according to the flow of Procedure 6 and Procedure 7.

Also, in the event of announcing by e-mail and so forth in this way, the saving location address of the subsidiary content is copied into the body for example, so as to be listed.

Procedure 9

In this way, the user B can indirectly or directly receive announcement and know that the subsidiary content created by the user A has been newly published. In the event that the user B desires to listen to the subsidiary content of the user A that has been newly published, first, the subsidiary content is downloaded by the music editing/sharing application 100. This is Procedure 9.

At the time of downloading the subsidiary content, a clicking operation or the like is performed as to the saving location address shown as a link in the body of the SNS diary page or blog, for example. Note that at the time of writing to an SNS diary page or blog, in the event the address information such as a URL is written in, this text string portion is presented as a link.

In response to performing a clicking operation as to the saving location address as described above, the music editing/sharing application 100 accesses this saving location address. That is to say, of the addresses on the subsidiary content server 2, an address indicating the location where the file of the subsidiary content which the user A has created and published (subsidiary content playback control file) has been saved, is accessed. The subsidiary content playback control file saved at that saving location is then sent out to the user terminal device 4B. The subsidiary content playback control file set out in this way as received at the user terminal device 4B, and saving and management is performed under control of the music editing/sharing application 100. Accordingly, subsidiary content is downloaded.

Procedure 10

Upon the subsidiary content of the user A being saved and managed as described above, playing of the subsidiary content by the music editing/sharing application 100 of the user terminal device 4B becomes available. Procedure 10 is a procedure for playing output of the tune serving as the subsidiary content as sound, in accordance with playback instruction operations as to the music editing/sharing application 100 by the user B.

Figure 4:
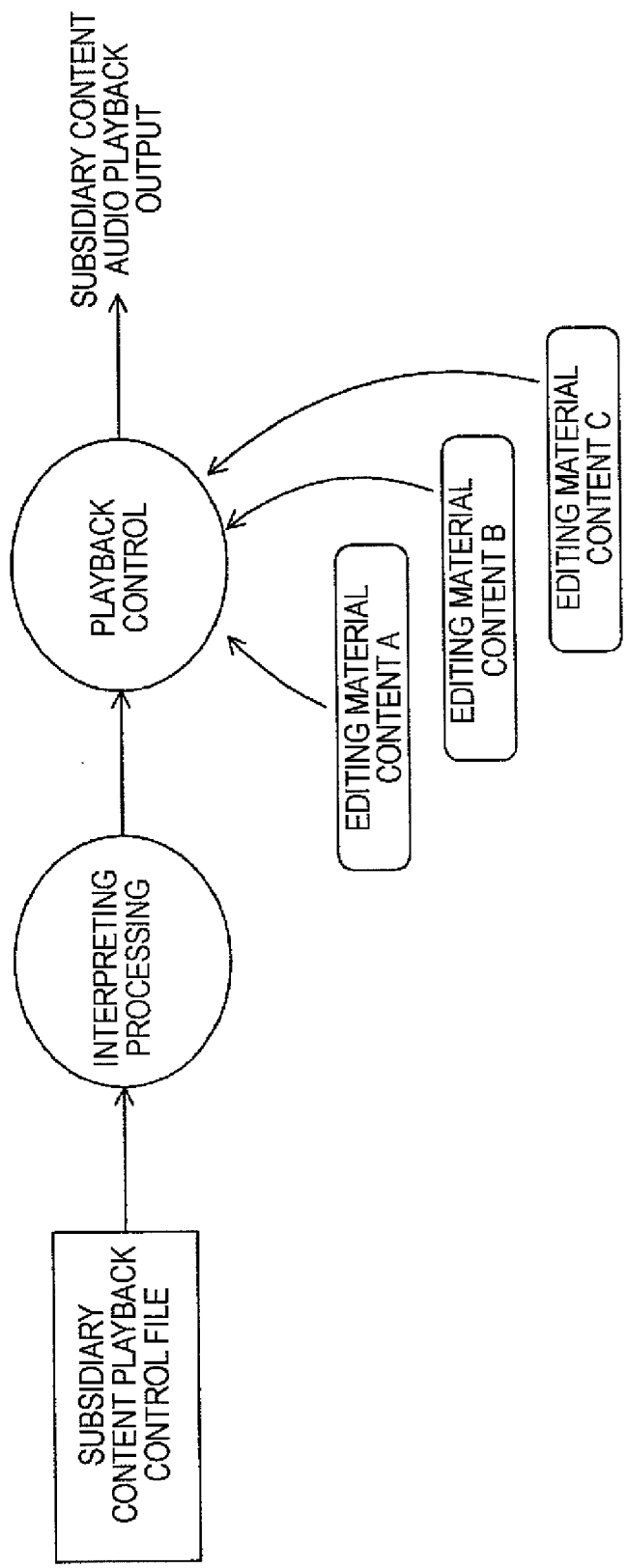
FIG. 4 is a diagram schematically illustrating the flow of subsidiary content creation which a user terminal device according to the embodiment executes.

Now, FIG. 4 shows a playback concept of subsidiary contents with the music editing/sharing application 100. At the time of playing the subsidiary content, first, the music editing/sharing application 100 interprets the subsidiary content playback control file which is the actual data. As a result of this interpretation, recognition can be made regarding at least which audio contents have been used as the editing material contents, and which portion of the editing material contents have been used in what manner at what playing time, and so forth, for example. Note that in this diagram, the audio contents of the editing material contents A, B, and C, in accordance with FIG. 3 described earlier, have been used as editing material. Following the recognition results thereof, the music editing/sharing application 100 at least uses the actual audio data serving as the editing material contents A, B, and C, to execute playback control. Consequently, the tune contents serving as the subsidiary content is played as sound (audio playback output of the subsidiary content).

According to the description of FIG. 4 above, playing of the subsidiary content uses actual audio data serving as the audio contents used in a subsidiary manner for the subsidiary content, i.e., editing material content. That is to say, in order to play subsidiary content, the actual audio data of the editing material contents has to exist at the same local location as the music editing/sharing application 100, however temporarily. Accordingly, in the event that the editing material contents are not locally saved at the time of attempting to play the subsidiary content, these should be obtained locally.

Procedure 11

Accordingly, in such a case as described above, procedures are performed for downloading and acquiring any editing material contents which are not locally available. Procedure 11 in FIG. 2 is a procedure to be performed to this end in the process of playing contents with Procedure 10.

As can be understood from the description so far, the editing material contents is actual audio data, so as a principle, the editing material contents are primary contents. Accordingly, in Procedure 11, the primary content server 1 is accessed and primary contents used for playing the subsidiary content in this Procedure 10 but not existing locally are downloaded. Due to this downloading, the editing material contents used for playing the subsidiary content all exist locally, and playback output can be properly executed as described with FIG. 4.

Note that several forms of audio data of the primary contents existing locally due to the downloading in Procedure 11 can be conceived. First, a form can be conceived wherein this is made to exist locally, in a state of being stored in saved as to an auxiliary storage device such as an HDD, in the same way as with the case of a normal download according to Procedure 1. As for another, a form can be conceived wherein this is temporarily held in a main storage device such as RAM, and is erased in response to the music editing/sharing application 100 no longer being in a state wherein the playback operation of the subsidiary content can be performed, for example. While primary contents have been described as being basically charged for, for example, operations can be conceived wherein in the case of temporary storage, these are free of charge, or fees are set cheaper than normal downloads, or the like.

Figure 2:
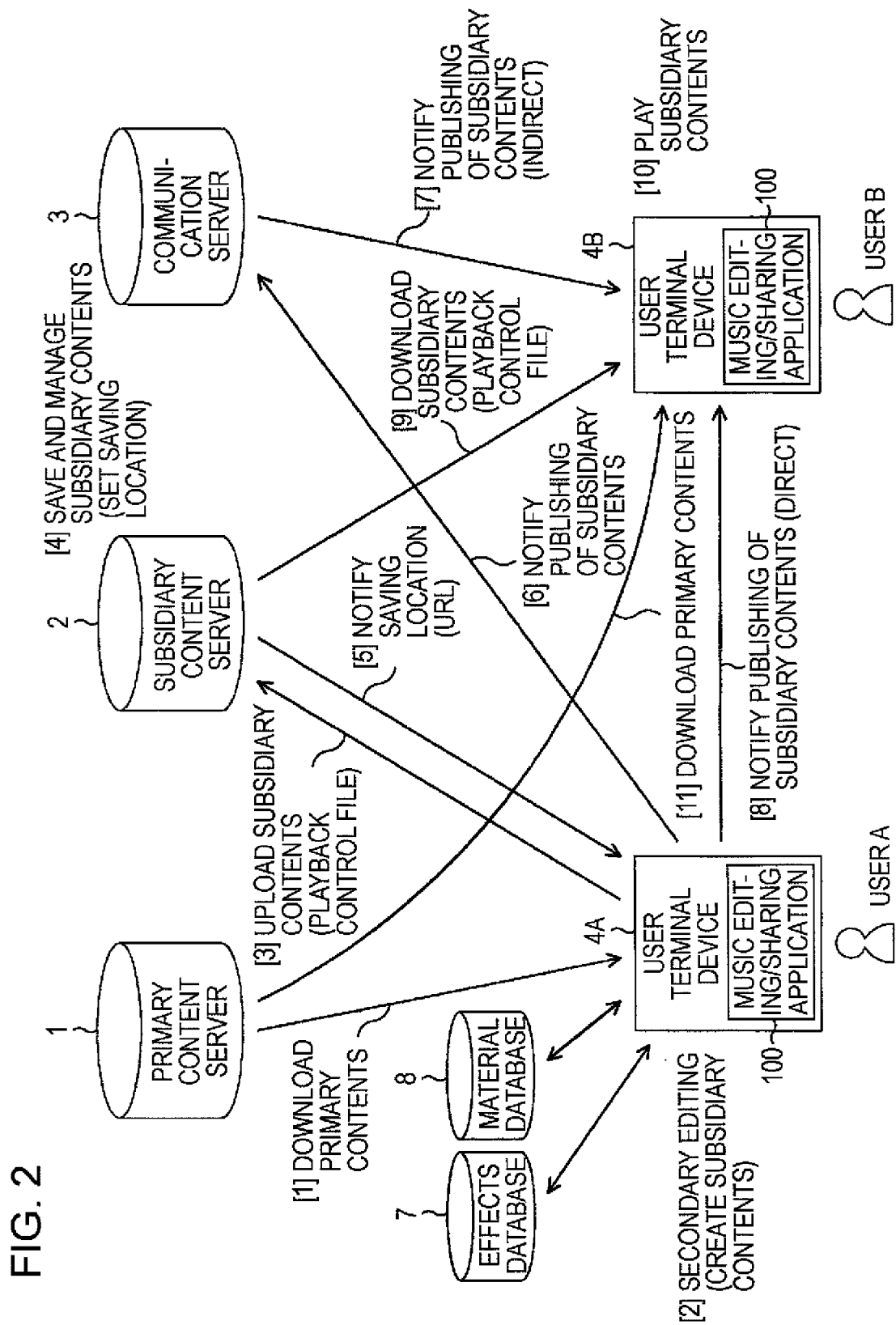
FIG. 2 is a diagram illustrating a basic usage form of a music editing/sharing system according to an embodiment of the present invention, and procedure examples of system operations corresponding thereto.

Also, according to the description of FIG. 2 above, with creating of subsidiary contents according to the present embodiment, primary contents are used as the editing material contents, but not only primary contents but also subsidiary contents can be included as the editing material contents. This point will be supplemented with reference to FIGS. 5A through 5C, which each illustrate cases of creating one subsidiary content by editing with secondary usage of two editing material contents.

Figure 5A:
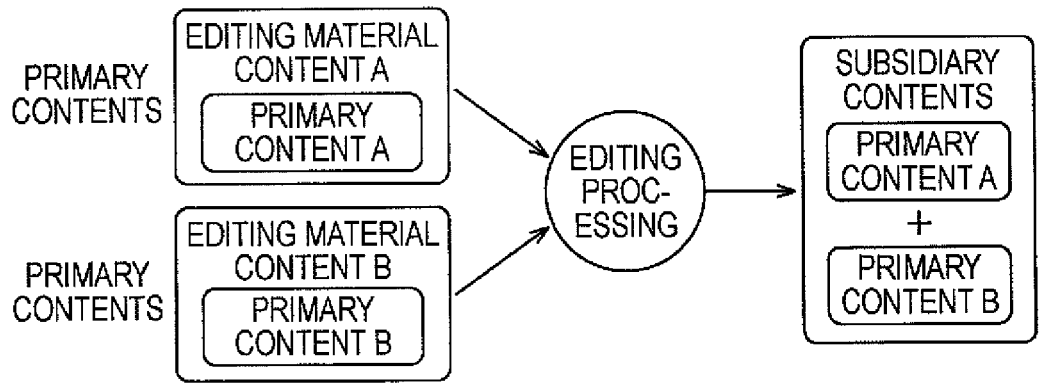
FIGS. 5A through 5C are diagrams illustrating a usage form example of editing material contents at the time of creating a subsidiary content.

First, FIG. 5A illustrates a case wherein the editing material contents A and B are each primary contents, in the same way as with the example of creating subsidiary content described with FIG. 2. That is to say, this shows a case wherein subsidiary content is created by executing editing processing with a primary content A taken as editing material content A, and a primary content B which is a different primary content taken as editing material content B. The subsidiary content in this case includes at least a part of the primary content A and primary content B as for the contents thereof, as shown in the drawing. That is to say, the primary contents A and B are used as source editing material.

Figure 5B:
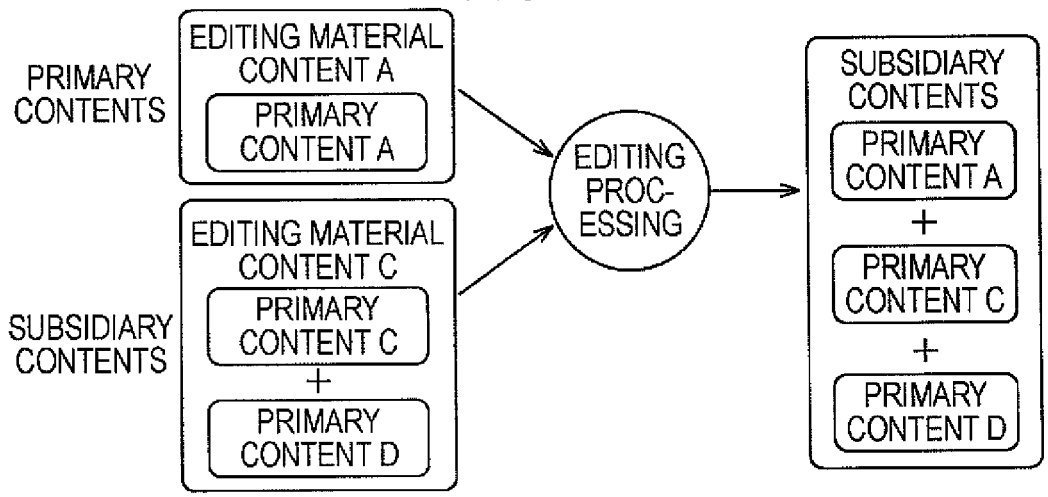

FIG. 5B illustrates creating a subsidiary content by editing with secondary usage of the editing material content A which is the same primary content as in FIG. 5A, and editing material content C which is subsidiary content created using primary contents C and D secondarily. The subsidiary content in this case includes at least a part of the primary content A included in the editing material content A, and at least a part of each of the primary contents included in the editing material content C, as for the tune contents thereof. That is to say, the primary contents A, C and D are used as the original editing material, and accordingly, in the event of playing the subsidiary content shown in FIG. 5B here, the primary contents A, C, and D should be locally situated.

Figure 5C:
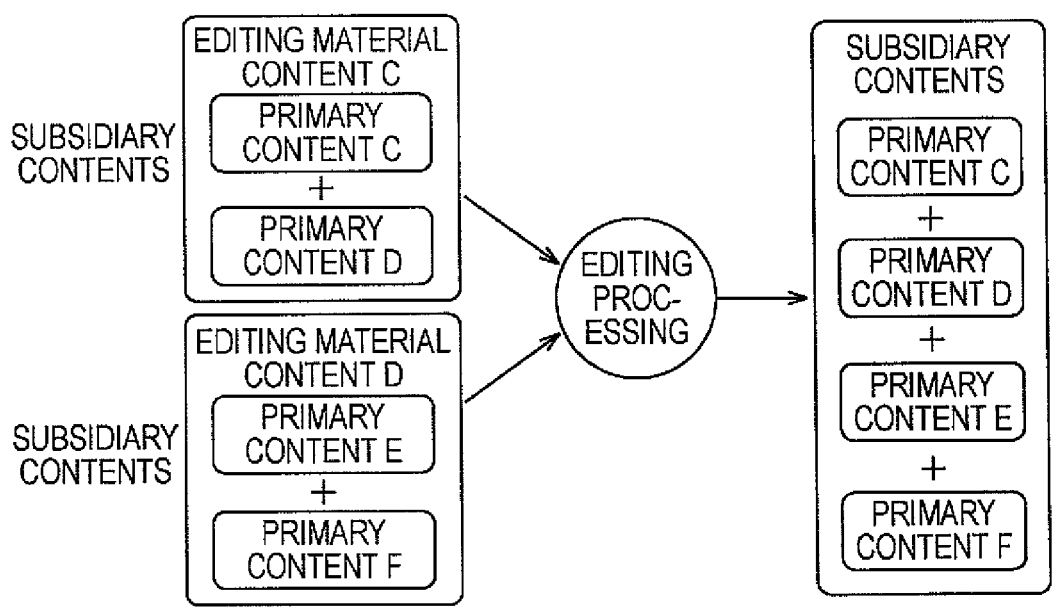

FIG. 5C illustrates creating a subsidiary content by secondary usage of the two editing material contents C and D which are subsidiary contents. The subsidiary content newly created in this case includes at least a part of each of the primary contents C and D included in the editing material content C, and a part of each of the primary contents E and F included in the editing material content D, as for the tune contents thereof. That is to say, the primary contents C, D, E, and F should be locally situated in the event of playing the subsidiary content shown in FIG. 5C.

Also, in the event of using subsidiary contents as editing material contents for creating subsidiary content as in the above FIGS. 5B and 5C, first, the user performs download for example, and stores and saves at the user terminal device 4, in order to situate the subsidiary content serving as the editing material contents locally, in the same way as with handling primary content as editing material content.

Note that as with FIGS. 5B and 5C, in a case of using subsidiary content having multiple primary contents as the editing material thereof, as editing material contents, editing using only a part of the primary contents out of the multiple primary contents making up the editing material contents used as editing material may be added to one form of editing. Specifically, in the case of FIG. 5B for example, editing may be performed wherein, for the editing material content C, only the primary content C is used of the primary contents C and D, and the other primary content D is not included in the post-editing contents. In this case, in order to play the subsidiary content newly created for example, an arrangement is sufficient wherein only the primary contents A and C of the primary contents A, C, and D exist locally.

Also, in event of the subsidiary content server 2 performing transmission of subsidiary content data in response to the download request for subsidiary content, in according with Procedure 9 in FIG. 2, the subsidiary content is encrypted. This encryption can be decrypted by an authorized music editing/sharing application 100, but the music editing/sharing application 100 is arranged to operate such that only subsidiary content data decrypted by this encryption processing is played, and subsidiary content data not encrypted to begin with for example, or subsidiary content data encrypted by another format or algorithm, is not played. That is to say, the music editing/sharing application 100 only plays that downloaded and obtained from the subsidiary content server 2 with regard to externally-obtained subsidiary content data.

Accordingly, for example, even in the event that users directly exchange subsidiary content files between user terminal devices by direct communication such as P2P (Peer-to-Peer) network communication or e-mail file attachment or FTP (File Transport Protocol) or the like, or by direct exchange using removable media, files obtained by users in this way will not play properly since there is no encryption by the subsidiary content server 2. That is to say, with the present embodiment, subsidiary content of others will not play properly unless downloaded from the subsidiary content server 2. Accordingly, with the music editing/sharing system according to the present embodiment, protection of the rights of copyright holders of the primary contents and subsidiary contents is implemented by avoiding circulation and reproduction of illegal subsidiary contents violating copyrights over the network.

As can be understood from the description in FIGS. 2 through 5C, with the music distribution/sharing system according to the present embodiment, first, primary contents are downloadable. That is to say, users can download (purchase) and listen to and enjoy tunes which they like by normal music distribution. Based on this, usage rights are set whereby secondary usage to take the primary contents as editing materials is enabled, so users can perform editing with the primary contents as materials and create their own works. Further, subsidiary contents which are works created in this cay can be publicly published using communication techniques such as SNSs and blogs and so forth. That is to say, general users can edit tunes with copyrights as material and create new audio contents (subsidiary contents) and further publicly publish the subsidiary contents, in a proper manner, which has heretofore been considered legally difficult due to problems such as copyrights and so forth.

Also, with the present embodiment, the actual entity of the subsidiary contents are formed having playback control information, formed including at least description instructing playing of primary contents which are the original editing material used by the subsidiary contents.

The music editing/sharing application 100 has playback functions of the subsidiary content, but also has editing functions for creating the subsidiary content. Accordingly, as a form of playback of the subsidiary contents, the music editing/sharing application 100 can not only execute processing for simple audio playback, but also reflect the editing history of the subsidiary content being played in the user interface of the editing function described above, for example. That is to say, as a benefit of the actual content of the subsidiary content being taken as the playback control information, the user can use the editing functions of the music editing/sharing application 100 to find out in detail how the downloaded subsidiary content has been edited.

Next, an example of a technical configuration for realizing the usage form and operations as the music distribution/sharing system according to the present embodiment described so far, will be described.

First, FIG. 6 illustrates an internal configuration example of the primary content server 1. As shown in this drawing, the primary content server 1 includes a control unit 11, a storage unit 12, an authentication processing unit 13, a search processing unit 14, a database management unit 15, a settlement processing unit 16, an encryption processing unit 17, and a network interface 18.

The control unit 11 is a member which centrally executes various types of control processing at the primary content server 1.

The storage unit 12 is configured having an HDD or the like for example, and stores a primary content database 12a. The primary content database 12a is information increments wherein audio data files serving as primary contents to be distributed have been databased. Note that audio data files serving as primary contents have a predetermined format wherein, in addition to the actual data as audio data, various types of metadata have been added.

The authentication processing unit 13 executes predetermined authentication processing regarding whether a valid user or not, in the event of a download request having been made for example, using the user ID and password and the like included in that request. Only in the event that the authentication processing results are OK is a primary content transmitted in response to the request.

The search processing unit 14 is a member which cooperates with the database management unit 15 to access the primary content database 12a and execute processing for searching for intended primary contents.

The database management unit 15 performs management with regard to the primary content database 12a. For example, in the event that new primary contents are supplied, the new primary contents are registered to the primary content database 12a which is updated in response thereto. Also, in the event of deleting primary contents, deletion of the primary contents and updating of the database correspondingly is performed in the same way.

The settlement processing unit 16 executes processing such as settlement as to payment of charges at the user side, relating to pay primary contents.

The encryption processing unit 17 is a member which executes processing for subjecting primary contents to be transmitted from the primary content server 1 to a user terminal device 4 to predetermined encryption.

The network interface 18 is a member for performing communication via the network NW, and reception of download requests and corresponding transmission of primary contents for example, are realized by the network interface 18 executing communication processing in accordance with the control of the control unit.

FIG. 7 illustrates an internal configuration example of the subsidiary content server 2. As shown in the drawing, the subsidiary content server 2 has a control unit 21, a storage unit 22, an authentication processing unit 23, a search processing unit 24, a database managing unit 25, a saving location setting processing unit 26, an encryption processing unit 27, an unsuitable subsidiary content handling processing unit 28, and a network interface 29.

The control unit 21 is a member which centrally executes various types of control processing in the subsidiary content server 2.

The storage unit 22 is configured having an HDD or the like for example, and stores a subsidiary content database 22a.

The subsidiary content database 22*a* is information increments wherein subsidiary content playback control files, which are actual data serving as subsidiary content to be published here, have been databased.

The authentication processing unit 23 executes predetermined authentication processing regarding whether a valid user or not, in the event of a download request for subsidiary content having been made for example, using the user ID and password and the like included in that request.

The search processing unit 24 is a member which cooperates with the database management unit 25 to access the subsidiary content database 22*a* and execute processing for searching for intended subsidiary contents.

The database management unit 25 performs management with regard to the subsidiary content database 22*a*. For example, in the event that new subsidiary contents (subsidiary content playback control files) are uploaded, the uploaded subsidiary contents are registered to the subsidiary content database 22*a* which is updated in response thereto. Also, in the event of deleting subsidiary contents (subsidiary content playback control files), deletion processing to this end and updating of the database corresponding to the deletion results is performed in the same way.

The saving location setting processing unit 26 executes processing relating to setting of the saving location of the subsidiary contents to be stored in the subsidiary content database 22*a*, beginning with determining of a saving location (URL) regarding the newly-uploaded subsidiary contents.

The encryption processing unit 27 is a member which executes processing for subjecting the subsidiary content data to be transmitted from the subsidiary content server 2 to a user terminal device 4 to predetermined encryption. Also, depending on the system operation, subsidiary content data may be encrypted and transmitted from user terminal devices 4 at the time of uploading subsidiary contents, and in this case, the encryption processing unit 27 is arranged to execute processing for decrypting the encryption thereof as well.

The network interface 29 is a member for performing communication via the network NW. Reception of uploaded subsidiary contents and download requests for example, and transmission of subsidiary content data corresponding to download requests (subsidiary content playback control files) are realized by the network interface 29 executing communication processing in accordance with the control of the control unit 21.

Figure 8:
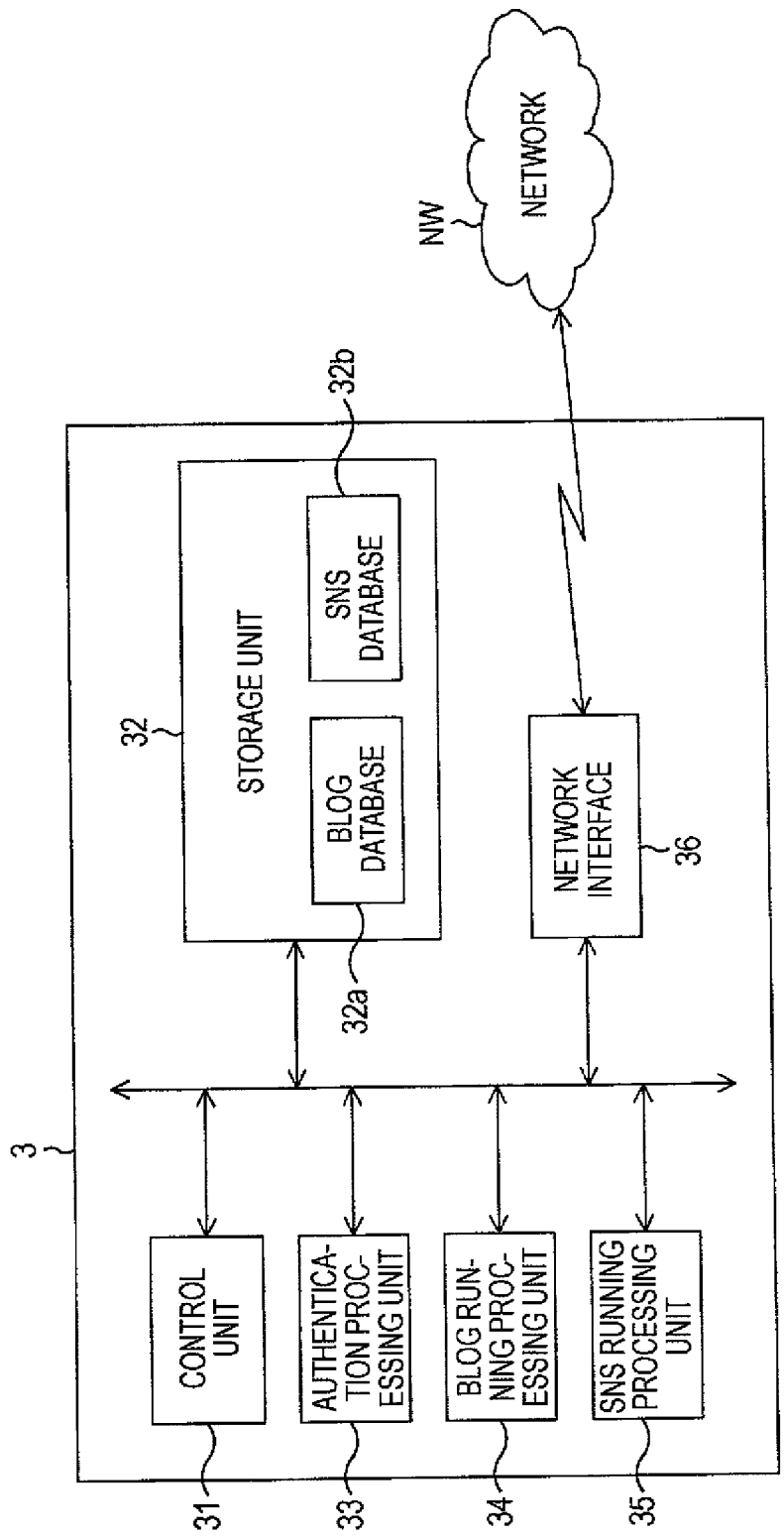
FIG. 8 is a diagram illustrating an internal configuration example of a communication content server.

FIG. 8 illustrates an internal configuration example of the communication server 3. As shown in the drawing, the communication server 3 includes a control unit 31, an a storage unit 32, authentication processing unit 33, a blog running processing unit 34, an SNS running processing unit 35, and a network interface 36. Note that the communication server 3 in this case provides communication services with blogs and SNSs.

The control unit 31 is a member which centrally executes various types of control processing in the communication server 3.

The storage unit 32 is configured having an HDD or the like for example, and stores a blog database 32*a* and SNS database 32*b*. For example, the blog database 32*a* is information increments wherein data of a blog which the user has started have been databased. The SNS database 32*b* is information increments wherein page contents and the like of each SNS user have been databased.

The authentication processing unit 33 in this case executes authentication processing in response to logins for updating blogs, requests for SNS logins, and so forth, using the user ID and password and the like included in the requests. In the event that the authentication processing results are OK, the above login is successful.

The blog running processing unit 34 executes various types of predetermined processing for properly running a blog. For example, processing is executed such as transmission of blog screen data, transmission of blog posting screens, and so forth, in response to blog access requests from user terminal devices 4, valid blog posting screen requests, and so forth. Also, processing for managing the blog database 32*a*, such as updating the blog database 32*a* such that posts to the blog are reflected, is also executed.

In the same way, the SNS running processing unit 35 executes processing for properly running an SNS, such as processing for transmission of data of a page in response to SNS page access requests and database management beginning with updating the SNS database 32*b* such that posts such as diaries are reflected, and so forth.

The network interface 36 is a member for performing communication via the network NW. This enables transmission of page data in response to access requests for blogs and SNSs, and so forth.

Note that while the communication server 3 is provided corresponding to SNSs and blogs, but separate servers may be configured for SNSs and blogs, for example. Also, a configuration may be made to provide more basic CGM related services, such personal sites and homepages, for example.

Figure 9:
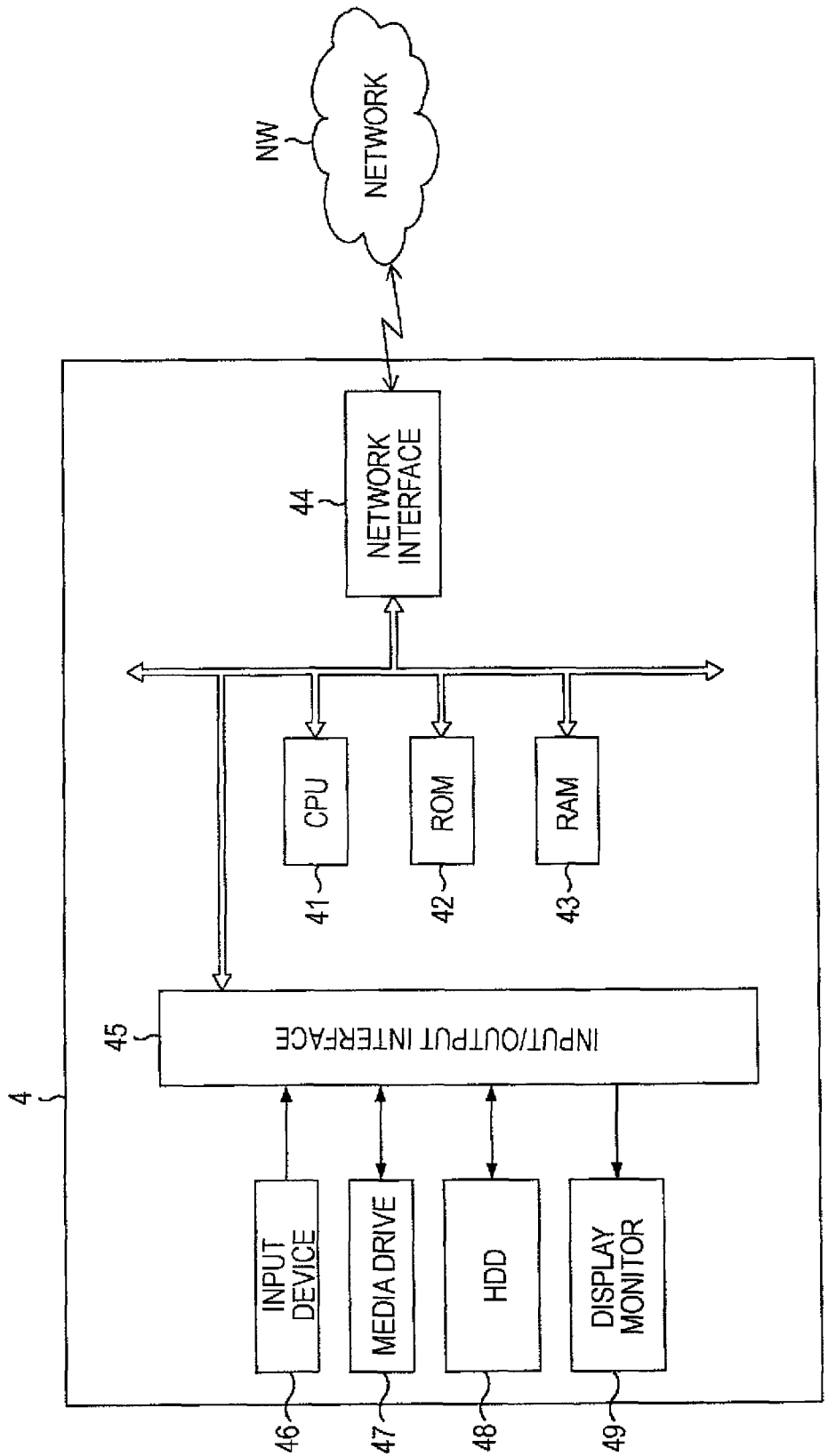
FIG. 9 is a diagram illustrating an internal configuration example of a user terminal device.

FIG. 9 illustrates an internal configuration example of the user terminal device 4. Note that in this case, the hardware serving as the user terminal device 4 is a personal computer.

First, the user terminal device 4 has a network interface 44 in order to perform communication via the network NW. Due to this network interface 44 having been provided, the user terminal device 4 can communication with, for example, the primary content server 1, the subsidiary content server 2, the communication server 3, and other user terminal devices 4 and so forth, via the network NW.

A CPU (Central Processing Unit) 41 is capable of executing various types of processing following an OS (Operating System) and various types of applications programs installed in an HDD (hard disk drive) 48 for example, and programs held in ROM 42. With the present embodiment, an application program serving as the music editing/sharing application 100 is to be installed.

RAM 43 is a work area for the CPU 41, and suitably holds data and programs and the like for the CPU 41 to execute various types of processing.

An input/output interface 45 in this case has an input device 46 which is a keyboard or mouse or the like for example connected thereto, with operation signals being output from the input device 46 being converted into signals suitable for the CPU 41 and output to the CPU 41. Also, the input/output interface 45 has a media drive 47 connected thereto. This media drive 47 is a drive device configured such that data can be recorded to and played from removable media of a predetermined format.

Also, the input/output interface 45 has connected thereto an HDD 48 having a hard disk as a storage medium. The CPU 41 is arranged so as to be able to record or read out data and programs and the like to and from the hard disk of the hard disk drive 48, via the input/output interface 45.

Also, a display monitor 49 for displaying images is also connected to the input/output interface 45.

Figure 10:
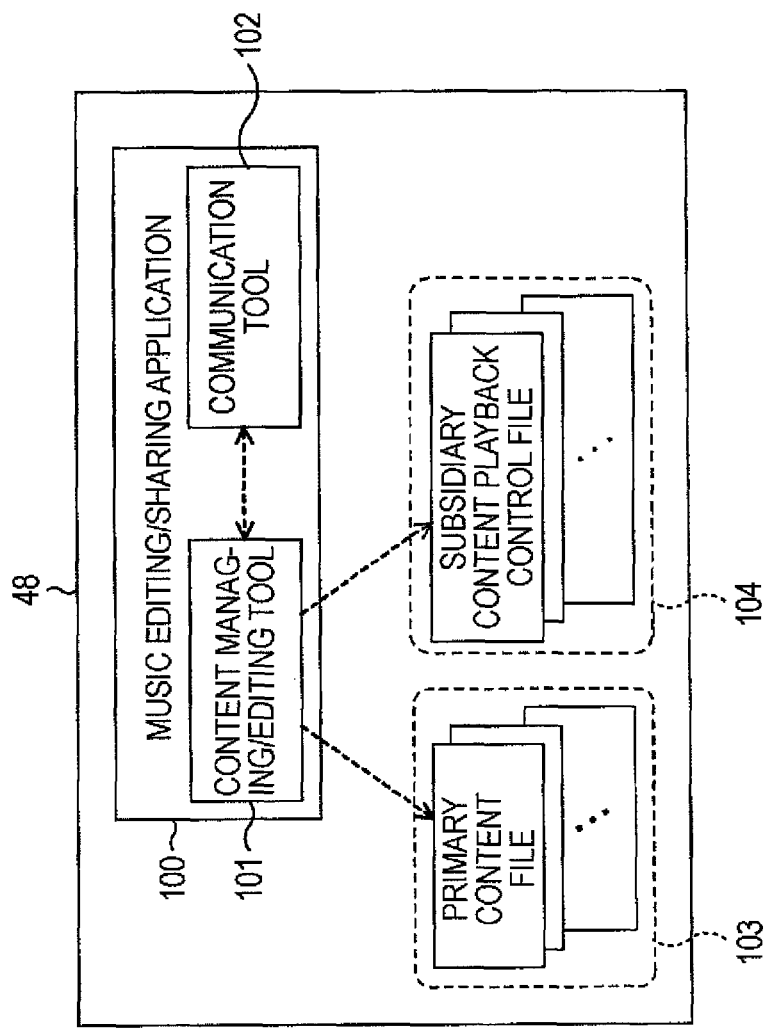
FIG. 10 is a diagram illustrating an example of information contents to be stored in an HDD of the user terminal device.

FIG. 10 illustrates a data content example stored in the HDD 48 with relation to usage of the music editing/sharing system according to the present embodiment.

As shown in this drawing, with relation to the music editing/sharing system according to the present embodiment, first, the music editing/sharing application 100 is stored as data of an application program. Note that storing of the music editing/sharing application 100 as to the HDD 48 is performed by installation processing. Also, as application files, one or more primary content files (primary content file group 103) and one or more subsidiary content playback control files (subsidiary content playback control file group 104) are stored under the control of the music editing/sharing application 100.

The music editing/sharing application 100 in this case can be viewed functionally as being generally configured of a program portion serving as a content managing/editing tool 101 and a program portion serving as a communication tool 102. The content managing/editing tool 101 is arranged to execute downloading of primary content files (configured of audio data and metadata) and subsidiary content playback control files, and file operations with regard to primary content files of the primary content file group 103 and subsidiary content playback control files of the subsidiary content playback control file group 104. Also executed are editing processing in accordance with editing operations, subsidiary content playback control file creating processing in response to editing results, and so forth. The communication tool 102 executes processing for accessing the communication server 3 and operating blogs and SNSs.

Figure 11:
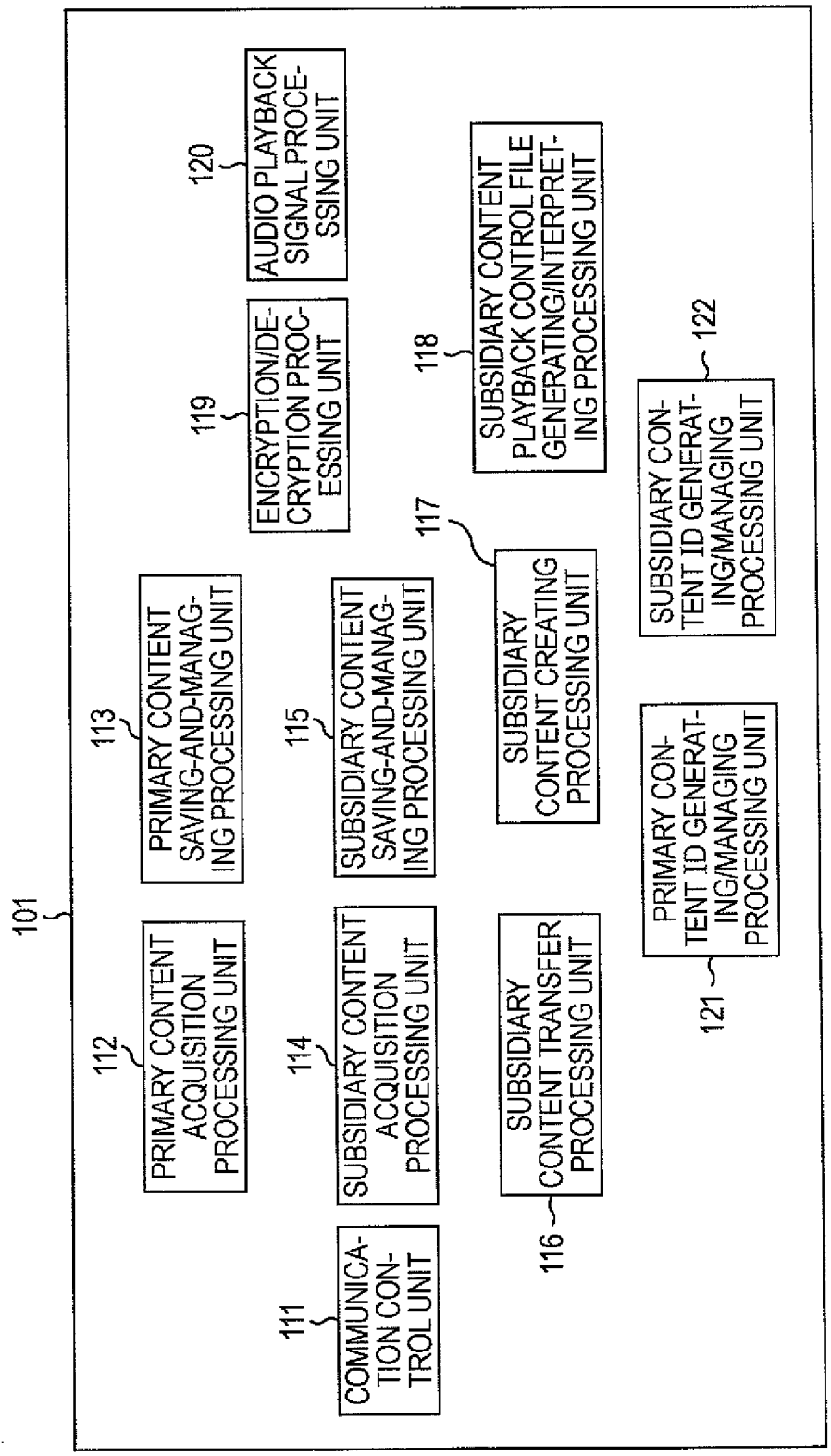
FIG. 11 is a diagram illustrating a program configuration example serving as a content editing management tool of a music editing/sharing application.

FIG. 11 is a schematic representation of the program configuration with regard to the content managing/editing tool 101 in increments of function blocks, and can be viewed of being made up of a communication control unit 111, a primary content acquisition processing unit 112, a primary content saving managing processing unit 113, a subsidiary content acquisition processing unit 114, a subsidiary content saving managing processing unit 115, a subsidiary content transfer processing unit 116, a subsidiary content creating processing unit 117, a subsidiary content playback control file generating/interpreting processing unit 118, an encryption/decryption processing unit 119, an audio playback signal processing unit 120, a primary content ID generating/managing processing unit 121, and a subsidiary content ID generating/managing processing unit 122, as shown in the drawing.

The communication control unit 111 is a member made up primarily of programs for executing communication between the primary content server 1 and subsidiary content server 2 with relation to content management/editing via the network.

The primary content acquisition processing unit 112 is a member made up of programs for downloading and acquiring primary contents. The primary content acquisition processing unit 112 provides a user interface for downloading primary contents. Also, control for issuing commands as download requests and causing transmission by the communication control unit 111, processing for receiving handover of packets of the primary content data received at the communication control unit 111 and restoring to the data format as primary contents and so forth, are also executed by this primary content acquisition processing unit 112.

The primary content saving managing processing unit 113 is a member for executing processing for saving the primary content files acquired by the primary content acquisition processing unit 112 in the HDD 48, and processing for managing the saved primary content files. For example, the primary content saving managing processing unit 113 realizes tune management such as sorting in accordance with artist name, album units, genre, and so forth.

The subsidiary content acquisition processing unit 114 is a member made up of programs for downloading and acquiring subsidiary contents.

The subsidiary content saving managing processing unit 115 is a member for executing processing for saving subsidiary content playback control files acquired by the subsidiary content acquisition processing unit 114 in the HDD 48, and processing for managing the saved subsidiary content playback control files.

The subsidiary content transfer processing unit 116 executes processing such that transfer processing for uploading subsidiary content playback control files to the subsidiary content server 2 via the communication control unit 111 is executed properly.

The subsidiary content creating processing unit 117 is a member for executing processing relating to editing using the editing material contents shown in FIG. 3, i.e., creating of tune contents serving as subsidiary contents. For example, a user interface for editing operations and so forth is also realized by this subsidiary content creating processing unit 117.

The subsidiary content playback control file generating/interpreting processing unit 118 first executes processing for generating subsidiary content playback control files in which the tune contents serving as subsidiary contents created by the subsidiary content creating processing unit 117 are reflected. Also, in the event of playing subsidiary contents, interpretation processing is executed regarding the subsidiary content playback control file shown in FIG. 4, and a playback processing sequence using the editing material contents is determined.

With the present embodiment, primary content files are encrypted and transmitted from the primary content server 1. Also, encryption is implemented at the time of transmitting subsidiary content playback control files from the subsidiary content server 2 to a user terminal device 4 (downloading). Also, there are cases of sending out with encryption in the case of uploading subsidiary content data from a user terminal device 4 to the subsidiary content server 2. The encryption/decryption processing unit 119 executes processing for decrypting encryption in the event that a primary content file or a subsidiary content playback control file that has been encrypted is used for operations for playing, editing, or the like. Also, processing for executing encryption is executed to perform encryption on the subsidiary content playback control file and transmit, if this is the case.

The audio playback signal processing unit 120 is a member for executing, in the signal processing process for playing digital audio data as audio, predetermined signal processing which should be carried out at the digital signal format stage. For example, regarding playing of a primary content file, in the event that this primary content file has been subjected to compression encoding, decoding processing corresponding to this compression encoding is performed, so as to obtain a digital audio signals with a predetermined PCM format, for example. Also, in the event of playing subsidiary contents, this executes playing processing serving as a sequencer, wherein the data portions of the primary content files serving as editing material contents are played following the sequence of playing processing determined by the aforementioned subsidiary content playback control file generating/interpreting processing unit 118.

Now, at the time of playing subsidiary contents, the results of interpretation of the playback control information by the subsidiary content playback control file generating/interpreting processing unit 118 can be reflected in an editing work screen which is a GUI provided by the subsidiary content creating processing unit 117. That is to say, the contents of playback instructions indicated by the playback control information can be displayed in a form which the user can recognized, on the editing work screen. The user can confirm in detail how that subsidiary contents was created, by viewing this. This means that how the creator created the subsidiary content can be obtained as accurate information. For example, in the case of contents in digital audio signals, in order for a general user to tell how the content has been created, only estimation can be made from the acoustic content which can be actually played and listened to. In comparison with this, in the case of the present embodiment, how the subsidiary content has been created can be comprehended in further detail and more specifically. Sharing such subsidiary content among users can be expected to markedly improve the knowledge and skill of users using the music editing/sharing system according to the present embodiment with regard to music production. The system according to the present embodiment has extremely high entertainment nature and usage value for users with interest in music production.

Also, the primary content ID generating/managing processing unit 121 executes processing for generating a later-described primary content ID, and predetermined processing relating to the generated primary content ID.

The subsidiary content ID generating/managing processing unit 122 executes processing for generating a later-described subsidiary content ID, and predetermined processing relating to the generated subsidiary content ID.

Next, a structure example of a subsidiary content playback control file will be described with reference to FIG. 12.

As shown in the drawing, a subsidiary content playback control file is generally made up of a file main portion and metadata portion. Also, the file main portion is made up of a header block, content block, and attribute information block.

First, in the file main portion, the header block is the header portion of the current subsidiary content playback control file, and accordingly primarily stores predetermined information having comprehensively significant content relating to the current file. Here, the current subsidiary content ID, application information, content type status, and so forth are shown as information stored in the header block. The current subsidiary content ID is a subsidiary content ID to be correlated to the current subsidiary content playback control file (to be provided) as an identifier for identifying the subsidiary content playback control file (subsidiary content ID).

Also, in the header block, application information is made up of predetermined information relating to the application which has created the current subsidiary content playback control file, for example. For example, this is made up of information such as the name, version, and so forth, of the application. The content type indicating which of pre-classified types the subsidiary content serving as the current subsidiary content playback control file falls under. The status is information indicating which state of predefined states the current subsidiary content playback control file is in.

At least playback control information is stored in the content block. This playback control information (content block) is true main entity information as the subsidiary content playback control file (main portion information). Information included in the regions other than the content block excluding the header block (attribute information block, metadata portion) is added information to the above main portion information.

The playback control information is information made up describing a processing sequence for playing tune contents serving as current subsidiary content, in a predetermined language. Elements of the description contents forming this playback control information include, for example, first, a description indicating primary content serving as actual audio data used for playback, description indicating a data portion to be used for actual playing subsidiary content from the audio data serving as this primary content, and description indicating the time for playing this data portion. Also, description for applying effects or special effects, such as fade-in, fade-out, overlap, equalizing (tone adjustment), playback speed rate, reverberation, delay, and so forth, for example, is performed.

Also, the attribute information block includes at least usage primary contents information, usage editing material content information, and present content usage agreement range information.

The usage primary contents information is information indicating which primary contents are used for playing the tune contents serving as the subsidiary content which is the current subsidiary content playback control file (these are the usage primary contents). In other words, this is information indicating which primary contents have been consequently used for creating the current subsidiary content.

In correlation with FIGS. 5A though 5C, the information indicating the primary contents shown as forming the subsidiary content newly created by editing processing is the above-described usage primary contents information. That is to say, in the case of FIG. 5A, the primary contents A and B are shown in the usage primary contents information, in the case of FIG. 5B, the primary contents A, B, and C are shown, and in the case of FIG. 5C, the primary contents C, D, E, and F are shown. Note that the primary content ID is used for indicating the usage primary contents in the usage primary contents information. The primary content ID is generated based on the audio feature amount, as described later.

Also, as described earlier, as for the tune contents serving as the subsidiary content created editing the editing material content, there may be a possibility that a certain primary content included in the editing material content will be deleted. With the example of the case in FIG. 5B, with the new subsidiary content obtained by performing editing using the editing material contents A and B for example, there may be a possibility that the tune contents will be that which uses the primary contents A and C as sound sources, but not using the element of the primary content D. In this case, only the primary content A and C are audio data of primary contents used for playing the subsidiary content, and the primary content D is unused.

With regard to how the contents of the usage primary content information should be corresponding to such a case, there can be conceived one arrangement wherein the contents are such that only the primary contents A and C are shown and the primary content D is not presented, based on the idea that only primary contents actually used for playing the subsidiary content should be reflected.

As for another, there can be conceived another arrangement wherein the contents are such that all of the primary contents A, C, and D are shown. That is to say, this is based on an idea wherein, in this case, while the primary content D is not actually used, there has been the influence of the tune contents serving as the primary content D to a certain extent in the process of creating the subsidiary content, and accordingly is equivalent to being used in an underlying manner. In this case, all primary contents which have been used even once up to the generation of the subsidiary content created this time are consequently included in the usage primary content information.

The usage editing material content information is information indicating which editing material contents (usage editing material contents) have been directly used for creating the subsidiary content to which the current subsidiary content playback control file corresponds. With the example in FIGS. 5A through 5C, shown in the usage editing material content information of the subsidiary content following the editing processing shown in FIG. 5A is information indicating the actual primary content files serving as the editing material contents A and B. Also, stored in the usage editing material content information of the subsidiary content following the editing processing shown in FIG. 5B is information indicating the primary content file serving as the editing material content A, and the subsidiary content serving as the editing material content C (subsidiary content playback control file).

Note that the usage editing material content information also has attached information of related predetermined contents for each of the editing material contents shown here.

The present content usage agreement range information is information of a usage agreement range set regarding the current subsidiary content. The structure and definition contents there should comply with the usage agreement range information of the configuration example of usage contents described next with FIGS. 13 and 14.

In FIG. 12, the metadata portion stores at least content related information and editing history ID.

The content related information is configured further storing metadata related to the subsidiary content to which the current subsidiary content playback control file corresponds, such as artist comments, genre, category, play time, date-and-time of registration, and so forth, as shown in the drawing, for example.

Also, as described later, the editing history ID is a value (identifier) generated so as to be uniquely decided as to the editing history of the current subsidiary content playback control file. This editing history ID can be used for determining the sameness or similarity as to the editing history of other subsidiary content playback control files, for example, as described later.

FIG. 13 illustrates a structure example of usage primary contents information. As shown in this drawing, the usage primary contents information is generally made up by linked unit file information. Each unit file information corresponds with a single usage primary content.

Information items of primary content ID, artist name, tune name, and usage agreement range information are provided with the unit file information, for example.

The primary content ID is an identifier assigned to each primary content corresponding to one tune for example, and uniquely indicates which usage primary content corresponds to that unit file information, by the primary content ID within the unit file information.

The artist name information item indicates the name of the performer or creator who has played or created the corresponding usage content.

The tune name information item indicates the tune name of the corresponding usage content.

The information of the usage agreement range (usage agreement range information) is formed of a group of one or more usage items 1 through n.

The usage items 1 through n are assigned such that predetermined usage contents related to editing correspond to each. Examples of usage contents to be appropriated to usage items which can be conceived include the following. Contents relating to whether or not secondary usage of the present content is permitted Contents relating to using contents of another artist from the present contents, with regard to other contents to be used as editing material Contents relating to using contents of another album from that to which present contents belong, with regard to other contents to be used as editing material Contents relating to using particular effects and special effects Contents relating to using particular plug-in modules Extracting a part from the entire tune and using as editing material Permission contents relating to extracted audio data portion in the event of extracting a part from the entire tune and using as editing material Number of usable generations (for example, in the event of permitting use for two generations, i.e., up to the grandchild generation, as primary content, child subsidiary content using this primary content and grandchild subsidiary content using the subsidiary content can be created, but editing of the grandchild subsidiary content is not permitted with regard to the portion using the corresponding usage contents)

Contents relating to number and type of contents regarding which secondary use can be performed in combination with the present content Information indicating contents relating to usage authorization set for each usage item, beginning with permitted/not-permitted for example, is described for each of the these usage items. As for the information of the usage agreement range, generalizing the usage setting contents described for each of these usage items indicates the usage agreement range for the corresponding usage primary content.

FIG. 14 illustrates a structure example of usage editing material contents information. As shown in the drawing, the structure of the usage editing material contents information in this case confirms to the structure of the usage primary content information shown in FIG. 13. However, in the case of usage editing material contents, there are cases of being primary contents, and cases of being subsidiary content. Accordingly, in the event that the corresponding content is a primary content, the primary content ID of the primary content is stored in the ID region for the increment file information, and if a subsidiary content, a subsidiary content ID which is the ID of the subsidiary content is stored.

Note that distinction of primary content ID and subsidiary ID can be determined based on a format defined regarding each ID, for example. As one example, an arrangement may be conceived wherein ID type identification information (or information equivalent thereto) indicating whether the ID is a primary content ID or subsidiary content ID is stored in a predetermined position in the data string making up each of the primary content ID and subsidiary content ID, so as to be determinable by this ID type identification information. Or, in the event that the size of the primary content ID and subsidiary content ID differ, determination may be made based on the difference in size thereof.

FIG. 15 illustrates an example of contents of playback control information in a subsidiary content playback control file.

In this drawing, the description portion between the brackets [ ] indicates the playback control content of sections temporally consecutive, using one primary usage content (section playback control content).

An example of playback control content of a usage primary content unit shown in FIG. 15 will be described.

First, as for the section playback control content shown at the head in the drawing, [file_id=AAAAAA; time=00:00-00:10; position=vv-zz] is described. This specifies that the usage primary content is specified by the primary content ID=AAAAAA, and that the play time of the current subsidiary content using this usage primary content is 00:00 (start time)—00:10 (play time 10 seconds), and that the data section of the usage primary content used during this play time is a range corresponding to address vv through address zz.

For the subsequent section playback control content, [file_id=AAAAAA; time=00:10-00:15; position=ss-tt] is described. This specifies that the usage primary content is specified by the primary content ID=AAAAAA, and that the play time of the current subsidiary content using this usage primary content is 00:10-00:15, and that the data section of the usage primary content used during this play time is a range corresponding to address ss through address tt.

For the subsequent section playback control content, [file_id=BBBBBB; time=00:15-00:20; position=pp-uu] is described. This specifies that the usage primary content is specified by the primary content ID=BBBBBB, and that the play time of the current subsidiary content using this usage primary content is 00:15-00:20, and that the data section of the usage primary content used during this play time is a range corresponding to address pp through address uu.

For example, the audio playback signal processing unit 120 of the music editing/sharing application 100 according to the present embodiment thus sequentially interprets the playback control contents of the usage content units in the brackets [ ], and executes actual playback control in accordance with the interpretation results, thereby playing and outputting the subsidiary content as audio signals.

Figure 16:
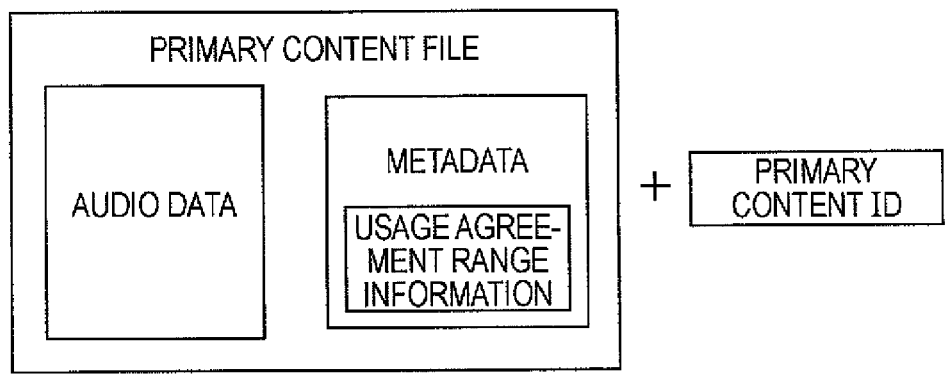
FIG. 16 is a diagram schematically illustrating a configuration example of a primary content file.

Also, the structure of a primary content file will be described. Though described earlier, a primary content file has a file structure made up of audio data of a predetermined format having tune (audio) contents serving as primary content, and various types of metadata related thereto, as shown again in FIG. 16. With this in mind, the audio data file handled as the primary content has a primary content ID, which is unique in correspondence with the audio content thereof for example, added or correlated thereto, as show in the drawing.

Note that as for audio data formats, there are already various formats available, for example, the PCM format which uses predetermined sampling frequency and quantization bits, audio compression encoding methods, formats compression-encoded by bit rate, and further, a format of 1-bit signals subjected to PDM (pulse-density modulation) obtained by $\Delta\Sigma$ modulation, as typified in DSD (Direct Stream Digital) or the like, for example. As described later, for the primary content ID defined in the present embodiment, even of these formats differ at the audio data portion, the same primary content ID is assigned in common if a content file of the same audio content.

Also, as for the types of the above-described metadata, in addition to information generally attached to audio data, such as tune title, artist, album, genre, data format, data size, and so forth, the usage agreement range information described with FIG. 13 for example, may also be included.

While acceptance of subsidiary usage of the primary content is assumed with the present embodiment, this acceptance of usage is obtained by agreement with the copyright holder of the primary content (e.g., artist or the like). This means that the content and range of usage and so forth which the copyright holder can agree on naturally changes depending on the way the copyright holder thinks about the tune. Accordingly, with the present embodiment, usage agreement range information which is information setting the usage agreement range is built in as metadata for the primary content as well, in order to respect the way such copyright holders think, thereby reflecting the intent of the copyright holder. Of course, as a system of operation, the usage agreement range information could be set uniformly for all primary contents, but an arrangement as with the present embodiment wherein different usage agreement ranges can be set for each primary content so as to reflect the intent of the copyright holder is more effective in smoothly operating the music editing/sharing system.

Note that the contents of usage items making up the usage agreement range information in the metadata of the primary content file do not have to agree with the subsidiary content playback control file shown in FIGS. 13 and 14, and that it is sufficient for the content of the usage items used as a primary content to be set.

Next, an example of procedures relating to the primary processing relating to editing of subsidiary contents will be described with reference to the flowcharts in FIGS. 17 and 18. Note that the processing shown in FIGS. 17 and 18 is realized by the CPU 41 executing a program serving as the content managing/editing tool 101 in the music editing/sharing application 100, for example.

Now, let us say that for example, a user of a user terminal device 4 has activated the content managing/editing tool 101 of the music editing/sharing application 100 and is ready to edit subsidiary content. Let us say that operations are performed such that content to use as material for creating subsidiary content is searched, and this is registered (finalized) as editing material content. In accordance with this, the processing shown in FIG. 17 is executed by the subsidiary content creating processing unit 117 of the content managing/editing tool 101.

Figure 17:
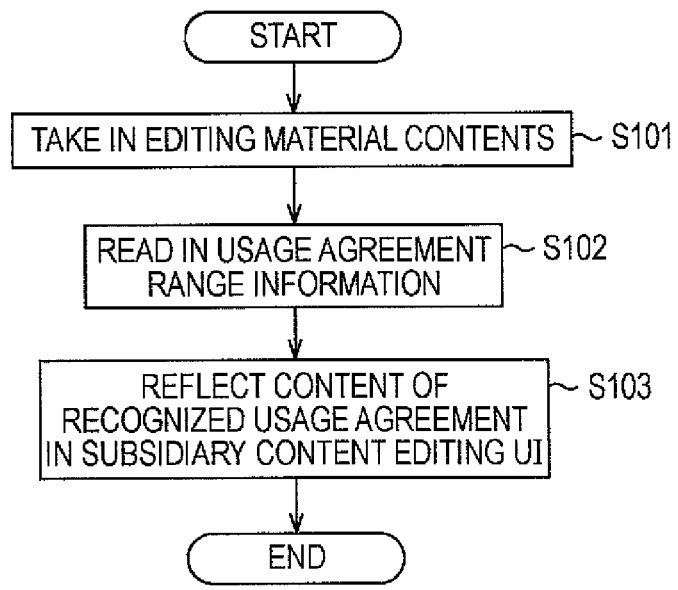
FIG. 17 is a flowchart illustrating an example of processing procedures whereby the music editing/sharing application reflects usage agreement range settings of editing material contents on a user interface, at the time of subsidiary content editing processing.
Figure 18:
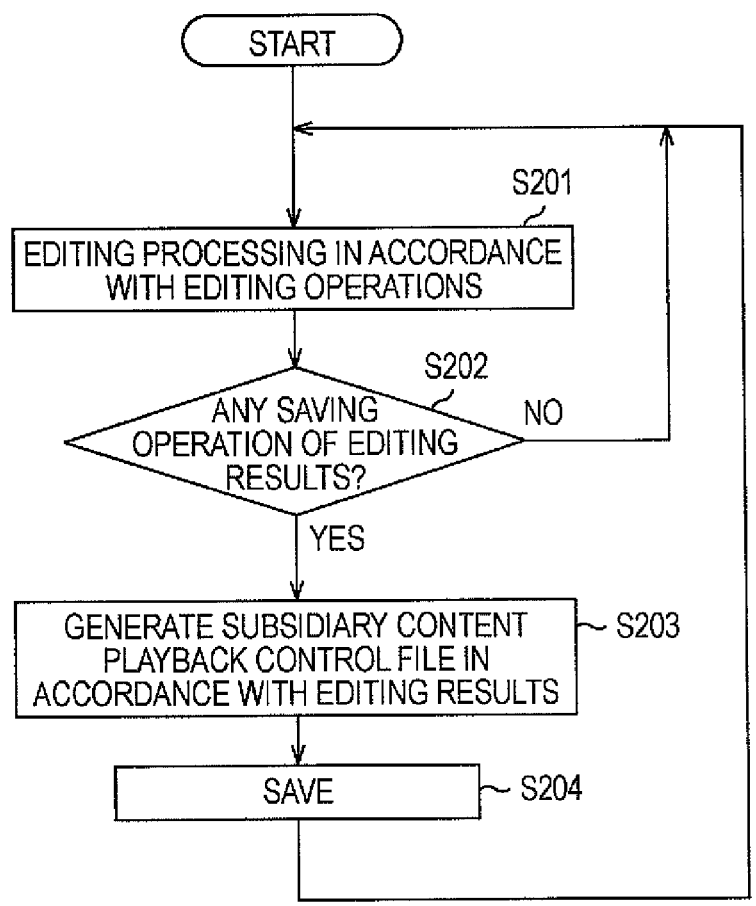
FIG. 18 is a flowchart illustrating an example of processing procedures up to the music editing/sharing application creating a subsidiary content playback control file as subsidiary content editing processing.

In FIG. 17, first, in step S101, taking in of data of content registered as editing material content is executed. Note that in the event that the registered editing material content is a primary content, the data of the file which is the primary content is taken in, and in the event of a subsidiary content, the data of a subsidiary content playback control file corresponding thereto is taken in.

In step S102, reading in of information of the usage agreement range is further executed from the data taken in by the above step S101. Thus, various contents relating to the usage agreement set with regard to the content registered this time as editing material content is recognized based on the content of the usage items 1 through n in the usage agreement range information. Accordingly, in the following step S103, the contents of the usage agreement recognized in correspondence with the above step S102 is set so as to be reflected on a user interface (UI) for subsidiary content editing. Due to this processing, the subsidiary content creating processing unit 117 provides an environment wherein editing operations of contents exceeding the usage agreement range set in the editing material content beforehand are unavailable.

FIG. 18 illustrates a basic processing procedure example relating to generating of a subsidiary content playback control file which is the actual data serving as the subsidiary content. The processing shown in this drawing is also realized by the CPU 41 executing a program serving as the content managing/editing tool 101, for example.

Here, first in step S201, appropriate editing processing in accordance with operation input for editing is executed. For example, the subsidiary content creating processing unit 117 provides a GUI (Graphical User Interface) for the user to perform editing operations for creating subsidiary content, with the program thereof. The user performs editing operations for creating subsidiary content using this GUI, and the processing in step S201 is executed in accordance with this operation.

In the process of performing editing processing as described above, upon determination being made in step S202 that operations have been performed for saving the editing results so far, the flow proceeds to step S203. In step S203, a content block is generated including playback control information corresponding to the tune content serving as the subsidiary content obtained by the editing results so far, and thereupon, a header block, and attribute information block which are also members in the file main unit portion, and a metadata portion, are also created, and finally a subsidiary content playback control file is generated. Control is then executed in the next step S204 so as to save this subsidiary content playback control file in an appropriate directory in the HDD 48 for example. Upon the procedure of step S204 having ended, the flow returns to step S201.

Note that while not shown in the drawing here, the processing shown in this drawing is left and the flow transits to other processing, in response to operations being performed to close the GUI screen for creating subsidiary content for example, or the like.

Also, with regard to creating a subsidiary content playback control file, the contents of present content usage agreement range information will be created. As for how to set the contents of the present content usage agreement range information, an arrangement may be conceived to automatically set (contents for each usage item) following predetermined rules, in a range not exceeding a minimum determined summarizing the usage agreement range information for each primary content which is the source editing material, for example. Also, an arrangement may be conceived for settings are made corresponding to specification operations relating to the contents of the present content usage agreement range information which the user has performed, so that the intent of the user is reflected. However, even in the event of setting in accordance with user operations in this way, setting is performed in a range not exceeding a minimum determined summarizing the usage agreement range information for each primary content which is the source editing material, so that setting of usage agreement range (contents for each usage item) exceeding this is unavailable.

Next, a basic processing procedure example relating to uploading of subsidiary content by the user terminal device 4, and a processing procedure example of the subsidiary content server 2 in accordance with this uploading, will be described with reference to the flowchart in FIG. 19. The processing at the user terminal device 4 side in the drawing is realized primarily by programs serving as the subsidiary content saving managing processing unit 115 and subsidiary content transfer processing unit 116. The processing at the subsidiary content server 2 is executed by the members shown in FIG. 7 operating in cooperation, but in reality, can be viewed as being realized by the computer system (CPU) making up the subsidiary content server 2 executing programs.

The user terminal device 4 side in step S301 is awaiting obtaining of a command instructing uploading of a subsidiary content playback control file. Now, let us say that the user selects, as an operation as to the GUI provided by the content managing/editing tool 101, one or more subsidiary contents regarding which uploading is desired, from the subsidiary contents created by the music editing/sharing application 100 and stored in the HDD 48 as application files of the music editing/sharing application 100 (i.e., subsidiary content playback control files), and performs an upload execution operation. In response to this, a command is generated which instructs uploading of the subsidiary content playback control file corresponding to the subsidiary content selected at the GUI, and the flow proceeds to step S302.

In step S302, the subsidiary content regarding which uploading has been specified, i.e., the subsidiary content playback control file, is read in from a predetermined directory. In the following step S303, control is executed such that the subsidiary content playback control file which has been read in is transmitted and output to the subsidiary content server 2 via network along with an upload request.

The subsidiary content server 2 is standing by in step S401 for reception of an upload request, and upon the upload request being received, the procedures from S402 and on are executed. Note that in order to actually transition to step S402 after receiving an upload request, confirmation is made that this is a request from a valid user, by way of authentication processing for example, but such processing procedures are omitted here.

In step S402, a saving location (URL) for the subsidiary content playback control file received along with the upload request is set. The functions of the saving location setting processing unit 26 at the subsidiary content server 2 for example, are used for this URL setting.

In step S403, communication processing for notifying the saving location of the uploaded subsidiary content (subsidiary content playback control file) is performed as to the user terminal device 4 which is the originator of the upload request this time.

At the user terminal device 4 side which has performed in upload request in step S303 is awaiting reception of information of the saving location in step S304. Upon receiving information of the saving location, in step S305 information of the received saving location (URL) is saved in an appropriate directory. Thus, hereafter, the information of the saving location of the subsidiary content can be called up by performing a predetermined operation as to the content managing/editing tool 101. In the event that the saving location is a URL, a text string as the URL can be output by display or the like, for example depending on the call operation.

Figure 20:
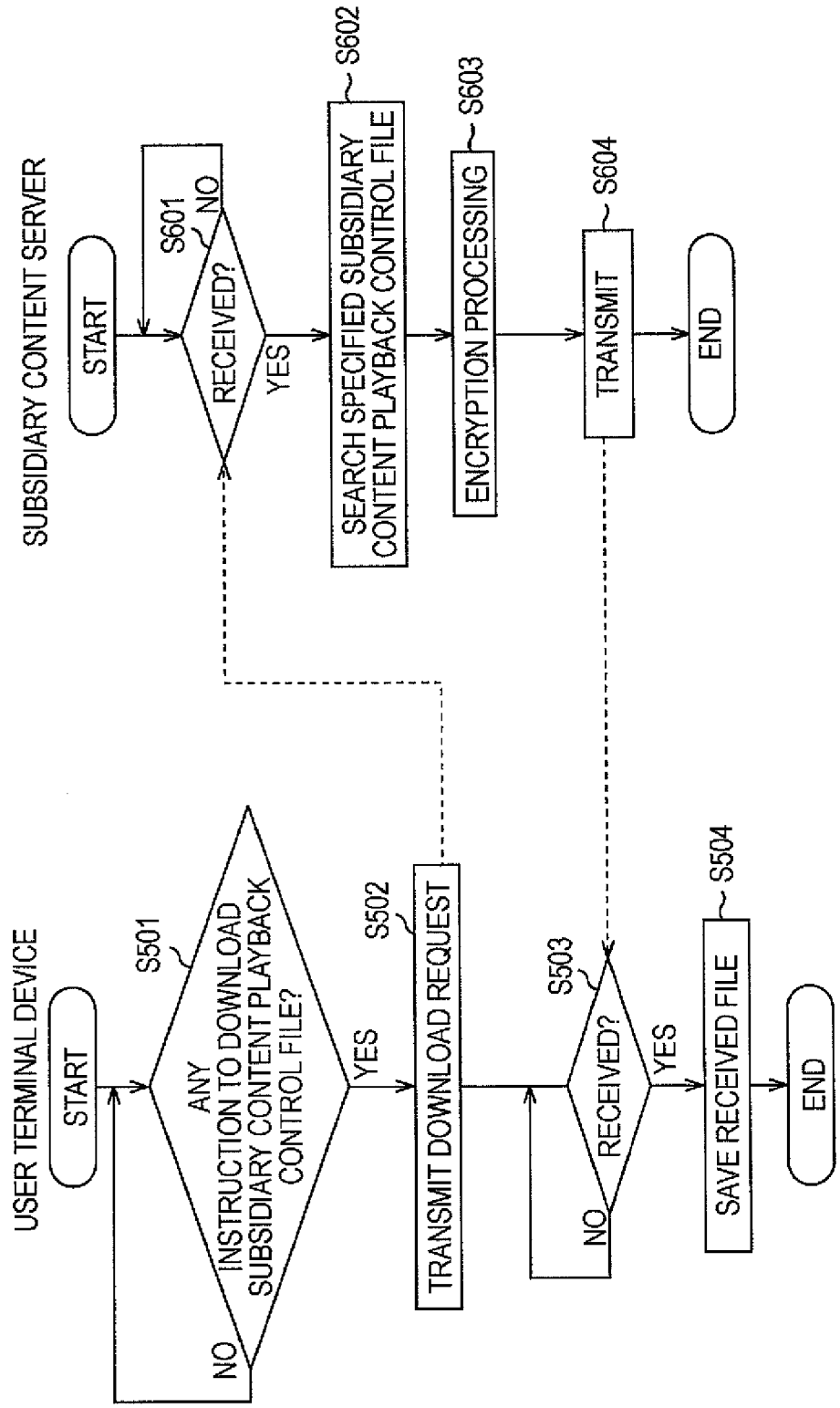
FIG. 20 is a flowchart illustrating an example of uploading of a subsidiary content by the user terminal device, and processing procedures at the subsidiary content server in accordance therewith.

The flowchart in FIG. 20 illustrates a processing procedure example relating to downloading of the subsidiary content by the user terminal device 4, and a processing procedure example at the subsidiary content server 2 corresponding thereto. The processing at the user terminal device 4 in the drawing as well is primarily realized by programs serving as the subsidiary content saving managing processing unit 115 and subsidiary content transfer processing unit 116.

First, in step S501, the user terminal device 4 side is awaiting obtaining of a command instructing downloading of a subsidiary content playback control file. Here, let us say that for example, the user accesses the subsidiary content server 2, as an operation as to the GUI provided by the content managing/editing tool 101, and in a state of browsing a list of subsidiary contents saved and managed therein, selects one or more subsidiary contents regarding which downloading is desired, and performs operations for executing downloading. In response to this, a positive determination result will be obtained in step S501, and the flow proceeds to step S502.

In step S502, a download request is transmitted to the subsidiary content server 2 in response to a download instructing having been obtained. Note that as for this download request, information for specifying the directory (saving location) of the subsidiary content selected at the time of operation of the download execution instruction for example, is also included. Note that an arrangement may be conceived wherein instead of the saving location, a download request is made specifying the subsidiary content ID provided to the subsidiary content playback control file which is the actual entity of the subsidiary content and so forth, for example.

The subsidiary content server 2 is awaiting for a download request to be received in step S601, and upon an download request being received, executes the procedures in step S602. Note that in order to actually transition to step S602 after receiving a download request as well, authentication processing and the like transpires, but such processing procedures are omitted here as well.

In step S602, the subsidiary content database 22a of the storage unit 22 is accessed and the specified subsidiary content (subsidiary content playback control file) is searched for, and the searched subsidiary content playback control file is encrypted in step S603 and transmitted to the requesting user terminal device 4 in step S604.

The user terminal device 4 which has transmitted the download request in step S502 awaits in step S503 for the subsidiary content playback control file according to the download request to be received. Upon determining that the subsidiary content playback control file has been received, in step S504, the received subsidiary content playback control file is saved and managed in an appropriate directory.

Figure 21:
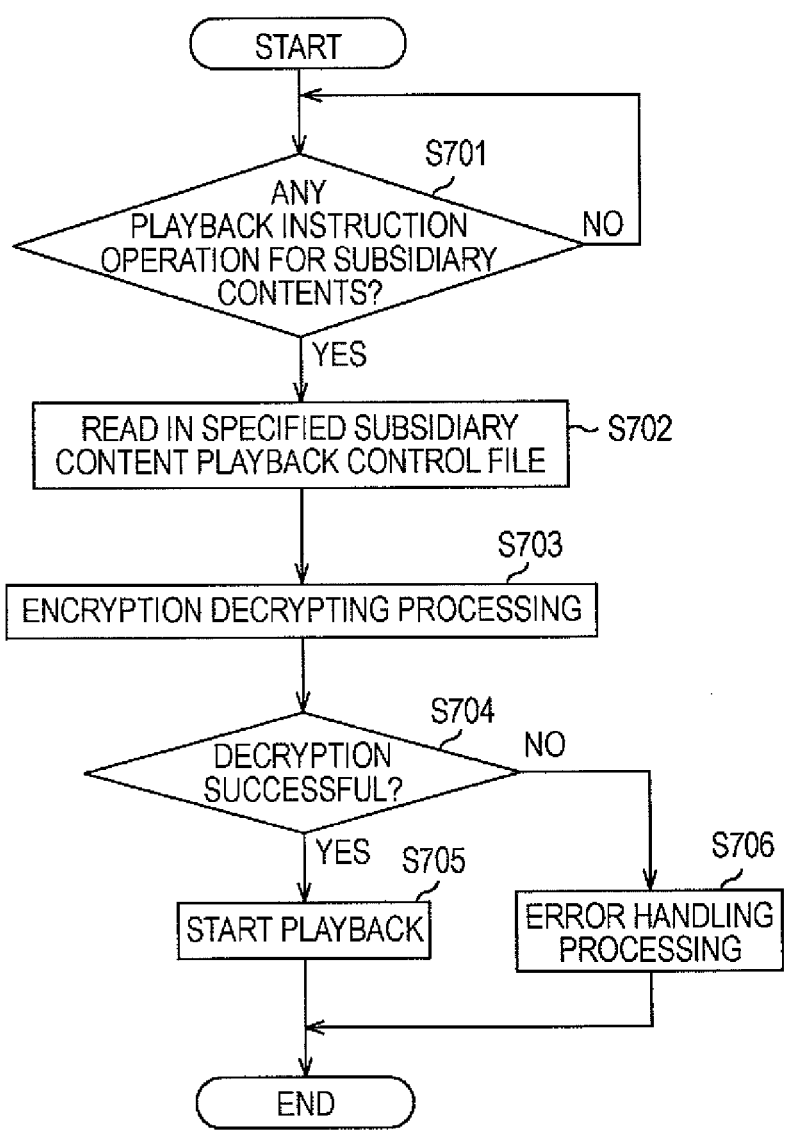
FIG. 21 is a flowchart illustrating an example of processing procedures of playing a subsidiary content by the user terminal device.

The flowchart in FIG. 21 illustrates a processing procedure example of the user terminal device 4 to play the subsidiary content obtained by downloading (saved in HDD 48), and the processing of the user terminal device 4 in this drawing is realized by programs primarily serving as the subsidiary content saving managing processing unit 115, encryption/decryption processing unit 119, and audio playback signal processing unit 120.

First, in step S701, obtaining of a playback start instruction regarding the subsidiary content saved in the HDD 48 by downloading is awaited. Now, let us say that for example, as an operation as to the GUI realized by the subsidiary content saving managing processing unit 115, one subsidiary content is selected from the subsidiary contents saved in the HDD 48, and an instruction is given to start playing, the flow proceeds from step S701 to step S702.

In step S702, the subsidiary content playback control file corresponding to the specified subsidiary content is read in from the HDD 48.

Here, the subsidiary content data obtained by downloading is saved in the HDD 48 with the encryption at the time of transmission left. Accordingly, in the next step S703, processing for decrypting the read in subsidiary content data is executed.

In step S704, determination is made regarding whether or not the encryption decrypting processing in the above step S703 has been successful.

For example, in the event that the subsidiary content data regarding which starting of playing has been specified this time in step S701 has been legitimately downloaded from the content server 2, the decrypting processing in step S703 will be successful and proper subsidiary content data will be restored.

Conversely, in the event that the subsidiary content data has been obtained by some way other than downloading from the subsidiary content server 2 for example, either encryption has been performed with another method or algorithm, or no encryption has been performed. In this case, depending on the decrypting processing in step S703, either proper subsidiary content data is not restorable, or decrypting processing is inapplicable. That is to say, as for the results of the decrypting processing in step S703, this can be viewed as failing, including cases that decrypting processing is inapplicable.

In the event that positive determination results have been obtained that the decrypting processing has been successful in step S704, the flow proceeds to step S705, and playback control processing regarding the subsidiary content is started. Conversely, in the event that a negative decryption result has been obtained in step S704 that the decrypting processing has failed, the flow proceeds to step S706, and error handling processing is executed. As for this error handling processing, first, playback control processing regarding the subsidiary content regarding which playback has been specified this time is kept from being started, and thereupon for example, control processing for notifying on a GUI that the subsidiary content regarding which playback has been specified this time is unauthorized and unplayable, and so forth, is executed.

By such processing being executed for example, with the present embodiment, only subsidiary content information externally obtained which has been legitimately downloaded and obtained from the subsidiary content server 2 is played at the user terminal device 4, whereby the copyright of the primary content or subsidiary content is fully protected.

Note that as for an arrangement for playing and outputting only subsidiary content legitimately downloaded from the subsidiary content server 2, other arrangements can be conceived. For example, a configuration may be conceived wherein encryption is decrypted beforehand at the point of the user terminal device 4 receiving and obtaining as a download, and is stored in the HDD 48 with the decryption result information attached thereto, and at the time of playing, the attached information of the decryption results is referred to, so as to make determination regarding whether or not to play the subsidiary content. Also, an arrangement may be made wherein a special code indicating that transmission has been made for downloading is embedded in the subsidiary content as processing at the subsidiary content server 2 side at the time of transmission from the subsidiary content server 2, and at the time of playing, presence/absence of this code, and the content thereof and so forth is confirmed at the user terminal device 4 side, so as to determine whether or not to start playing.

As described earlier with reference to FIG. 12 through FIG. 16 and so forth, with the present embodiment, a primary content ID is correlated with the primary content and a subsidiary content ID (current subsidiary content ID) with the subsidiary content, and also, an editing history ID which is unique in accordance with the ending history thereof is further added to the subsidiary content. As described later, management and processing and the like of contents within the system can be efficiently performed by using these IDs.

Accordingly, hereafter, description will be made relating to the management and processing of the contents according to the present embodiment using the above-described IDs. Note that in the following description, in the event of collectively referring to the above IDs (primary content ID, subsidiary content ID, editing history ID), this will be called "content-related ID".

Figure 22:
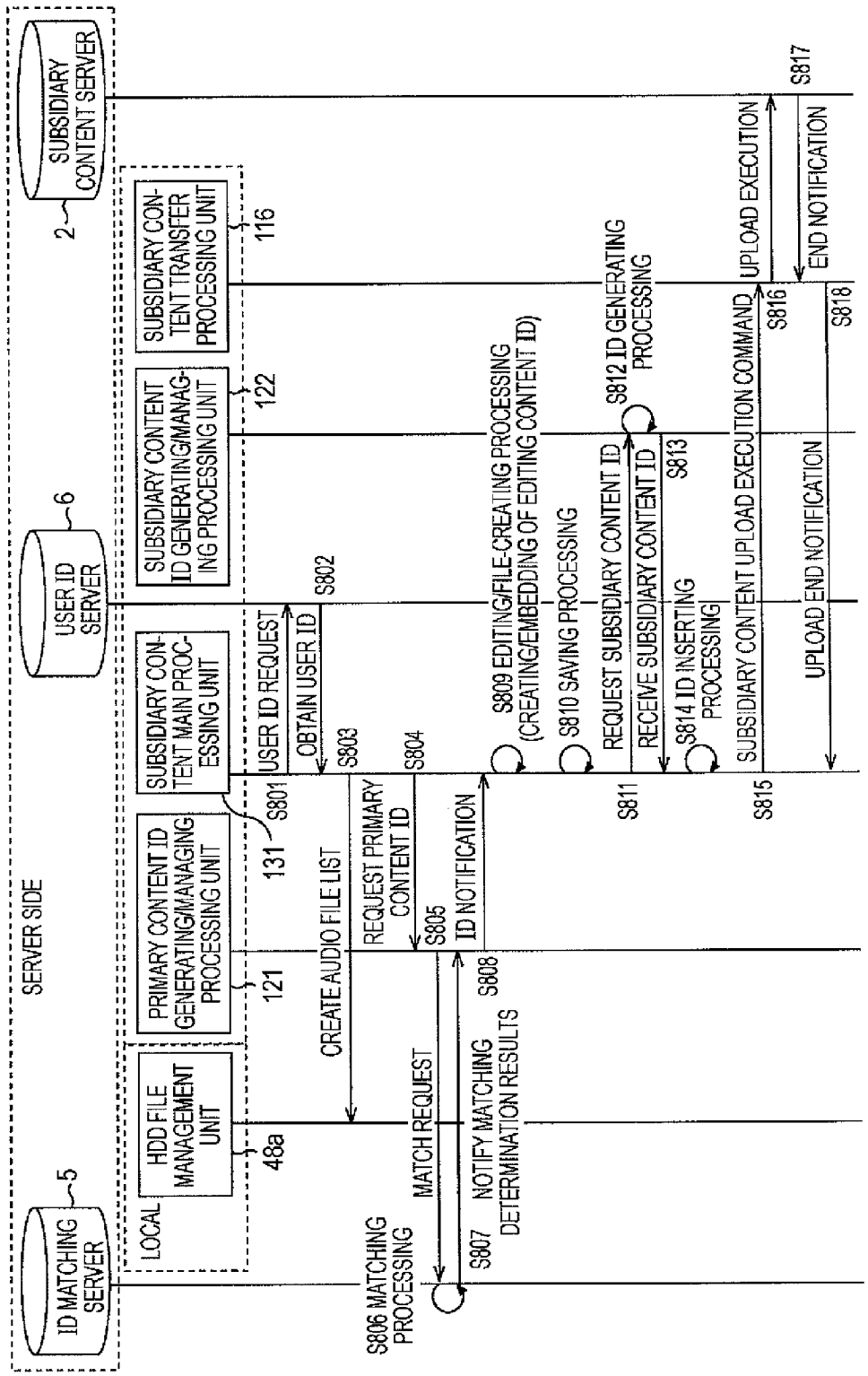
FIG. 22 is a sequence diagram illustrating procedures within a system at the time of creating subsidiary contents, along with the creating process of content-related IDs.

First, the sequence diagram in FIG. 22 illustrates a procedure example in a system at the time of creating subsidiary content. The procedures illustrated in this diagram have shown the process up to generating of the subsidiary content, along with the process of generating the above content-related ID, assuming the processing procedures for generating the subsidiary content playback control file with the content managing/editing tool 101 shown in FIG. 18, for example.

In FIG. 22, an ID matching server 5, user ID server 6, and subsidiary content server 2, belonging to the server side, and an HDD file management unit 48a belonging locally to the user terminal device 4, a primary content ID generating/managing processing unit 121, subsidiary content main processing unit 131, subsidiary content ID generating/managing processing unit 122, and subsidiary content transfer processing unit 116 are shown as procedure executing members within the system.

The ID matching server 5 and user ID server 6 are situated on the network along with the primary content server, subsidiary content server 2, communication server 3, and so forth shown in FIG. 1, FIG. 2, etc., for example. As described later, the ID matching server 5 matches the primary content IDs, and the user ID server 6 issues user IDs, with each being provided with configurations to that end.

Also, the HDD file management unit 48a is a local member for executing write/read of files and data as to the HDD 48 of the user terminal device 4, following a protocol such as a file system according to a predetermined method for example, and is realized by the CPU 41 of the user terminal device 4 executing a program, for example.

Also, locally, the primary content ID generating/managing processing unit 121, subsidiary content main processing unit 131, subsidiary content ID generating/managing processing unit 122, and subsidiary content transfer processing unit 116 are each function members realized by the content managing/editing tool 101, with the function members except for the subsidiary content main processing unit 131 being shown in FIG. 11 described earlier. The subsidiary content main processing unit 131 also indicates an integration of at least the a primary content acquisition processing unit 112, primary content saving managing processing unit 113, subsidiary content acquisition processing unit 114, subsidiary content saving managing processing unit 115, subsidiary content creating processing unit 117, subsidiary content playback control file generating/interpreting processing unit 118, encryption/decryption processing unit 119, and so forth, of the functional members provided at the content managing/editing tool 101.

Also, though not shown in FIG. 22, at the time of communication between the local and server side, the communication control unit 111 executes control relating to communication with the server, at the content managing/editing tool 101.

In this drawing, as procedures for creating subsidiary content, first, in step S801, issuing of a user ID is requested from the subsidiary content main processing unit 131 to the user ID server 6 (request). At the time of this request, for example, the subsidiary content main processing unit 131 transmits information for generating a user ID (generating source information), beginning with identification information such as the serial No. which is different for each product as the content managing/editing tool 101 (music editing/sharing application 100), and user name, and so forth. As the procedure of the next step S802, the user ID server 6 which has received this request generates a user ID formed of a value uniquely determined from this generating source information, using generating source information received along with the request for example, and transmits the user ID thus generated to the subsidiary content main processing unit 131 as a response. The subsidiary content main processing unit 131 receives and obtains the user ID that has been transmitted. The obtained user ID is saved in the HDD 48 under the management of the subsidiary content main processing unit 131 for example, and subsequently the user ID can be output locally as appropriate.

Next, the procedures of step S803 through S808 will be described.

In step S803, the subsidiary content main processing unit 131 cooperates with the HDD file management unit 48a so as to create a list of audio data files stored in the HDD 48 (audio file list). Note that here, of the audio data files stored in the HDD 48, of there are signal formats and file formats usable as primary contents, all of these are listed. Also, the audio data files stored in the HDD 48 may include not only those downloaded and obtained from the primary content server 1 but also thus obtained in a different way from the primary content server 1 such as copying directly from a sound source recording medium at the user terminal device 4, for example. However, at the time of listing here, all are listed regardless of whether obtained from the primary content server 1 or not, just as long as being "signal formats and file formats usable as primary contents".

Upon creating the audio file list in step S803 above, in step S804 the subsidiary content main processing unit 131 requests the primary content ID generating/managing processing unit 121 primary content IDs to be newly correlated to audio data files listed in the created audio data file list that have not yet been provided with primary content IDs.

Now, at the time of requesting the primary content ID, the subsidiary content main processing unit 131 hands the digital audio signal, which is the actual entity of the contents of the content for each audio data file, to the primary content ID generating/managing processing unit 121.

The primary content ID generating/managing processing unit 121 generates a value as a primary content ID to be correlated to the digital audio file regarding which a request was made. At the time of generating the value of the primary content ID, the digital audio signals of the digital audio file received along with the request are used, and predetermined computation and processing and the like based on audio feature amount are performed. As can be understood from this, the primary content ID is uniquely determined corresponding to audio contents obtained by playing the audio content. In other words, as long as the audio content obtained by playing is the same, the primary content ID will be in common, regardless of difference in digital audio signal format and file format and so forth, as described above.

Thus, a primary content ID is generated locally based on the audio feature amount which the digital audio signals of the digital audio file have. The audio feature amount differs of each audio content serving as a tune for example, in almost all cases. Accordingly, regardless of how a primary content ID is generated locally, the same primary content ID will be generated as a result from digital audio files with the same audio content for every location, since the same algorithm is being followed.

However, it should be noted that this primary content ID is generated locally based on the audio feature amount and nothing else, so the possibility that digital audio files corresponding to different tunes may have the same primary content ID is real.

Accordingly, with the present embodiment, the ID matching server 5 is used to match primary content IDs so as to take all possible measures to prevent collision of a locally-generated primary content ID with a digital audio file with other different audio content.

For this matching, in step S805, the subsidiary content main processing unit 131 performs a matching request to the ID matching server 5 regarding the generated primary content ID. At the time of this matching request, the subsidiary content main processing unit 131 transmits fingerprint information generated based on the generated primary content ID.

The ID matching server 5 which has received the matching request executes matching processing as shown in step S806. The ID matching server 5 has databased and holds primary content IDs, and by matching the fingerprint information transmitted along with the matching request with the database, determines whether the primary content ID regarding which the matching request has been received correctly corresponds to the digital audio file to which the primary content ID managed at the ID matching server corresponds (OK) or is the same as a digital audio file of another different audio content (failed). In step S807, the determination results (matching determination results) are notified. In the event of notifying failure as the matching determination results, a correct primary content ID corresponding to the audio content is searched from the primary content ID database for example, and the searched primary content ID is also notified.

The primary content ID generating/managing processing unit 121 which has received notification of the above matching determination result notifies the subsidiary content main processing unit 131 in step S808 of the primary content ID. At this time, in the event that the matching determination result was OK, the primary content ID serving as the base of the fingerprint information generated at the time of matching request is notified. In the event that the matching determination result was failed, the correct primary content ID transmitted along with the notification of the matching determination result is notified.

The subsidiary content main processing unit 131 registers the notified primary content ID so as to be correlated with the audio file according to a predetermined form (including a case of embedding the primary content ID in the structure of the audio data file) in the audio file list created earlier. Also, the audio file list with which the primary content ID has bee correlated is saved in the HDD 48 for example, under management of the subsidiary content main processing unit 131, for example. Thus, the audio data files stored in the HDD 48 and the primary content IDs have been correlated, and subsequently, all of these audio data files can be handled as primary contents, i.e., as editing material contents.

For example, the primary content server 1 manages a digital audio file already correlated with a primary content ID. Accordingly, regard to a case of downloading the primary content with the Procedure 1 in FIG. 2, besides obtaining the primary content ID by the procedures according to steps S803 through S808, a form can be assumed wherein at the same time as downloading the primary content, the primary content ID thereof is also obtained from the primary content server 1.

However, in the case of obtaining an audio data file with a procedure other than downloading from the primary content server 1, such as directly copying from a sound source recording medium at the user terminal device 4 for example, normally, a primary content ID is not correlated to these audio data files. As described earlier, even if the file structure is the same a that of a primary content file, of a primary content ID is not correlated, the content managing/editing tool 101 does not manage this as a primary content file. That is to say, from the perspective of the user of the user terminal device 4 (music editing/sharing application 100), even though an audio data file of a format which should be able to be edited as long as being a primary content is already in the possession of the user, this is unavailable due to not being handled as a primary content. In this case, the user has to download content the same as the audio data file already in possession from the primary content server for example, placing a load of trouble and cost on the user.

Accordingly, with the present embodiment, audio data files already locally saved can be made into primary contents without any distinguishing from audio data files downloaded from the primary content server 1, and the procedures therefore are the procedures of the above steps S803 through S808.

Due to the procedures of the steps S801 through S808 so far, a user ID is obtained, and primary content IDs are correlated with all audio data files stored in the HDD 48 which are capable of being usage primary contents, whereby an environment capable of managing as primary contents has been obtained.

Under the above-described environment, in step S809 the subsidiary content main processing unit 131 (subsidiary content creating processing unit 117, subsidiary content playback control file generating/interpreting processing unit 118) executes editing processing using the editing material contents in accordance with editing operations of the user, and processing for generating a subsidiary content playback control file reflecting the editing processing results.

Now, the subsidiary content playback control file has the structure and contents shown earlier in FIG. 12, with the editing history ID to be stored in the metadata portion being generated in the creating stage of the subsidiary content playback control file in this step S809.

As shown in FIG. 12, the editing history ID is obtained by processing of using playback control information and the primary content ID stored in the usage primary content information, and obtaining a hash value by performing computation with a hash function. The hash value obtained this way becomes the editing history ID.

According to the above processing, the editing history ID is uniquely obtained based on the playback control information and the primary content ID of the usage primary content. The playback control information and the primary content ID of the usage primary content are both determined corresponding to the editing results of the subsidiary content. Accordingly, the editing history ID is unique corresponding to the editing history of the subsidiary content to which the current subsidiary content playback control file corresponds. Accordingly, in the event that a different user, for example, consequently uses the same primary contents as usage primary contents and creates a subsidiary content editing and using these usage primary contents in the same way, the editing history ID of the subsidiary content playback control files corresponding to these subsidiary contents will be the same.

Note that there are techniques for generating unique values as to the editing history other than hash computation, so editing history IDs may be generated using these techniques.

The subsidiary content main processing unit 131 (subsidiary content saving managing processing unit 115) saves the subsidiary content playback control file created by the above step S809 in the HDD 48 in step S810.

Also, as shown in FIG. 12, the current subsidiary content ID which is a subsidiary content ID corresponding to the subsidiary content serving as the current file, is stored in the header block of the subsidiary content playback control file.

This current subsidiary content ID is locally created at a predetermined stage following creating the corresponding subsidiary content playback control file, and is embedded in the header block of the created subsidiary content playback control file. Procedures to this end are shown as steps S811 through S813.

In step S811, the subsidiary content main processing unit 131 requests a subsidiary content ID from the subsidiary content ID generating/managing processing unit 122. In response to this request, in step S812 the subsidiary content ID generating/managing processing unit 122 executes processing for generating a subsidiary content ID.

As shown schematically in FIG. 12, generating of the subsidiary content ID uses the playback control information, primary content ID stored at the usage primary content information, and user ID. Computation is performed with hash function using these, and the obtained hash value there of is the subsidiary content ID.

In comparison with the aforementioned editing history ID using the playback control information and the usage primary content information alone, the subsidiary content ID adds the user ID thereto. Accordingly, due to adding the user ID to the elements of the hash computation, the subsidiary content ID is determined uniquely by combination of the editing history and the user.

For example, in the event that a different user creates a subsidiary content with the same editing history, the editing history ID of each will be the same as described above, but the subsidiary content ID will be different in accordance with the user ID being different for each user. Thus, the subsidiary content ID is generated so as to be unique for each subsidiary content.

Note that the subsidiary content ID may also use generating methods other than hash computation, the same as with the editing history ID.

As a response, the subsidiary content ID generating/managing processing unit 122 transmits the generated subsidiary content ID to the subsidiary content main processing unit 131. The subsidiary content main processing unit 131 receives the subsidiary content ID transmitted in step S813. Processing is then performed for inserting the subsidiary content ID received in step S813 at a predetermined position in the header block of the subsidiary content playback control file as the current subsidiary content ID.

At the time of uploading the subsidiary content playback control file to the subsidiary content server 2, the current subsidiary content ID according to the processing of the above steps S811 through S814 being stored in the contents of the subsidiary content playback control file created by the above step S809 is a condition. The uploading procedures will be illustrated as steps S815 through S818. Note that while uploading procedures are already shown in FIG. 19, in this drawing, the uploading procedures are shown along with the processing sequence between the subsidiary content main processing unit 131 and the subsidiary content transfer processing unit 116 at the content managing/editing tool 101.

In step S815, an execution command regarding uploading of subsidiary content is given from the subsidiary content main processing unit 131 to the subsidiary content transfer processing unit 116. At this time, the subsidiary content main processing unit 131 hands the data of the subsidiary content playback control file to be uploaded to the subsidiary content transfer processing unit 116. In step S816, the subsidiary content transfer processing unit 116 executes processing for transmitting the data of the subsidiary content playback control file handed from the subsidiary content main processing unit 131 to the subsidiary content server 2 as upload data in response to the upload execution command, i.e., executes uploading. Upon all of the data of the subsidiary content playback control file to be uploaded being received and obtained at the subsidiary content server 2, the subsidiary content server 2 makes notification to the subsidiary content transfer processing unit 116 in step S817 that uploading has ended. Upon receiving the upload end notification, the subsidiary content transfer processing unit 116 further makes upload end notification in step S818 to the subsidiary content main processing unit 131. Upon the subsidiary content transfer processing unit 116 confirming reception of the upload end notification, the sequence for uploading the subsidiary content ends.

Note that it is sufficient for the user ID obtaining procedures in steps S801 and S802 in FIG. 22, and the primary content ID obtaining procedures in steps S802 through S808, to each be executed at arbitrary occasions and timings in the stage up to editing being performed for creating the subsidiary content, for example, and do not have to be performed in accompaniment with the occasion for executing the editing processing in step S809 and the processing for creating the subsidiary content playback control file. This is the same for the processing for generating and inserting the subsidiary content ID in steps S811 through S814.

Figure 23:
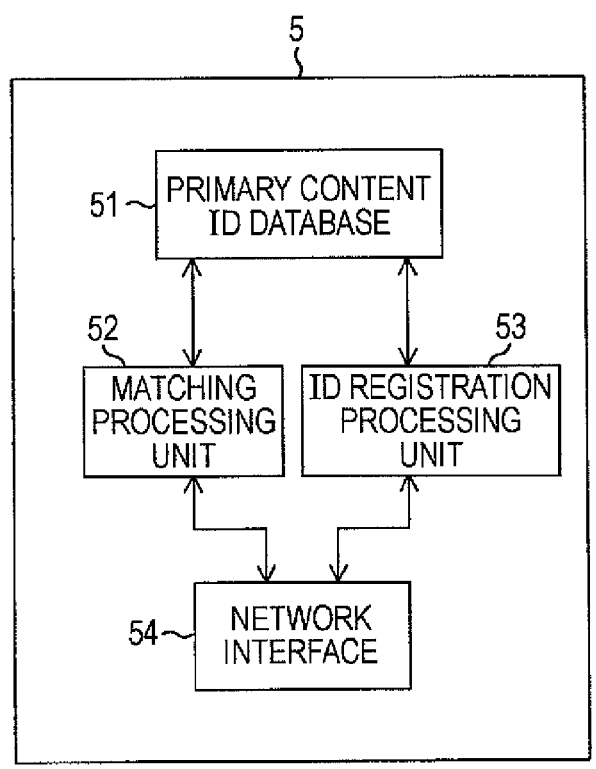
FIG. 23 is a diagram illustrating an internal configuration example of an ID matching server.
Figure 24:
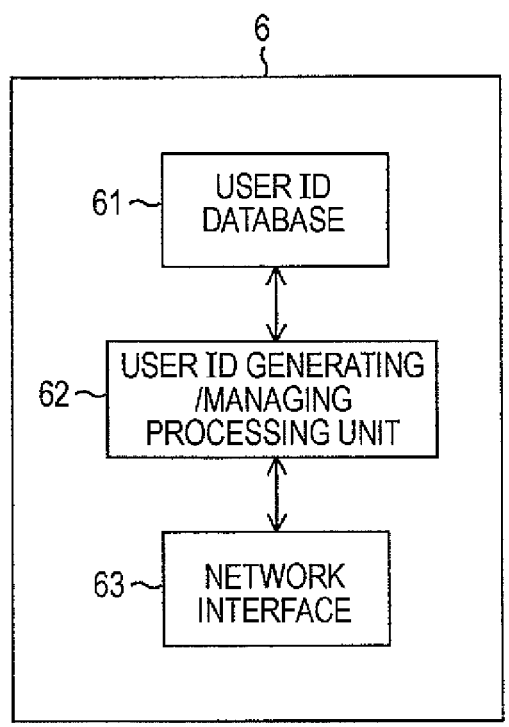
FIG. 24 is a diagram illustrating an internal configuration example of a user ID server.

Now, configuration examples of the ID matching server 5 and user ID server 6 shown in FIG. 22 above will be illustrated in FIGS. 23 and 24.

The ID matching server 5 shown in FIG. 23 has a primary content ID database 51, a matching processing unit 52, an ID registration processing unit 53, and a network interface 54.

The primary content ID database 51 is information made up by databasing and registering primary content IDs corresponding to currently-existing primary contents, and in reality is managed in a state of being stored in an HDD or the like, for example.

The matching processing unit 52 is a member for executing the matching processing in step S806 in FIG. 22, using the fingerprint information transmitted from the client (the content managing/editing tool 101 running on the user terminal device 4 (primary content ID generating/managing processing unit 121)) along with the matching request, and the primary content ID database 51.

The ID registration processing unit 53 is a member for executing registering processing, in the primary content ID database 51, a primary content ID for a new primary content in response to a new primary content having been created. Information regarding a new primary content can be obtained from the primary content server 1 by communication via a network, for example.

The network interface 54 executes control and processing for communication via the network NW. Thus, communication with the client is realized.

The user ID server 6 shown in FIG. 24 has a user ID database 61, a user ID generating/managing processing unit 62, and a network interface 63.

The user ID database 61 is information where user IDs issued so far have been correlated with corresponding generating source information and so forth for example and databased, and in reality is stored and managed in an HDD or the like.

The user ID generating/managing processing unit 62 can newly generate user IDs in response to user ID issuing requests (step S801 in FIG. 22) from the client (subsidiary content main processing unit 131). Also, user IDs newly generated in this way are newly registered in the user ID database 61.

The network interface 63 executes control and processing for communication with the client and so forth via the network NW, for example.

Note that the ID matching server 5 and user ID server 6 may be configured integrated with the servers shown in FIG. 1, FIG. 2, and so forth, for example. For example, the ID matching server 5 executes matching processing relating the primary content IDs, and accordingly so integration with the primary content server 1 and so forth could be considered to be natural. Also, the user IDs are determined corresponding to application software (content managing/editing tool 101) for creating subsidiary content, so integrating with the subsidiary content server 2 would be natural, for example.

Also, as described earlier, the ID matching server has been provided so as to take all possible measures to present collusion of primary content IDs generated by the content managing/editing tool 101 with other different primary content. Accordingly, in the event that the primary content IDs generated by the content managing/editing tool 101 are extremely accurate and there is no chance of collision with other primary contents, for example, or even in the event that collision of a certain rate or higher is assumed, if another arrangement whereby this can be resolved has been ensured, the ID matching server 5 can be omitted.

As described so far, with the present embodiment, primary content IDs are appropriated to primary contents, and subsidiary content IDs and editing history IDs are generated and appropriated to subsidiary contents. With a system corresponding to the present embodiment, predetermined management relating to the primary contents and subsidiary contents is performed as with the following description, using these IDs.

Figure 19:
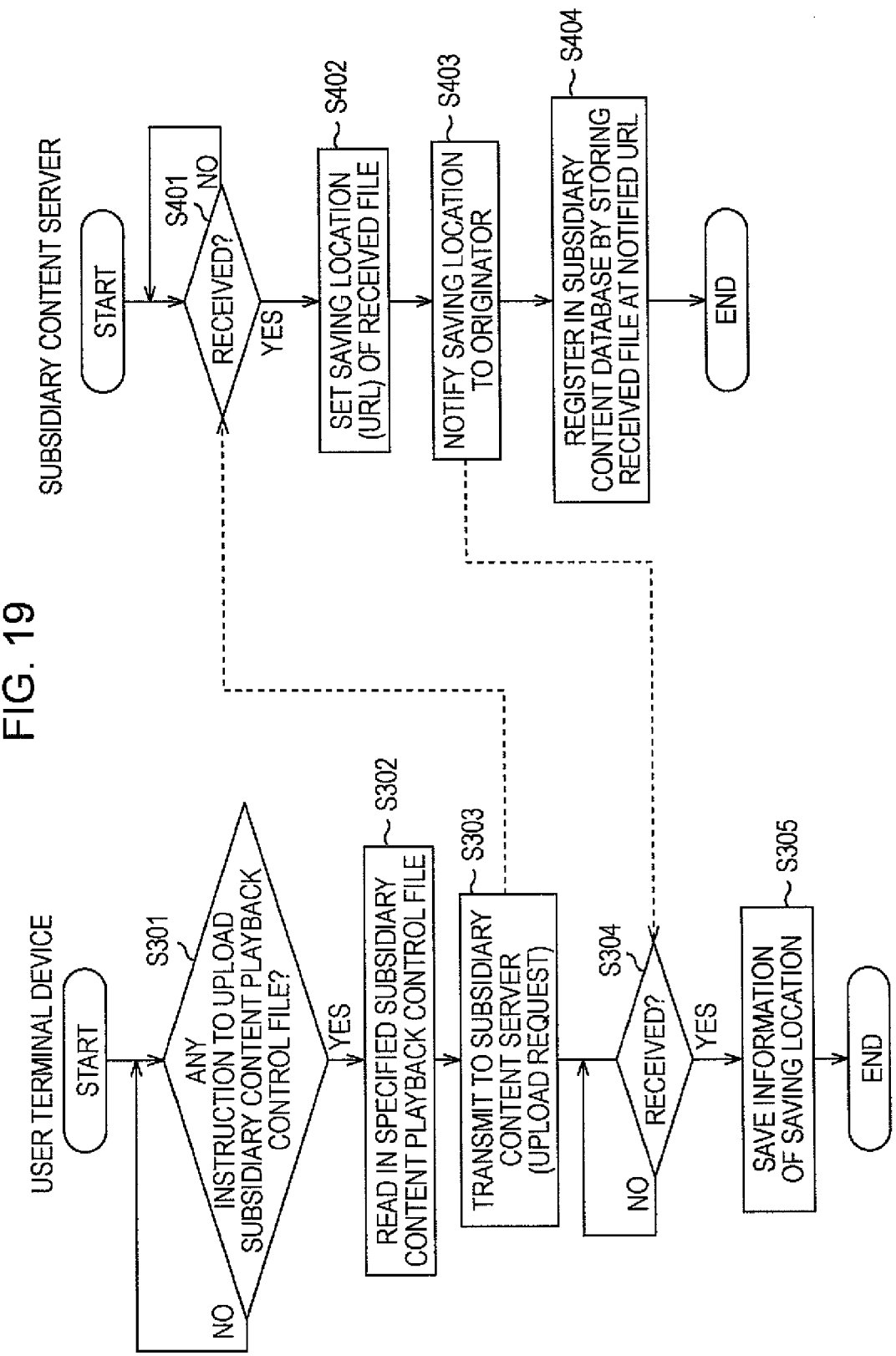
FIG. 19 is a flowchart illustrating an example of uploading of a subsidiary content by the user terminal device, and processing procedures at the subsidiary content server in accordance therewith.

For example, as described with Procedure 4 in FIG. 2 and step S402 in FIG. 19 and so forth, for each uploaded subsidiary content, a URL which is the saving location thereof (referred to as subsidiary content URL here) is set by the subsidiary content server 2.

Along with this, at the primary content server 1, the correlation between each registered primary content and subsidiary content using this as usage primary content, is managed in the primary content database 12a. In management of this "primary content/subsidiary content correlation", the primary content ID and the subsidiary content URL are correlated with the present embodiment.

Figure 25A:
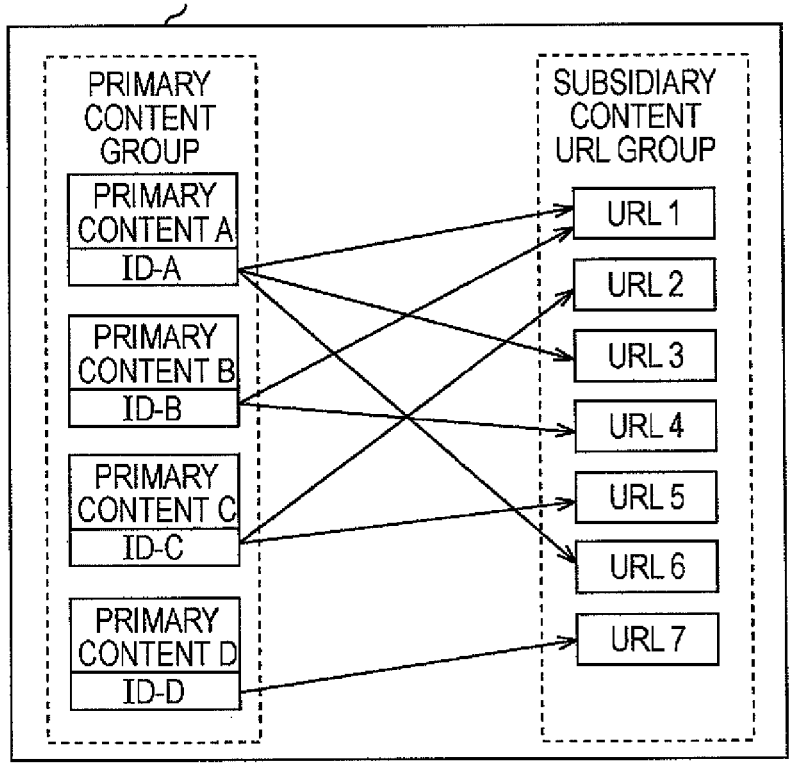
FIGS. 25A and 25B are diagrams schematically illustrating an example of managing contents of "primary content/subsidiary content correlation" at a primary content database 12*a*.
Figure 25B:
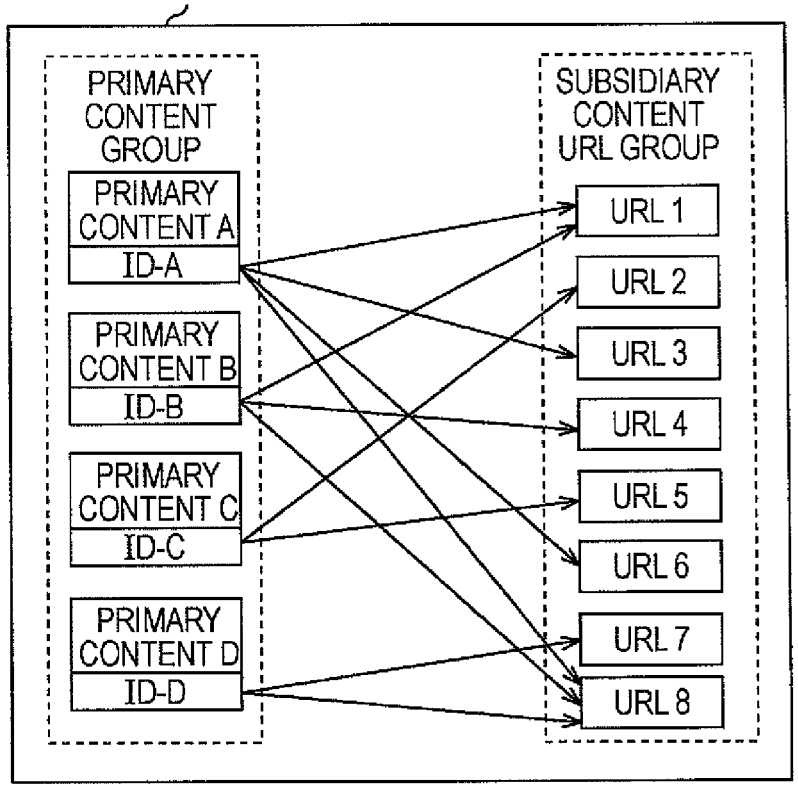

FIGS. 25A and 25B are schematic illustrations of a management content example of the above "primary content/subsidiary content correlation" in the primary content database 12a.

First, in FIG. 25A, a primary content group and a subsidiary content URL group are indicated as the content of the primary content database 12a. The primary content group is made up of primary contents registered in the primary content database 12a, and here, four primary contents of primary contents A, B, C, and D are registered. Also, the subsidiary content URL group is made up of registered subsidiary content URLs, with seven subsidiary content URLs, URL1 through URL7 having been registered here.

Note that in reality, the number of primary contents registered in the primary content database 12a is massive, but shown as 4 here in order to simplify description. Also, the subsidiary content URLs registered in the primary content database 12a in principle correspond to all subsidiary contents uploaded to the subsidiary content server 2, so in reality this is massive in number as well, but is limited to 7 here for the sake of description.

Primary content IDs have already been correlated with the primary contents registered in the primary content database 12a, as shown in the drawing. Now, let us say that the primary content ID correlated with the primary content A is ID-A. In FIG. 25A, the primary content ID-A is connected with each of URL1, URL3, and URL6 in the subsidiary content URL group by arrows. This represents that the primary content ID-A and each of the URL1, URL3, and URL6 are managed in a correlated manner in the primary content database 12a. This correlation indicates that the three subsidiary contents saved at the URL1, URL3, and URL6 use the primary content A as the usage primary content thereof.

In the same way, in FIG. 25A, URL1 and URL4 are correlated with the ID-B of the primary content B, thereby indicating that the two subsidiary contents saved at URL1 and URL4 each use the primary content B as the usage primary content.

Also, URL2 and URL5 are correlated with the ID-C of the primary content C, thereby indicating that the two subsidiary contents saved at URL2 and URL5 each use the primary content C as the usage primary content.

Also, URL7 is correlated with the ID-D of the primary content D, thereby indicating that the one subsidiary content saved at URL7 alone uses the primary content C as the usage primary content.

Also, let us say that in the management state shown in FIG. 25A, one subsidiary content is newly uploaded to the subsidiary content server 2. In accordance with this, the managed content of "primary content/subsidiary content correlation" at the primary content database 12a is updated as shown in FIG. 25B. That is to say, a URL8 which is the saving location set for the newly-uploaded subsidiary content is first added and registered to the subsidiary content URL group, and also correlation is made between the URL8 and the primary content ID. In this case, correlating the URL8 with the primary contents ID-A, ID-B, and ID-D indicates that the newly-uploaded subsidiary content uses the primary contents A, B, and D as the usage primary content.

Figure 26:
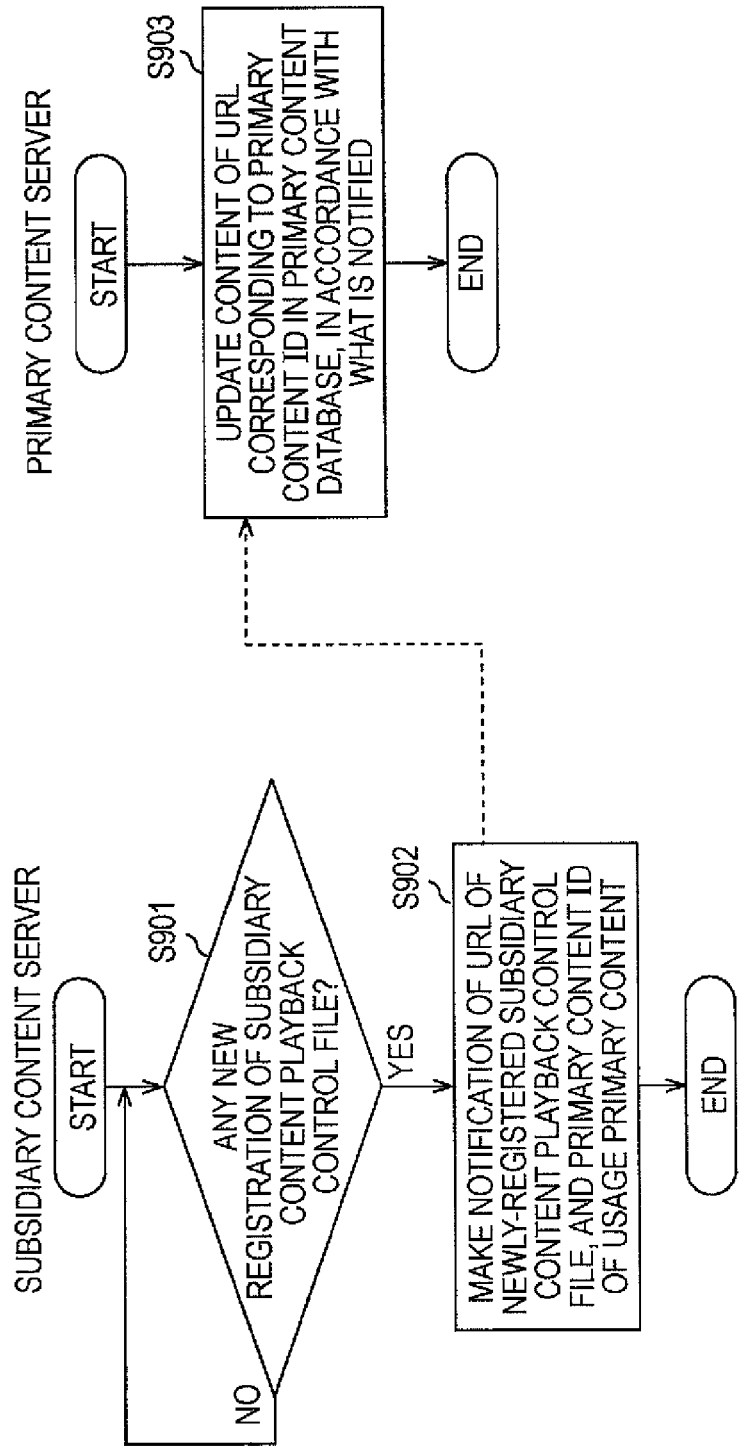
FIG. 26 is a flowchart illustrating an example of processing procedures between the subsidiary content server 2 and the primary content server 1, corresponding to management of "primary content/subsidiary content correlation"

The processing sequence between the subsidiary content server 2 and the primary content server 1 corresponding to the "primary content/subsidiary content correlation" management exemplarily illustrated in FIGS. 25A and 25B above is illustrated with the flowchart in FIG. 26.

First, in step S901, the subsidiary content server 2 awaits new registration of subsidiary content to the subsidiary content database 22a in response to subsidiary content (subsidiary content playback control file) being newly uploaded. Upon determination being made that new registration has been performed, the flow proceeds to the procedure in step S902.

At the stage that a subsidiary content playback control file has been registered at the subsidiary content database 22a, the URL which is the saving location of the subsidiary content (subsidiary content URL) has already been set. Accordingly, in step S902, notification is made by communication via the network that a subsidiary content has been newly uploaded. At the time of this notification for example, at least the URL relating to the newly-uploaded subsidiary content, and the primary content ID of the usage primary content as information indicating what the usage primary content is, are transmitted. The primary content ID of the usage primary content can be obtained from the usage primary content information in the uploaded subsidiary content playback control file.

In step S903, the primary content server 1 which has received the above notification updates the management information contents for the "primary content/subsidiary content correlation" at the primary content database 12a. That is to say, the notified subsidiary content URL is registered in the subsidiary content URL group. Next, the notified primary content ID is searched from the primary content database 12a, and the management information content is rewritten so as to correlate the primary content ID obtained from searching these and the registered subsidiary content URL.

Due to management such as described above being performed at the primary content server 1 (primary content database 12a), information can be obtained regarding the URL of subsidiary content using each primary content registered in the primary content server 1 as the usage primary content thereof by accessing the primary content server 1 for example. Thus, an arrangement wherein the writer of the primary content for example can track and confirm how the primary content which he has created is being used in the subsidiary content, can be provided in the system.

As for the above arrangement, for example, first, the user terminal device 4 makes a request to the primary content server 1 in response to operations as to the music editing/sharing application 100 according to the present embodiment or another application or the like, and enables obtaining of at least the URL of the subsidiary content using a primary content which the user of the user terminal device 4 has created and registered in the primary content server 1 as the usage primary content thereof. Upon the subsidiary content URL being obtainable in this way, the user which is the writer of the primary content can download that subsidiary content and open the file with the music editing/sharing application 100 for example, thereby confirming how his own primary content is being used for editing.

Let us say then that the confirmation shows that the way in which the primary content has been used is pleasing to the writer of the primary content. Here, the writer for example of the primary content can use the communication tool 102 of the music editing/sharing application 100 and so forth to communicate with the writer of the subsidiary content, and convey feelings of thanks, or the like, for example. That is to say, communication will become active between users using the system according to the present embodiment.

On the other hand, let us say that the confirmation of the way in which his own primary content is used in the subsidiary content is displeasing, an arrangement may be conceived on a system wherein a deletion request of the subsidiary content can be made as to the subsidiary content server 2 by operations at the music editing/sharing application 100 for example, such that the subsidiary content server 2 deletes the subsidiary content in response to this request. For example, based on the concept that the intent of the writer of the primary content, which is original material, should be respected in creating subsidiary content, providing such a system as described above would prevent circulation of subsidiary content to which editing displeasing to the writer of primary content has been performed.

Note that a configuration may also be conceived wherein management information for "primary content/subsidiary content correlation" such as shown in FIGS. 25A and 25B is provided to the subsidiary content server 2 side, for example.

Figure 27:
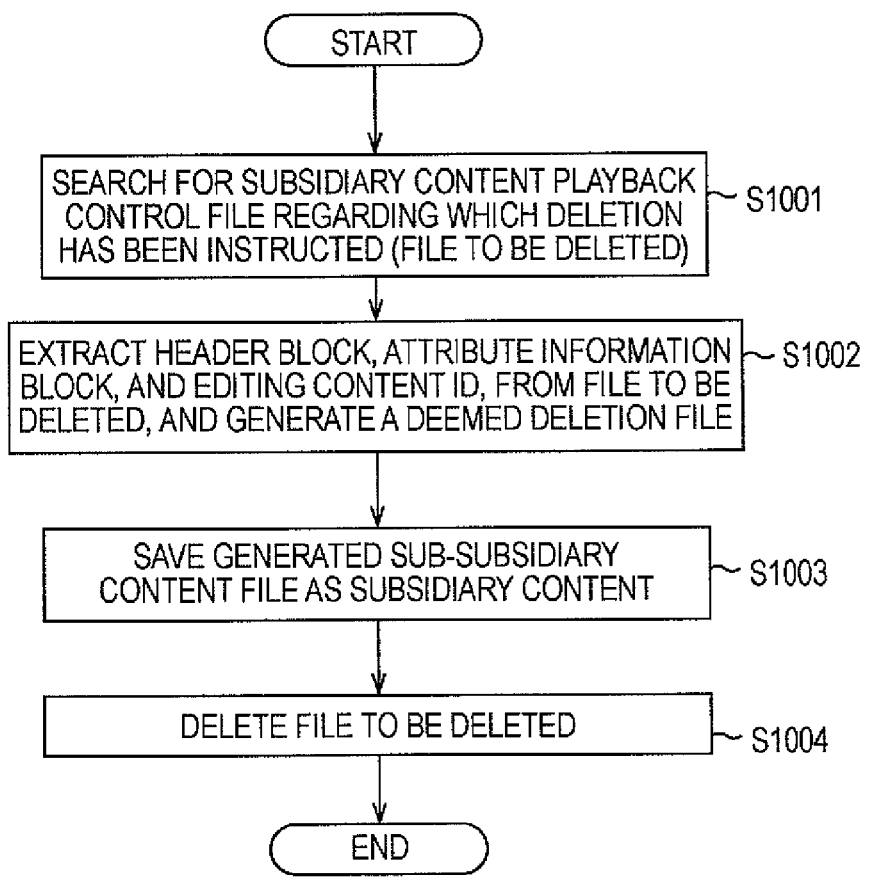
FIG. 27 is a flowchart illustrating an example of processing procedures of deletion of subsidiary content at the subsidiary content server.

Next, processing procedures for a case of deleting a subsidiary content that has once been registered at the subsidiary content server 2 is shown in the flowchart in FIG. 27.

First, in step S1001, a subsidiary content regarding which specification has been made to delete (subsidiary content playback control file: file to be deleted) is searched for. Note that specification of the file to be deleted is performed by the subsidiary content ID. In step S1001, a search is performed on the subsidiary content database 22a with the specified ID as a search condition.

Upon the file to be deleted having been searched, in step S1002 the subsidiary content server 2 extracts the header block, attribute information block, and editing history ID within the metadata portion, from the searched file to be deleted. A file of a predetermined structure, made up of these extracted header block, attribute information block, and editing history ID is then generated. We will call this file a "sub-subsidiary content file". The sub-subsidiary content file created in this way is re-saved in the HDD 48 in step S1003. At this time, the subsidiary content database 22a is updated such that the sub-subsidiary content file to be re-saved is registered and managed as one of the subsidiary contents.

Along with this, the proper subsidiary content playback control file which was the source for generating the sub-subsidiary content file, i.e., the file to be deleted itself, is deleted from the subsidiary content database 22a by step S1004.

According to the above FIG. 27, at the time of deleting the subsidiary content, while the playback control file of the proper subsidiary content itself, regarding which deletion has been specified, is deleted, the contents of the header block and attribute information block are left on the subsidiary content server 2 as a sub-subsidiary content file.

As described above, a sub-subsidiary content file is made up of a header block, attribute information block, and editing history ID. That is to say, even in the event that the subsidiary content (subsidiary content playback control file) is deleted, information regarding this subsidiary content, such as subsidiary content ID, usage editing material contents, usage primary content, and what sort of editing history was there, and so forth, is left on the subsidiary content server 2 without being erased.

With a system for circulating subsidiary contents as with the present embodiment, there is an undeniable possibility of unauthorized subsidiary content being uploaded, which purports to be next-generation subsidiary content edited based on already-uploaded subsidiary content, but in reality is not edited at all and the content thereof is identical to that of the subsidiary content serving as the base of editing, or editing has been performed but the change in content by editing is minuscule, to where the two can be viewed as being as identical, for example.

Also, in the event that we assume that deletion of a subsidiary content from the subsidiary content server 2 is in response to a deletion request from the writer of the primary content serving as the editing material for example, due to a reason that the content is unsuitable, it is undesirable that something with the same content as the subsidiary content that has been deleted once would be uploaded again.

Figure 28:
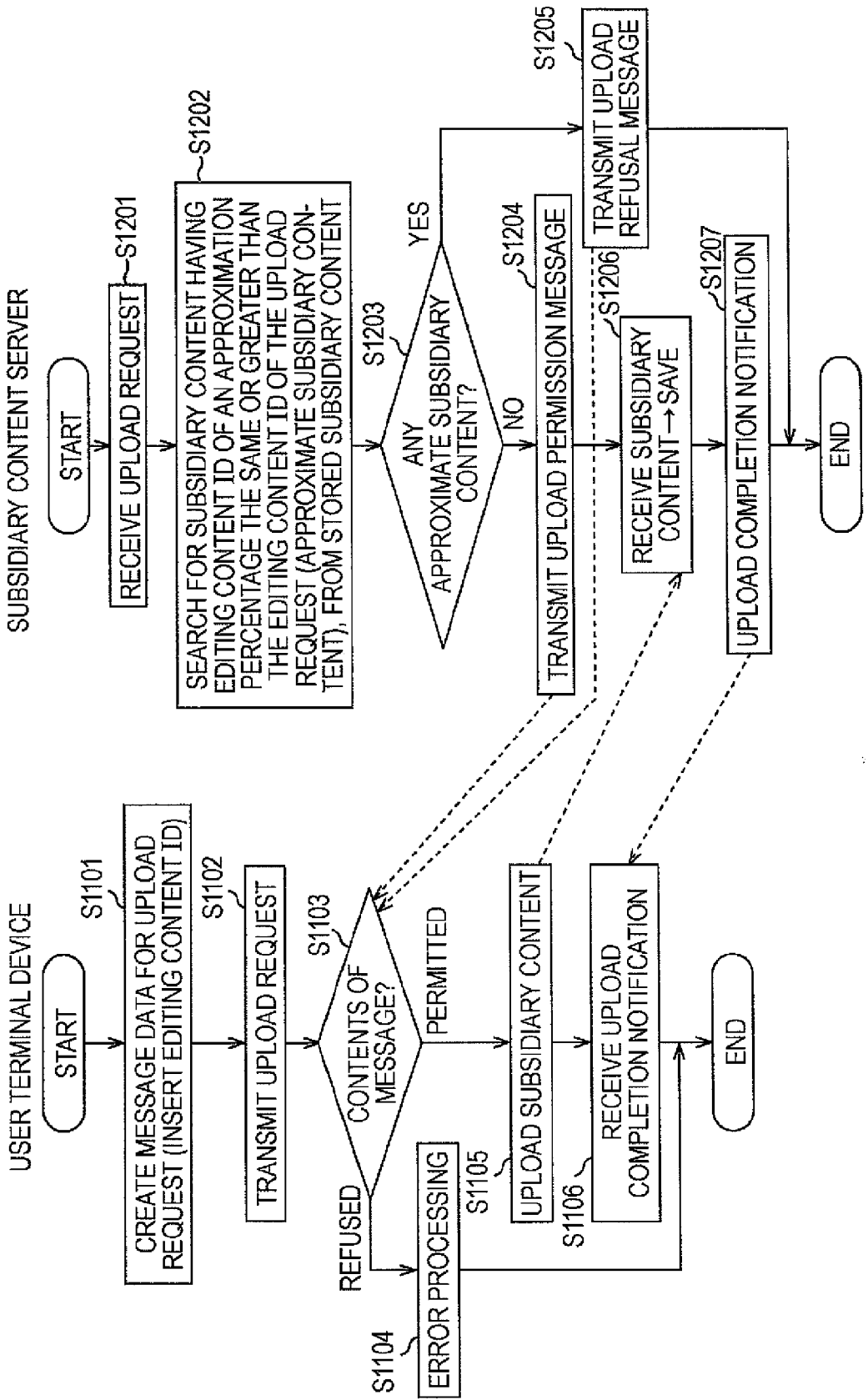
FIG. 28 is a flowchart illustrating uploading subsidiary content by the user terminal device, and an example of processing procedures at the subsidiary content server corresponding thereto (including upload permitted/not-permitted determination)

With the present embodiment, the procedure for deleting subsidiary content shown in FIG. 27 above has been provided, so uploading of unauthorized and unsuitable subsidiary contents such as described above can be eliminated with surety, as described with reference to FIG. 28 next.

Now, let us say that an operation has been performed for uploading a subsidiary content playback control file saved locally at the user terminal device 4, by operating the content managing/editing tool 101 activated on the user terminal device 4. In response to this, the user terminal device 4 (content managing/editing tool 101) creates message data for requesting an upload, as indicated by step S1101 in FIG. 28. At the time of creating this message data, the editing history ID is extracted from the metadata portion of the subsidiary content playback control file to be uploaded, and this editing history ID is included in the structure of the message data.

Then in the next step S1102, control is executed for transmitting the upload request to the subsidiary content server 2 via the network, along with the created message data.

Upon receiving the upload request (message data) transmitted as described above in step S1201, the subsidiary content server 2 executes the procedures of step S1202 on.

First, in step S1202, at the subsidiary content server 2, subsidiary content storing an editing history ID of a value having an approximation percentage of a predetermined level or higher as to the editing history ID included in the message data of the upload request is searched from the subsidiary contents stored as the subsidiary content database 22a. What is noteworthy here is that not only proper subsidiary content playback control files are the object of searching in the search of subsidiary contents, but also sub-subsidiary content files also managed by the subsidiary content database 22a are included in the search, and the search is performed.

Thus, we can say that the step S1202 is a procedure for confirming whether or not there are subsidiary contents of editing history identical to the subsidiary content regarding which an upload request has been made, including those which have been deleted, or approximating to a degree so as to be viewed as being identical (we will refer to these as approximation subsidiary contents) in the subsidiary contents uploaded to the subsidiary content server 2 so far.

In step S1203, determination is made regarding whether or not approximation subsidiary contents have been searched for as the results of the searching processing in the above step S1202.

First, in the event that negative determination results have been obtained in step S1203, this means that there are no approximation subsidiary contents as to the subsidiary content regarding which an upload request has been made. In this case, the flow proceeds to step S1204, and an upload permissible message is returned to the user terminal device 4 (content managing/editing tool 101). Conversely, in the event that positive determination results have been obtained by step S1203, this means that approximation subsidiary contents as to the subsidiary content regarding which an upload request has been made already exist. As can be understood from the earlier description, such subsidiary content is handled as that which should not be uploaded with the present embodiment. Accordingly, in this case, the flow proceeds to step S1205, and an upload rejection message is transmitted to the content managing/editing tool 101.

At the content managing/editing tool 101 at the user terminal device 4 side, determination is made in step S1103 regarding whether the message received in response to the transmission of the upload request is the upload permission message or upload rejection message.

First, in the event that determination is made to be an upload rejection message, a predetermined error processing is executed such as displaying a message to the effect that the upload is unavailable in step S1104 for example, without transmitting data of the subsidiary content regarding which the upload request has been made this time.

On the other hand, in the event that determination is made to be an upload permission message, in step S1105 the data of the subsidiary content playback control file regarding which an upload request has been made this time is transmitted to the subsidiary content server 2, i.e., data transmission of uploading the subsidiary content is executed.

The data transmitted in the above step S1105 is received at the subsidiary content server 2 side in step S1206, and the data of the received subsidiary content playback control file saved in step S404 in FIG. 19 shown earlier, so as to be registered in the subsidiary content database 22*a*. Upon reception and saving processing of the subsidiary content thus being completed, an upload completion notification is transmitted to the user terminal device 4 in step S1207.

The content managing/editing tool 101 at the user terminal device 4 side receives the upload completion notification in step S1106, and thereby recognizes that the upload has been successfully executed.

Note that the editing history ID can be obtained using the playback control information and the primary content ID stored in the usage primary content information, so as described earlier, even if there is no editing history ID, approximation subsidiary content searching as in step S1202 can be performed by calculating an editing history ID from the playback control information of the subsidiary content regarding which an upload request has been made and the primary content ID within the usage primary content information, and in the same way calculating an editing history ID from the playback control information of the subsidiary content registered in the subsidiary content database 22*a* and the primary content ID of the usage primary content information.

However, with such an algorithm, the load of processing for calculating editing history IDs will be extremely heavy. Also, with regard to the sub-subsidiary content file as well, the playback control information should be left, so the size of the sub-subsidiary content files increases and places a load on the capacity of the storage unit 22.

Accordingly, with the present embodiment, the structure of the subsidiary content playback control file is defined including the editing history ID, and at the time of creating the subsidiary content, the editing history ID is created by the user terminal device 4 (content managing/editing tool 101). Accordingly, at the time of the search in step S1102, reading out the editing history ID and perform comparing processing is sufficient. Also, the playback control information of the sub-subsidiary content file can be omitted, reducing the file size by that much.

Figure 29:
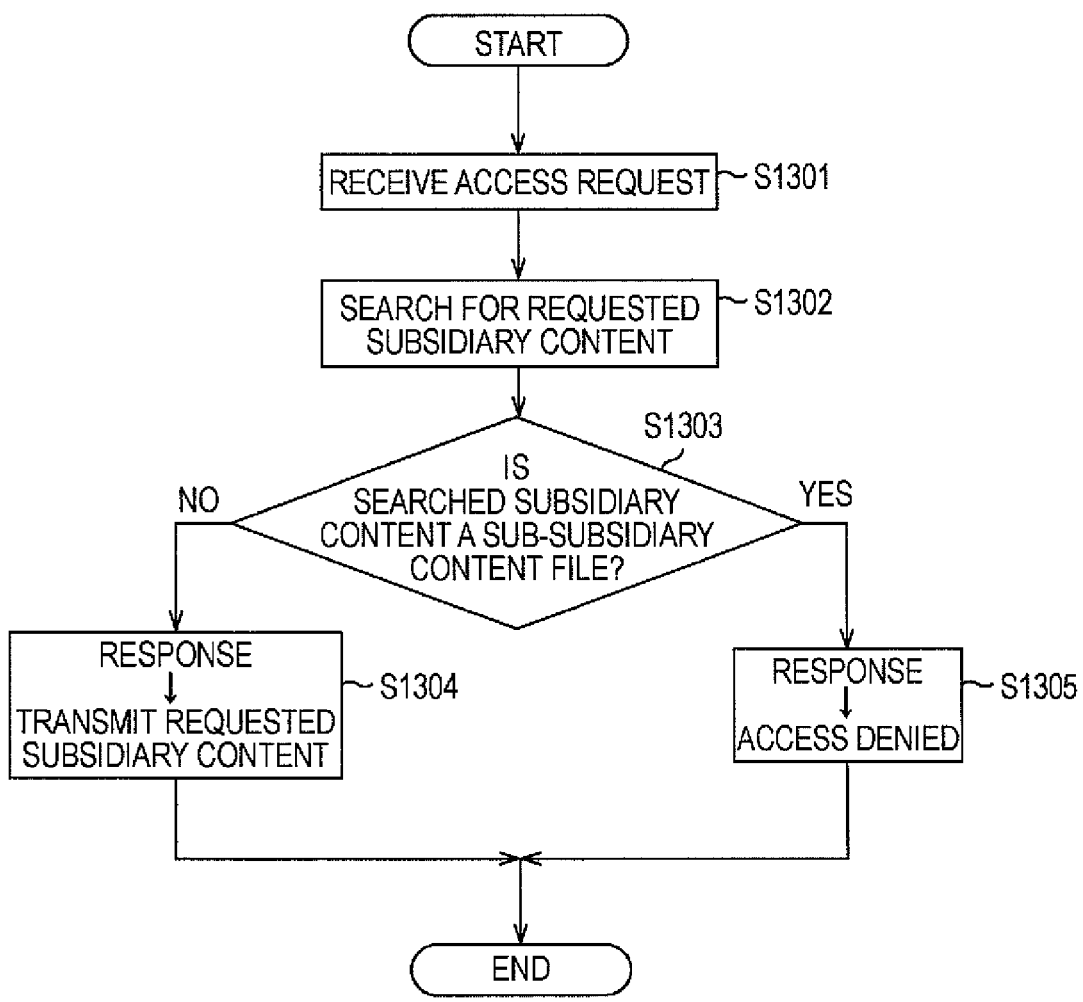
FIG. 29 is a flowchart illustrating an example of processing procedures of responding to a request for access to subsidiary content, at the subsidiary content server.

Also, the subsidiary content server 2 executes response processing as to an access request for subsidiary content by the procedure shown in the flowchart in FIG. 29, corresponding to deletion of subsidiary content shown in FIG. 27.

In step S1301, upon receiving an access request for a subsidiary content from the user terminal device 4 (content managing/editing tool 101) via the network, the subsidiary content server 2 advances to the procedure of step 1302 and on.

Next, in step S1302, the requested subsidiary content is searched from the subsidiary content database 22*a* using the subsidiary content ID transmitted along with the request, for example.

In step S1303, the subsidiary content server 2 determines whether or not the subsidiary content searched in step S1302 is a sub-subsidiary content.

In the event that a negative determination result is obtained in step S1303, this means that the searched subsidiary content is a proper undeleted one. Accordingly, in this case, the flow proceeds to step S1304, and the data of the searched subsidiary content (subsidiary content playback control file) is transmitted to the requesting user terminal device 4 as a response to the access request.

Conversely, in the event that determination is made in step S1303 that the searched subsidiary content is a sub-subsidiary content file, the requested subsidiary content is handled as having already been deleted. Accordingly, in this case, the flow advances to step S1305, and an access refusal content is returned as a response to the access request.

As described earlier for example, sub-subsidiary content files are managed equivalently with proper subsidiary contents in the subsidiary content database 22*a*, but due to the procedure in FIG. 29 above, these can be kept from being downloaded in response to external requests, being deleted subsidiary contents.

Next, an example of the form of generation management of subsidiary contents according to the present embodiment will be described with reference to FIG. 30. This generation management is performed based on primary content IDs and subsidiary content IDs.

FIG. 30 shows six subsidiary contents A, B, C, D, E, and F. We will say that these subsidiary contents have each been created by the music editing/sharing application 100 (content managing/editing tool 101) installed in a certain user terminal device 4.

First, we will say that the subsidiary content A has been created by performing editing with two primary contents, primary contents $\alpha$ and $\beta$, as the editing material contents. In this case, the usage editing material content information of the subsidiary content A is formed of unit file information for each primary content $\alpha$ and $\beta$. That is to say, the fact that the usage editing material contents are primary contents $\alpha$ and $\beta$ is indicated. Also, the usage primary content information of the subsidiary content A is formed of unit file information for each primary content $\alpha$ and $\beta$, indicating that the usage primary content also are primary contents $\alpha$ and $\beta$.

Now, let us say that the subsidiary content A created in this way is saved locally with the music editing/sharing application 100 which has created it, and while file processing can be performed with the music editing/sharing application 100, it has not yet been uploaded to the subsidiary content server 2.

Next, let us say that a new subsidiary content B has been created by editing only the editing material of the subsidiary content A with the same music editing/sharing application 100. This subsidiary content B also, as with the case of the subsidiary content A, is situated locally only, and is not uploaded to the subsidiary content server 2.

In this case, the usage primary content information of the subsidiary content B indicates the usage primary contents are primary contents $\alpha$ and $\beta$.

Also, the subsidiary content B actually uses the subsidiary content A as the editing material content, so originally the subsidiary content A should be indicated according to the usage editing material content information. However, with the present embodiment, the subsidiary content has not been uploaded to the subsidiary content server 2, and is stipulated as not having been provided with rights to become next-generation usage editing material content (i.e., to be parent content) as long as it is situated only locally. That is to say, in the relation between subsidiary contents A and B, according to the usage editing material content information of the subsidiary content B, there is no content indicating the subsidiary content A. Accordingly, in this case, an arrangement is made such that the same content as the usage primary content information is displayed for the usage editing material content as well. That is to say, in the case of the subsidiary content B, the usage editing material content information indicates the usage editing material content to be the primary contents $\alpha$ and $\beta$.

Next, let us say that the above subsidiary content B and a primary content $\gamma$ is used as editing material and a new subsidiary content C has been created by editing. We will say that this subsidiary content C also is situated only locally, and is not uploaded to the subsidiary content server 2.

In this case, the usage primary content information of the subsidiary content C indicates the usage primary contents are primary contents $\alpha$, $\beta$, and $\gamma$. Also, originally the subsidiary content B and the primary content $\gamma$ should be indicated for the usage editing material content, due to the subsidiary content C being situated locally only, the usage editing material content information indicates the usage editing material content to be the primary contents $\alpha$, $\beta$, and $\gamma$, the same content as the usage primary content information.

Next, let us say that a subsidiary content D is created using only the subsidiary content C as the editing material content. We will also say that the subsidiary content D is situated locally, and also has been uploaded to the subsidiary content server 2.

The parent content of this subsidiary content D is the subsidiary content C which is situated only locally, and accordingly, the subsidiary content C does not have rights to be shown in the usage editing material content information of the subsidiary content D. Accordingly, as for the usage editing material content information of the subsidiary content D, the primary contents $\alpha$, $\beta$, and $\gamma$, are shown, the same as the usage primary content information.

Next, let us say that a subsidiary content E is newly created using only the subsidiary content D as the editing material, situated locally, and also uploaded to the subsidiary content server 2.

In this case, the subsidiary content D which is the parent content of this subsidiary content E has been uploaded to the subsidiary content server 2. With the present embodiment, uploaded subsidiary contents are stipulated as having rights to be shown in usage editing material content information. Accordingly, the usage editing material content information of the subsidiary content E, is shown as being the subsidiary content D. On the other hand, the primary contents $\alpha$, $\beta$, and $\gamma$, are contents shown for the usage primary content information.

Let us further say that a subsidiary content F is created using the subsidiary content E and primary content $\delta$ as the editing material. This subsidiary content F is also situated locally, and uploaded to the subsidiary content server 2.

In this case, the primary content D which is one of the parent contents of the subsidiary content F has been uploaded to the subsidiary content server 2. Accordingly, the usage primary content information of the subsidiary content F is content indicating the subsidiary content E and the primary content $\delta$. Also, the usage primary content information is content indicating the primary contents $\alpha$, $\beta$, $\gamma$, and $\delta$.

Now, the reason why rights to be registered in usage editing material content information for the next-generation subsidiary content are not provided to subsidiary content only locally situated and not uploaded to the subsidiary content server 2, and instead the same content as the usage primary content information is provided to the usage editing material content information, as described above, is due to the following reason.

That which is locally situated as the above subsidiary content may be locally deleted by operation at the music editing/sharing application 100. Let us say that in this case, subsidiary content situated only locally is also provided with rights for registration in the usage editing material content information in the next-generation subsidiary content. Thus, for example, the usage editing material content information of the subsidiary content B indicates the subsidiary content A instead of the primary contents $\alpha$ and $\beta$, and in the same way, the usage editing material content information of the subsidiary content C indicates the subsidiary content B instead of the primary contents $\alpha$, $\beta$, and $\gamma$, and the usage editing material content information of the subsidiary content D indicates the subsidiary content C and primary content $\gamma$ instead of the primary contents $\alpha$, $\beta$, and $\gamma$.

Let us say that the subsidiary content B is locally deleted for example in such a state of usage editing material content information. As a result, the subsidiary content B is shown as the usage editing material content information for the subsidiary content C, but no subsidiary content B exists locally or at the subsidiary content server 2. That is to say, the parent of the subsidiary content B ceases to exist. Thus, deleting subsidiary contents existing only locally causes trouble that the parent-child relation of subsidiary content might not be properly traced.

Accordingly, by controlling the content of usage editing material content information as described in FIG. 30, in the event that a parent subsidiary content is only local, the usage editing material content information shows the primary contents used for creating. This content does not strictly indicate parent content. However, trouble of the parent-child relation of the subsidiary content being cut off partway can be prevented in this way.

Also, even in the event that the uploaded subsidiary content such as the subsidiary contents D, E, and F, are locally deleted, the same subsidiary contents are saved in the subsidiary content server 2. Accordingly, referring to the subsidiary contents saved in the subsidiary content server 2 instead of the locally deleted subsidiary contents allows the parent-child relation of subsidiary contents to be correctly traced.

Note that control with regard to the usage editing material content information described above with FIG. 30 is executed by the subsidiary content playback control file generating/interpreting processing unit 118 in correlation with FIG. 11, for example.

Also, the present invention is not restricted to configurations serving as the embodiment described so far, and various types can be conceived.

For example, while as for the primary content, digital audio data has been described as being the main constituent in the actual entity (main portion), but an arrangement may be made wherein, at the stage of the primary content, the same data format may be had as the subsidiary content. That is to say, for the primary content, first, a producer creates several sound sources as digital audio data, performs editing processing using each of these sound sources as editing material contents, and creates a playback control file equivalent to a subsidiary content playback control file as the editing result. This playback control file and a file wherein the digital audio data serving as the sound source has been packaged, are taken as primary content.

In this case, the data for reproducing the actual content contents serving as the primary content is the data of the playback control file.

Also, while a specific example of a GUI screen or the like serving as a music editing/sharing application 100 has not been shown in the description so far, widely various configurations of a GUI of the music editing/sharing application 100 can be conceived.

Also, the configurations of the primary content server 1, subsidiary content server 2, communication server 3, user terminal device 4, ID matching server 5, and user ID server 6, shown in FIGS. 6 through 9, 23, 24, and so forth, are only exemplary and may actually be modified as suitable. Also, a form may be assumed wherein at least one of the above servers are divided into multiple server. Alternatively, as described with the ID matching server 5 and user ID server 6, at least two of these servers may be configured integrated.

Also, the functional configuration of the music editing/sharing application 100 is not restricted to the content described with FIGS. 10, 11, and so forth, and can be widely varied.

Also, the structure of the subsidiary content playback control file shown in FIG. 12, FIG. 13, FIG. 14, and so forth is only exemplary, and conceptual, so various modifications and extensions may be made based on this.

Also, the processing procedures shown as flowcharts and sequence diagrams and so forth by FIGS. 17 through 22, 26, 29, and so forth, i.e., program configurations, are only exemplary, and actually may be modified as appropriate.

Also, while content to be played and reproduced from primary content data and subsidiary content data has been described so far as being audio contents such as tunes for example, but may be video contents made up of video/audio as moving images. In this case, the data for reproducing the actual content contents serving as the primary content is video signal data (and audio signal data to be played synchronously with the video signals). Also, this may be applied to still image contents such as photographs, images, and so forth, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a processor;
communication means configured to execute communication via a network;
storage means to store:
   a subsidiary content, the subsidiary content comprising:
      playback control information instructing how the subsidiary content is to be played back, the playback control information comprising information instructing playback of at least a portion of primary data of a primary content at a specified time,
      a subsidiary content identifier for the subsidiary content, and
      an editing history identifier; and
   instructions that, when executed by the processor, cause the processor to act as:
      deletion control means configured to, if deletion of the subsidiary content from the storage means has been instructed, generate a sub-subsidiary content comprising the subsidiary content identifier and the editing history identifier for the subsidiary content, and store said sub-subsidiary content, instead of the subsidiary content, in said storage means,
wherein the editing history identifier is unique for an editing processing performed for the subsidiary content based on the primary content, the editing history identifier being a unique value generated from the playback control information for the subsidiary content and a primary content identifier for the primary content, the primary content identifier being a unique value based on the primary data of the primary content.

2. The information processing device according to claim 1, wherein the storage means further stores instructions that, when executed, further cause the processor to act as:
searching means configured to search, in a plurality of subsidiary contents and a plurality of sub-subsidiary contents stored in said storage means, for a first editing history identifier with a certain or higher approximation percentage as to a value of a second editing history identifier of a second subsidiary content for which an upload request has been performed; and
upload response means configured to execute a response rejecting uploading of the second subsidiary content corresponding to the second editing history identifier if said first editing history identifier is found by said searching means.

3. The information processing device according to claim 1, wherein the storage means further stores instructions that, when executed, further cause the processor to act as:
access response means configured to execute a response equivalent to rejection of access, in response to having received an access request for a second subsidiary content having a subsidiary content identifier stored in said storage means, if a sub-subsidiary content having the subsidiary content identifier is stored in said storage means.

4. The information processing device according to claim 1, wherein the storage means further stores instructions that, when executed, further cause the processor to act as:
communication control means arranged to execute, in response to receipt of a request to store a new subsidiary content to said storage means, predetermined communication with a primary content server so as to indicate a correlation between the new subsidiary content and a second primary content identified by the playback control information of the new subsidiary content, the second primary content being stored in said primary content server, wherein the primary content server is for storing and managing a plurality of primary contents, and the primary content server is situated on the network.

5. The information processing device of claim 1, wherein:
the primary content is a second subsidiary content, the second subsidiary content having been created based on results of editing processing performed on a second primary content;

the second subsidiary content comprises:
second playback control information instructing how the second subsidiary content is to be played back, the second playback control information comprising information instructing playback of at least a portion of second primary data of second primary content at a specified time,
a second subsidiary content identifier, and
a second editing history identifier; and for playback control information of the subsidiary content, the information instructing playback of at least the portion of the primary data of the primary content comprises information instructing playback of at least a portion of the second primary data of the second primary content.

6. An information processing method for an information processing device, said method comprising:
communicating via a network; and
when deletion of a subsidiary content has been instructed, the subsidiary content being stored in a storage unit and comprising playback control information instructing how the subsidiary content is to be played back, the playback control information comprising information instructing playback of at least a portion of primary data of a primary content at a specified time, a subsidiary content identifier for the subsidiary content, and an editing history identifier, in response to the instruction to delete the subsidiary content:
generating a sub-subsidiary content for the subsidiary content, the sub-subsidiary content comprising
the subsidiary content identifier for the subsidiary content, and
the editing history identifier for the subsidiary content; and
storing said sub-subsidiary content, instead of the subsidiary content, in said storage unit,
wherein the editing history identifier is unique for an editing processing performed for the subsidiary content based on the primary content, the editing history identifier being a unique value generated from the playback control information for the subsidiary content and a primary content identifier for the primary content, the primary content identifier being a unique value based on the primary data of the primary content.

7. The information processing method of claim 6, wherein:
the primary content is a second subsidiary content, the second subsidiary content having been created based on results of editing processing performed on a second primary content;

the second subsidiary content comprises:
second playback control information instructing how the second subsidiary content is to be played back, the second playback control information comprising information instructing playback of at least a portion of second primary data of second primary content at a specified time,
a second subsidiary content identifier, and
a second editing history identifier; and for playback control information of the subsidiary content, the information instructing playback of at least the portion of the primary data of the primary content comprises information instructing playback of at least a portion of the second primary data of the second primary content.

8. A non-transitory computer-readable storage medium storing a program which, when executed, causes an information processing device to execute a method comprising:
communicating via a network; and
when deletion of a subsidiary content has been instructed, the subsidiary content being stored in a storage unit and comprising playback control information instructing how the subsidiary content is to be played back, the playback control information comprising information instructing playback of at least a portion of primary data of a primary content at a specified time, a subsidiary content identifier for the subsidiary content, and an editing history identifier, in response to the instruction to delete the subsidiary content:
generating a sub-subsidiary content for the subsidiary content, the sub-subsidiary content comprising
the subsidiary content identifier for the subsidiary content, and
the editing history identifier for the subsidiary content; and
storing said sub-subsidiary content, instead of the subsidiary content, in said storage unit,
wherein the editing history identifier is unique for an editing processing performed for the subsidiary content based on the primary content, the editing history identifier being a unique value generated from the playback control information for the subsidiary content and a primary content identifier for the primary content, the primary content identifier being a unique value based on the primary data of the primary content.

9. The non-transitory computer-readable storage medium of claim 8, wherein:
the primary content is a second subsidiary content, the second subsidiary content having been created based on results of editing processing performed on a second primary content;

the second subsidiary content comprises:
second playback control information instructing how the second subsidiary content is to be played back, the second playback control information comprising information instructing playback of at least a portion of second primary data of second primary content at a specified time,
a second subsidiary content identifier, and
a second editing history identifier; and for playback control information of the subsidiary content, the information instructing playback of at least the portion of the primary data of the primary content comprises information instructing playback of at least a portion of the second primary data of the second primary content.

10. An information processing device comprising:
a processor;
a communication unit for executing communication via a network;
a storage unit for storing at least a subsidiary content, the subsidiary content comprising:
playback control information instructing how the subsidiary content is to be played back, the playback control information comprising information instructing playback of at least a portion of primary data of a primary content at a specified time,
a subsidiary content identifier for the subsidiary content, and
an editing history identifier; and
a deletion control unit for, if deletion of the subsidiary content from the storage unit has been instructed, generating a sub-subsidiary content comprising the subsidiary content identifier and the editing history identifier for the subsidiary content, and storing said sub-subsidiary content, instead of the subsidiary content, in said storage unit,
wherein the editing history identifier is unique for an editing processing performed for the subsidiary content based on the primary content, the editing history identifier being a unique value generated from the playback control information for the subsidiary content and a primary content identifier for the primary content, the primary content identifier being a unique value based on the primary data of the primary content.

11. An information processing method for an information processing terminal device, said method comprising:
acquiring a content, the content being a first primary content or a first subsidiary content, the first primary content comprising primary data and being correlated with a primary content identifier, the primary content identifier being a unique value based on the primary data, the first subsidiary content having been created from an editing processing performed on the first primary content, the first subsidiary content comprising first playback control information for instructing playback of the first subsidiary content, the first playback control information instructing playback of the primary data of the first primary content at a specified time, the first subsidiary content further comprising a first subsidiary content identifier;
managing the content in correlation with a content identifier, the content identifier being the primary content identifier when the content is the first primary content and being the first subsidiary content identifier when the content is the first subsidiary content;
creating a second subsidiary content, the second subsidiary content comprising:
second playback control information for instructing how the second subsidiary content is to be played back, the second playback control information comprising information instructing playback of at least a portion of the primary data of the first primary content,
a second subsidiary content identifier, and
a second editing history identifier;
wherein creating the second subsidiary content comprises:
executing editing processing with secondary usage of the content;
creating the second playback control information based on results of the editing processing;
generating the second editing history identifier so as to be unique for the editing processing performed for the second subsidiary content on the content, the generating comprising obtaining a unique value based on the second playback control information and the content identifier for the content; and
generating the second subsidiary content identifier based at least in part on the second playback control information.

12. The method of claim 11, wherein if a collision rate among primary content identifiers is assumed, and if the value of the primary content identifier is generated such that collisions among primary content identifiers do not exceed the collision rate, the value of the primary content identifier is unique.

13. The method of claim 11, wherein the primary data is at least one of audio data, video data, and image data.

14. The first editing history identifier of claim 11, wherein the second editing history identifier is a second unique value.

15. The method of claim 14, wherein the second editing history identifier is obtained by computing a hash function of the second playback control information and the content identifier.

* * * * *